(12) United States Patent
Tsukagoshi

(10) Patent No.: US 9,883,160 B2
(45) Date of Patent: Jan. 30, 2018

(54) TRANSMITTING APPARATUS FOR TRANSMISSION OF RELATED INFORMATION OF IMAGE DATA

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/241,816

(22) Filed: Aug. 19, 2016

(65) Prior Publication Data

US 2016/0360178 A1 Dec. 8, 2016

Related U.S. Application Data

(63) Continuation of application No. 14/113,680, filed as application No. PCT/JP2013/053852 on Feb. 18, 2013, now Pat. No. 9,451,234.

(30) Foreign Application Priority Data

Mar. 1, 2012 (JP) .................................. 2012-045912

(51) Int. Cl.
*H04N 13/00* (2006.01)
*H04N 21/236* (2011.01)
(Continued)

(52) U.S. Cl.
CPC ..... *H04N 13/0022* (2013.01); *H04N 13/0033* (2013.01); *H04N 13/0059* (2013.01);
(Continued)

(58) Field of Classification Search
CPC .......... H04N 13/0022; H04N 13/0059; H04N 13/0066; H04N 13/0033; H04N 19/46
(Continued)

(56) References Cited

U.S. PATENT DOCUMENTS 7,825,961 B2 11/2010 Koba
8,760,468 B2 6/2014 Lee et al.
(Continued)

FOREIGN PATENT DOCUMENTS

CN 101919259 A 12/2010
CN 101933336 A 12/2010
(Continued)

OTHER PUBLICATIONS

Office Action received for Japanese Patent Application No. 2013-542275, dated Mar. 15,2016, 6 pages of Office action.
(Continued)

*Primary Examiner* — Jeffery Williams
(74) *Attorney, Agent, or Firm* — Chip Law Group

(57) ABSTRACT

Transmission of relating information of image data such as disparity information or the like is enabled to be performed favorably.

A data packet made up of a header portion and content portion is generated. Related information of image data, for example disparity information or the like, is inserted into the content portion of the data packet herein. Identification information to identify the type of related information is inserted into the header portion of the data packet herein. The data packet herein is correlated to image data, and transmitted to an external device. The related information of the image data such as disparity information or the like can be efficiently transmitted to an external device.

12 Claims, 62 Drawing Sheets

(51) Int. Cl.
*H04N 21/81* (2011.01)
*H04N 19/597* (2014.01)
*H04N 19/46* (2014.01)
*H04N 19/70* (2014.01)

(52) U.S. Cl.
CPC ......... *H04N 13/0066* (2013.01); *H04N 19/46* (2014.11); *H04N 19/597* (2014.11); *H04N 21/236* (2013.01); *H04N 21/816* (2013.01); *H04N 19/70* (2014.11)

(58) Field of Classification Search
USPC .......................................................... 348/43
See application file for complete search history.

(56) References Cited

U.S. PATENT DOCUMENTS

| | | |
|---|---|---|
| 2006/0013311 A1 | 1/2006 | Han |
| 2008/0278630 A1 | 11/2008 | Kimura et al. |
| 2008/0317361 A1 | 12/2008 | Song et al. |
| 2009/0142041 A1 | 6/2009 | Nagasawa et al. |
| 2009/0232389 A1 | 9/2009 | lee et al. |
| 2009/0245347 A1 | 10/2009 | lee et al. |
| 2009/0257452 A1 | 10/2009 | lee et al. |
| 2010/0097396 A1 | 4/2010 | lee et al. |
| 2010/0290483 A1 | 11/2010 | Park et al. |
| 2011/0090314 A1 | 4/2011 | lee et al. |
| 2011/0103472 A1* | 5/2011 | Lefebvre ............ H04N 21/4122 375/240.12 |
| 2011/0122235 A1 | 5/2011 | lee et al. |
| 2011/0134210 A1 | 6/2011 | Tsukagoshi |
| 2011/0134213 A1 | 6/2011 | Tsukagoshi |
| 2011/0149024 A1 | 6/2011 | Tsukagoshi |
| 2011/0149034 A1 | 6/2011 | Tsukagoshi |
| 2011/0181693 A1 | 7/2011 | Lee et al. |
| 2011/0181694 A1 | 7/2011 | Kim et al. |
| 2011/0200273 A1 | 8/2011 | Singhal et al. |
| 2011/0285818 A1 | 11/2011 | Park et al. |
| 2011/0316848 A1 | 12/2011 | Newton et al. |
| 2012/0086773 A1 | 4/2012 | Park et al. |
| 2012/0120200 A1* | 5/2012 | Newton ............. H04N 13/0003 348/46 |
| 2013/0028315 A1 | 1/2013 | Park et al. |
| 2013/0081087 A1 | 3/2013 | Lee et al. |
| 2013/0271568 A1 | 10/2013 | Park et al. |
| 2013/0307927 A1 | 11/2013 | Park et al. |
| 2014/0099065 A1 | 4/2014 | Park et al. |
| 2014/0204962 A1 | 7/2014 | Park et al. |

FOREIGN PATENT DOCUMENTS

| | | |
|---|---|---|
| JP | 2005-006114 A | 1/2005 |
| JP | 2008-103820 A | 5/2008 |
| JP | 2011-030183 A | 2/2011 |
| JP | 2013-500664 A | 1/2013 |
| WO | 2009104850 A | 8/2009 |
| WO | 2011-001856 A | 1/2011 |
| WO | 2011-001858 A | 1/2011 |
| WO | 2011/013030 A1 | 2/2011 |

OTHER PUBLICATIONS

Office Action received for China Patent Application No. 201380001143.8, dated Nov. 19, 2015, 4 pages of Office action.
Extended European Search Report dated Oct. 6, 2015 in patent application No. 13754829.3.
International Search Report for Application No. PCT/JP2013/053852 dated Apr. 16, 2011.
Office Action for EP Patent Application No. 13754829.3, dated Jan. 11, 2017, 6 pages.
Office Action for JP Patent Application No. 2016-173353, dated May 16, 2017, 06 pages of Office Action and 06 pages of English Translation.

* cited by examiner

AVC video descriptor

| Syntax | No. of bits | Mnemonic |
|---|---|---|
| AVC_video_descriptor() { | | |
|   descriptor_tag | 8 | uimsbf |
|   descriptor_length | 8 | uimsbf |
|   profile_idc | 8 | uimsbf |
|   constraint_set0_flag | 1 | bslbf |
|   constraint_set1_flag | 1 | bslbf |
|   constraint_set2_flag | 1 | bslbf |
|   constraint_set3_flag | 1 | bslbf |
|   constraint_set4_flag | 1 | bslbf |
|   constraint_set5_flag | 1 | bslbf |
|   AVC_compatible_flags | 2 | bslbf |
|   level_idc | 8 | uimsbf |
|   AVC_still_present | 1 | bslbf |
|   AVC_24_hour_picture_flag | 1 | bslbf |
|   Frame_Packing_SEI_not_present_flag | 1 | bslbf |
|   depth_info_not_existed_flag | 1 | bslbf |
|   reserved | 4 | bslbf |
| } | | |

(b)

Semantics depth_info_not_existed_flag (1)
  Indicating if depth information is existed in video stream.
  '0'  depth information is encoded in the corresponding video stream.
  '1'  depth information is not encoded in the corresponding video stream.

FIG. 11

MVC extension descriptor (a)

| Syntax | No. Of bits | Mnemonic |
|---|---|---|
| MVC_extension_descriptor() { | | |
| descriptor_tag | 8 | uimsbf |
| descriptor_length | 8 | uimsbf |
| average_bit_rate | 16 | uimsbf |
| maximum_bitrate | 16 | uimsbf |
| reserved | 4 | bslbf |
| view_order_index_start | 10 | bslbf |
| view_order_index_end | 10 | bslbf |
| temporal_id_start | 3 | bslbf |
| temporal_id_end | 3 | bslbf |
| no_sei_nal_unit_present | 1 | bslbf |
| depth_info_not_existed_flag | 1 | bslbf |
| } | | |

(b)

Semantics
depth_info_not_existed_flag (1)
  Indicating if depth information is existed in video stream.
  '0'   depth information is encoded in the corresponding video stream.
  '1'   depth information is not encoded in the corresponding video stream.

FIG. 12 depth_info descriptor (a)

| Syntax | No. of Bits | Format |
|---|---|---|
| depth_info descriptor() { | | |
| descriptor_tag | 8 | uimsbf |
| descriptor_length | 8 | uimsbf |
| depth_info_not_existed_flag | 1 | bslbf |
| reserved | 7 | '0x7f' |
| } | | |

(b)

depth_info_not_existed_flag (1)
Indicating if depth information is existed in video stream.
'0' : depth information is encoded in the corresponding video stream.
'1' : depth information is not encoded in the corresponding video stream.

FIG. 13

DATA CONSTRUCTION OF ACCESS UNIT (a) ACCESS UNIT AT LEAD OF GOP

| AU Delimiter (ONE) | SPS (ONE) | PPS (ONE) | SEIs | Slices (Primary Coded Picture) (ONE OR MORE) | Filler data (ONE) | End of sequence (ONE) |

SEIs:
- Buffering period SEI message (ONE)
- Recovery point SEI message (ONE, ESSENTIAL ONLY) (IN CASE OF open GOP)
- Picture timing SEI message (ONE)
- Pan-scan rectangle SEI message (ONE)
- Decoded reference Picture marking SEI message (ONE)
- depth_information SEI message (ONE)

(b) ACCESS UNIT OTHER THAN AT LEAD OF GOP

| AU Delimiter (ONE) | PPS (ONE) | SEIs | Slices (Primary Coded Picture) (ONE OR MORE) | Filler data (ONE) | End of sequence (ONE) |

SEIs:
- Picture timing SEI message (ONE)
- Pan-scan rectangle SEI message (ONE)
- Decoded reference Picture marking SEI message (ONE)
- depth_information SEI message (ONE)

☐ : ESSENTIAL
⌞ ⌝ : NOT ESSENTIAL

| Syntax | No. of Bits | Format |
|---|---|---|
| user_data_unregistered (size) { | | |
|   uuid_iso_iec_11578 | 128 | uimsbf |
|   for( i = 16; i < payloadSize; i++ ) | | |
|     user_data_payload_byte | 8 | bslbf |
| } | | |

(b)

| Syntax | No. of Bits | Format |
|---|---|---|
| depth_information_data ( ) { | | |
|   userdata_id | 16 | uimsbf |
|   depth_information_length | 8 | bslbf |
|   depth_information ( ) | | |
| } | | |

(a)

| Syntax | No. of Bits | Format |
|---|---|---|
| depth_information() { | | |
| partition_type | 3 | bslbf |
| reserved | 1 | |
| partition_count | 4 | bslbf |
| max_disparity_in_picture | 8 | uimsbf |
| for ( partition = 0 ; partition < partition_count ; partition++ ) { | | |
| min_disparity_in_partition | 8 | uimsbf |
| } | | |
| } | | |

| Syntax | No. of Bits | Format |
|---|---|---|
| depth_information() { | | |
|   partition_type | 3 | bslbf |
|   reserved | 1 | 1 |
|   partition_count | 4 | bslbf |
|   for ( partition = 0 ; partition < partition_count ; partition++) { | | |
|     max_disparity_in_partition | 8 | uimsbf |
|     min_disparity_in_partition | 8 | uimsbf |
|   } | | |
| } | | |

FIG. 17

| Syntax | No. of Bits | Format |
|---|---|---|
| depth_information() { | | |
| min_partition_type | 3 | bslbf |
| max_partition_type | 3 | bslbf |
| reserved | 2 | 0x1f |
| min_partition_count | 4 | bslbf |
| max_partition_count | 4 | bslbf |
| for ( partition = 0 ; partition < min_partition_count ; partition++) { | | |
| min_disparity_in_partition | 8 | uimsbf |
| } | | |
| for ( partition = 0 ; partition < max_partition_count ; partition++) { | | |
| max_disparity_in_partition | 8 | uimsbf |
| } | | |
| } | | |

FIG. 18

```
partition_type (3)
         INDICATES SCREEN PARTITION TYPE.
         '000' : type000    '001' : type001    '010' : type010
         '011' : type011    '100' : type100    '101' : type101
         Others             reserved
partition_enabled_flag (1)
         INDICATES WHETHER OR NOT THE SCREEN IS PARTITIONED.
         '1'                PARTITIONED.
         '0'                NOT PARTITIONED.
Intra_disparity_flag (1)
         INDICATES WHETHER OR NOT THE disparity VALUE IS A NON-MEASURED VALUE.
         '1'                NON-MEASURED VALUE.
         '0'                MEASURED VALUE.
partition_count (4)
         TOTAL COUNT OF PARTITION REGIONS. THE VALUE DEPENDS ON Partition_type.
picture_count (6)
         INDICATES COUNT OF pictures IN THE CASE OF ENCODING ALL OF THE MULTIPLE
         pictures TOGETHER
max_disparity_in_picture (8)
         MAXIMUM disparity VALUE OF OVERALL picture.
         XXXXXXXX      pixels in 4K resolution
         XXXXXXX.X     pixels in 2K resolution (LSB indicates half-pixel)
max_disparity_in_partition (8)
         MAXIMUM disparity VALUE IN EACH PARTITION REGION.
         XXXXXXXX      pixels in 4K resolution
         XXXXXXX.X     pixels in 2K resolution (LSB indicates half-pixel)
min_disparity_in_partition (8)
         MINIMUM disparity VALUE IN EACH PARTITION REGION.
         XXXXXXXX      pixels in 4K resolution
         XXXXXXX.X     pixels in 2K resolution (LSB indicates half-pixel)
```

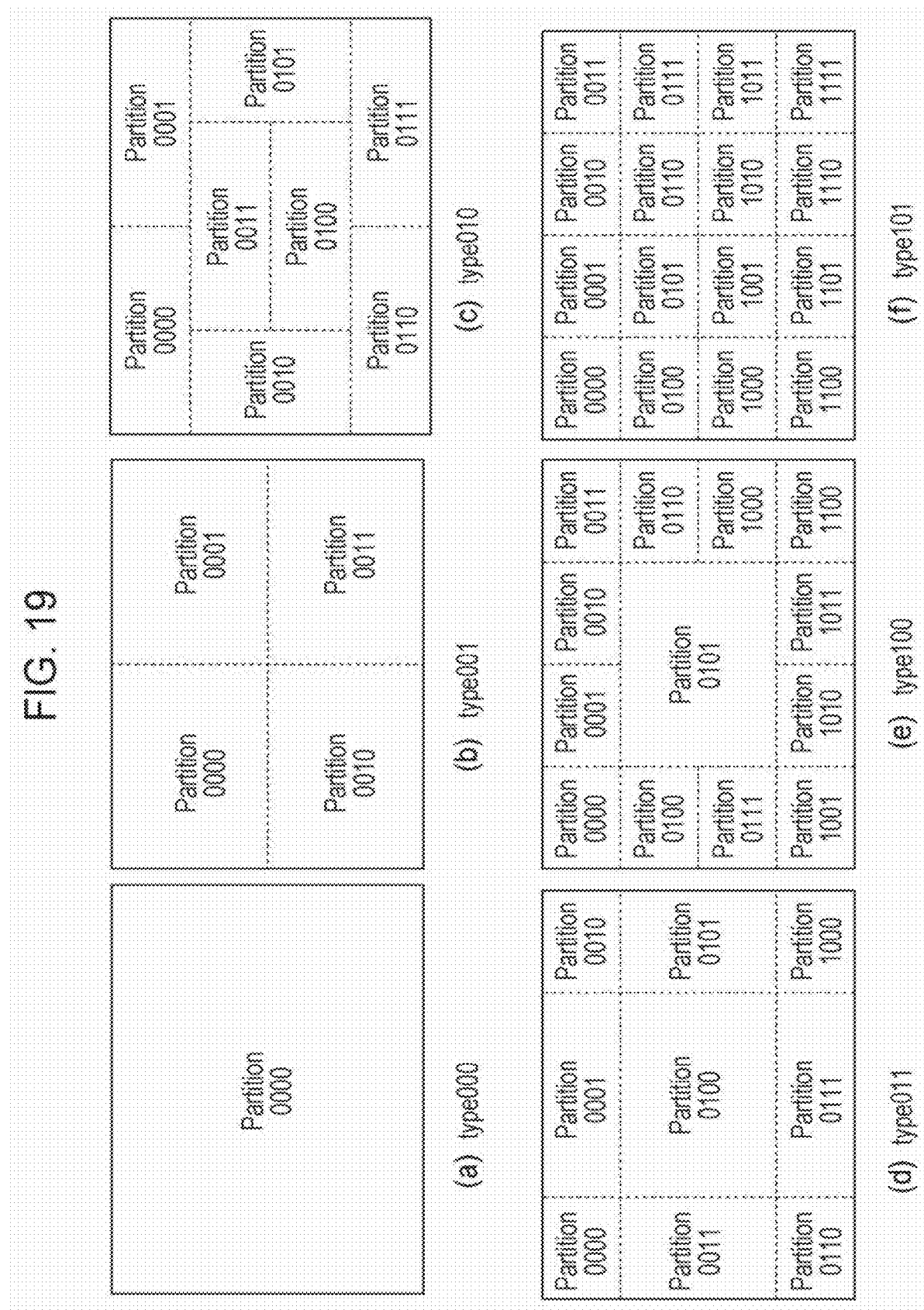

FIG. 20

| Syntax | No. of Bits | Format |
|---|---|---|
| depth_information() { | | |
|   partition_type | 3 | bslbf |
|   reserved | 7 | 0x7f |
|   picture_count | 6 | bslbf |
|   for ( picture = 0 ; picture < picture_count ; picture++ ){ | | |
|     max_disparity_in_picture | 8 | uimsbf |
|     partition_count | 4 | bslbf |
|     reserved | 4 | 0xf |
|     for ( partition = 0 ; partition < partition_count ; partition++) { | | |
|       min_disparity_in_partition | 8 | uimsbf |
|     } | | |
|   } | | |
| } | | |

FIG. 21

| Syntax | No. of Bits | Format |
|---|---|---|
| depth_information() { | | |
|   partition_type | 3 | bslbf |
|   reserved | 7 | 0x7f |
|   picture_count | 6 | bslbf |
|   for (picture = 0 ; picture < picture_count ; picture++){ | | |
|     partition_count | 4 | bslbf |
|     reserved | 4 | 0xf |
|     for ( partition = 0 ; partition < partition_count ; partition++) { | | |
|       max_disparity_in_partition | 8 | uimsbf |
|       min_disparity_in_partition | 8 | uimsbf |
|     } | | |
|   } | | |
| } | | |

FIG. 22

| Syntax | No. of Bits | Format |
|---|---|---|
| depth_information() { | | |
|   min_partition_type | 3 | bslbf |
|   max_partition_type | 3 | bslbf |
|   reserved | 4 | 0x7f |
|   picture_count | 6 | bslbf |
|   for ( picture = 0 ; picture < picture_count ; picture++ ){ | | |
|     min_partition_count | 4 | bslbf |
|     max_partition_count | 4 | bslbf |
|     for ( partition = 0 ; partition < min_partition_count ; partition++ ) { | | |
|       min_disparity_in_partition | 8 | Uimsbf. |
|     } | | |
|     for ( partition = 0 ; partition < max_partition_count ; partition++ ) { | | |
|       max_disparity_in_partition | 8 | uimsbf |
|     } | | |
|   } | | |
| } | | |

FIG. 23

```
user_data() {
    user_data_start_code                                              32
    depth_information_data_identifier                                 32
    while( nextbits() != '0000 0000 0000 0000 0000 0000 0000 0001' ) {
        depth_information_data()
    }
    next_start_code()
}
```

(a)

| Syntax | No. of Bits | Identifier |
|---|---|---|
| depth_information_data() { <br>   depth_information_Length <br>   depth_information () <br> } | 8 | uimsbf |

(b)

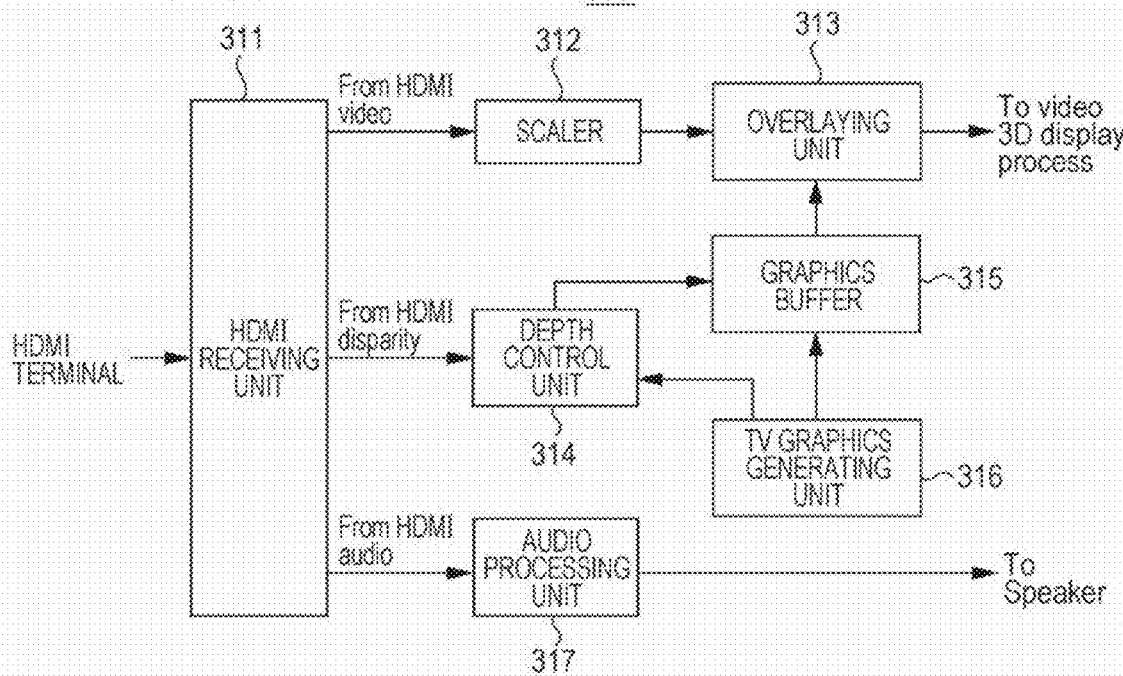
FIG. 38
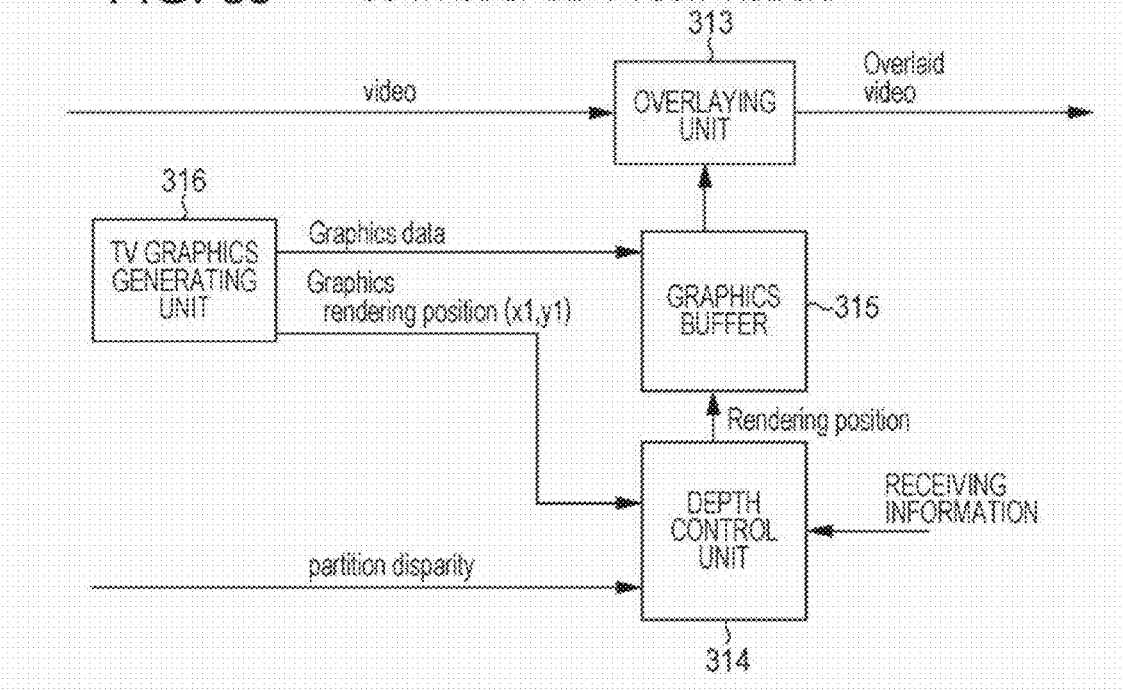
FIG. 39  CONTROL OF DEPTH CONTROL UNIT

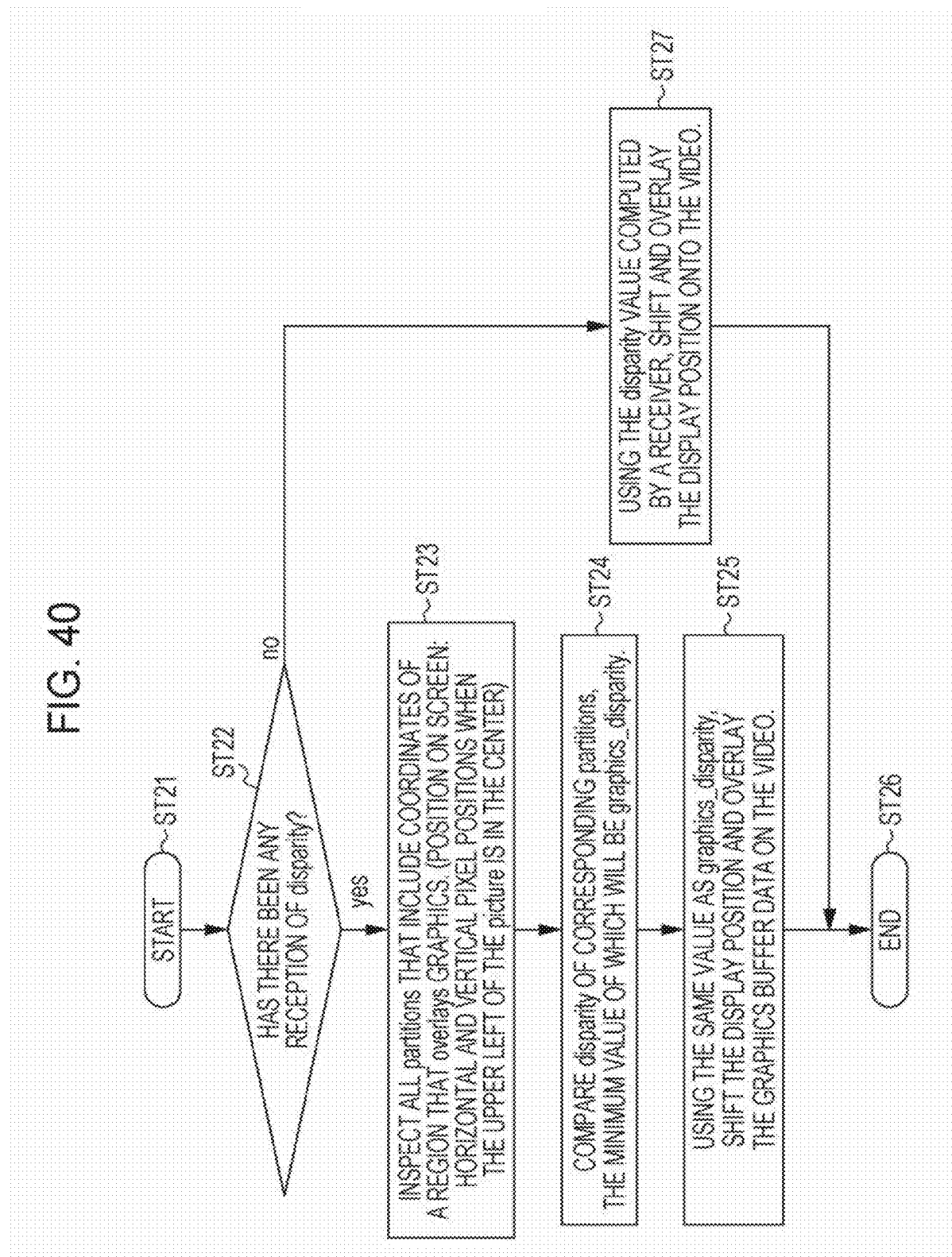

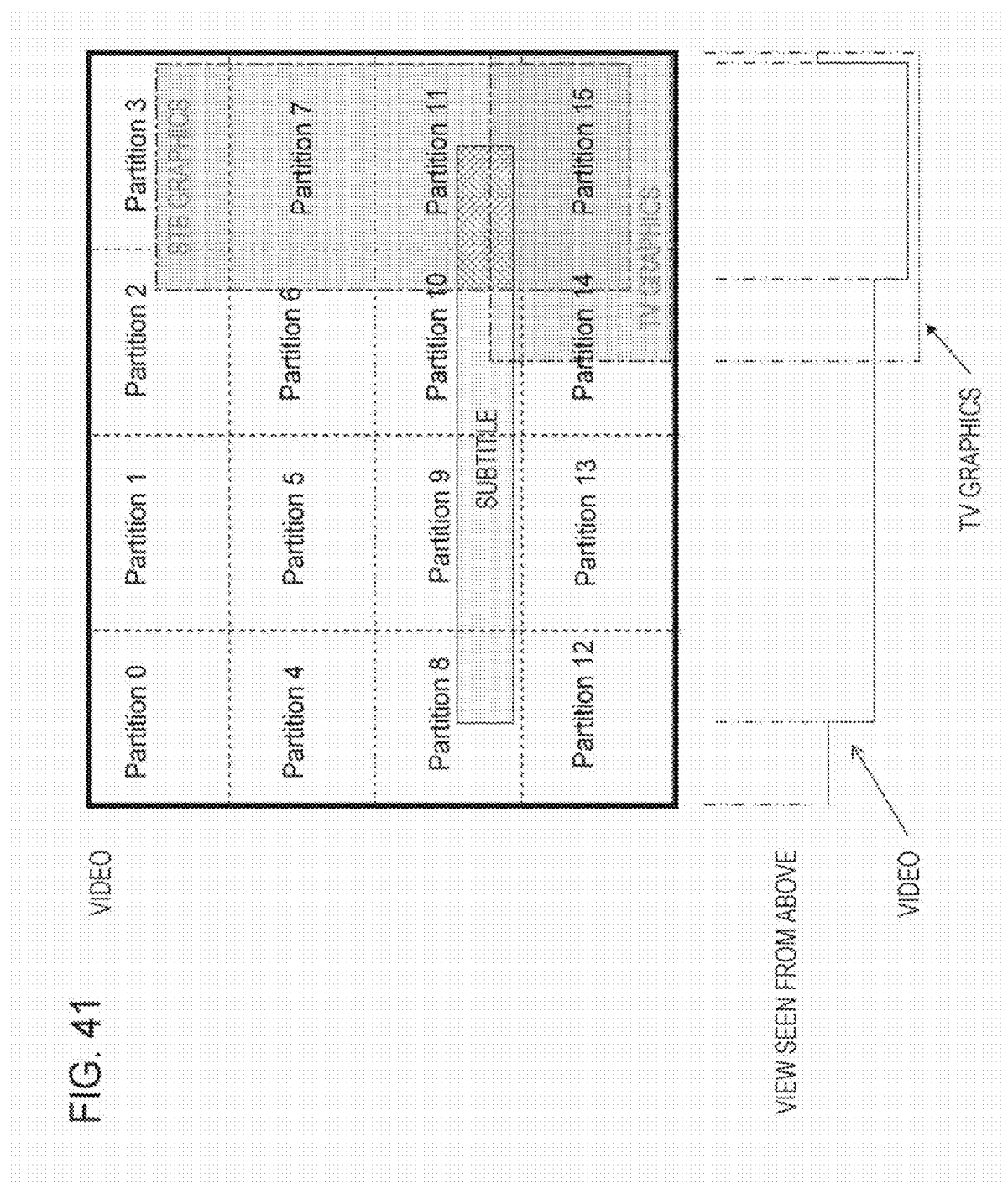

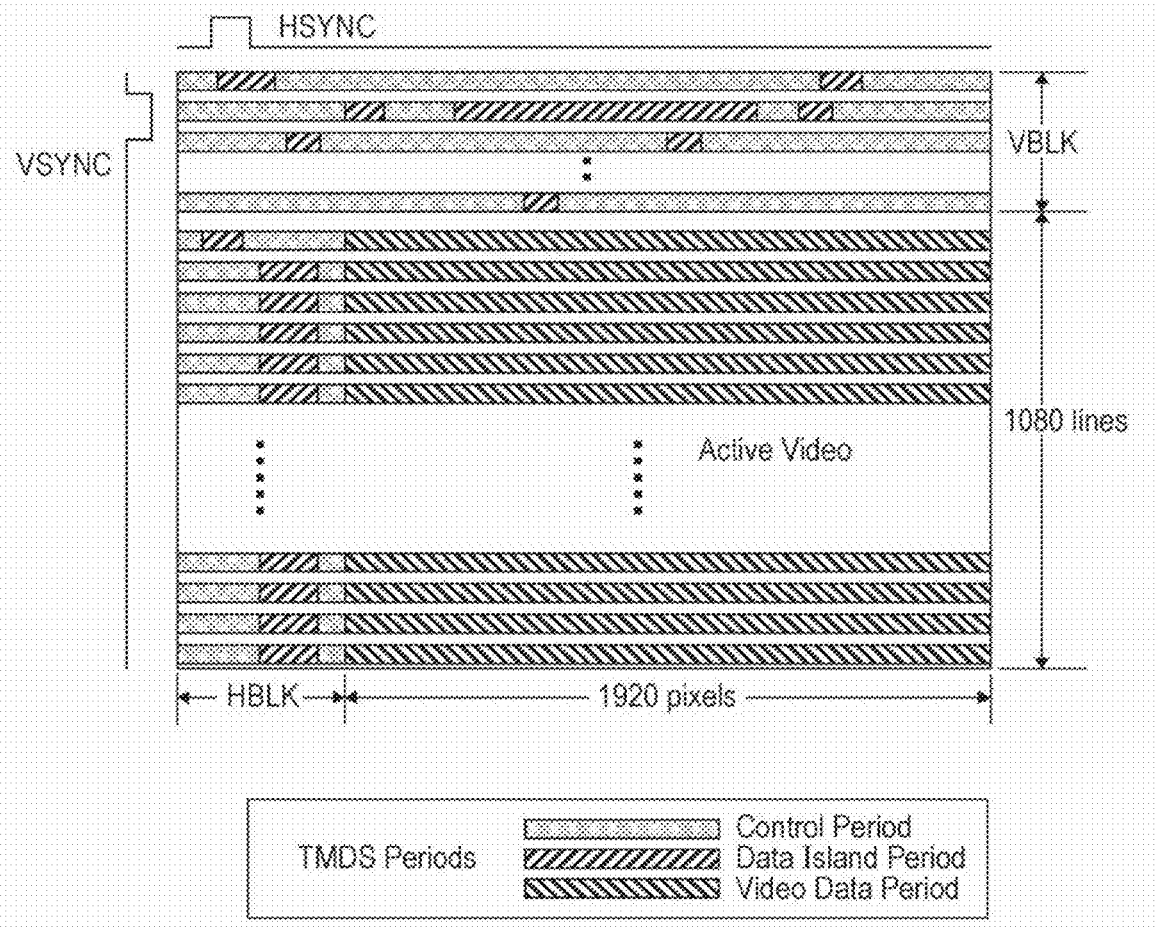

FIG. 44

Vendor Specific InfoFrame

| Packet Byte # | 7 | 6 | 5 | 4 | 3 | 2 | 1 | 0 |
|---|---|---|---|---|---|---|---|---|
| PB0 | Checksum ||||||||
| PB1 | 24bits IEEE Registration Identifier (0x000C03) ||||||||
| PB2 | (least significant byte first) ||||||||
| PB3 | ||||||||
| PB4 | HDMI_Video_Format ||| Rsvd (0) | Rsvd (0) | Rsvd (0) | Rsvd (0) | Rsvd (0) |
| PB5 | 3D_Structure(4bits) |||| 3D_Meta_present | Reserved(0) |||
| PB6 | 3D_ext_data(4bits) |||| Rsvd (0) | Rsvd (0) | Rsvd (0) | Rsvd (0) |
| PB7 | 3D_Metadata_type(3bits) ||| 3D_Metadata_length(5bits) |||||
| PB8 | partition_type (3bits) ||| d_picture (1bit) | partition_count (4bits) ||||
| PB8+1 | Max_disparity_in_picture (8bits) ||||||||
| PB8+2 | Min_disparity_in_partition 0000 (8bits) ||||||||
| PB8+3 | Min_disparity_in_partition 0001 (8bits) ||||||||
| ... | ... ||||||||

FIG. 45

| Field | Description |
|---|---|
| PRTY (1bit) | INDICATES WHETHER INFORMATION THAT THE HDMI sink SHOULD REFERENCE IS INCLUDED. '1': INFORMATION THAT THE SINK SHOULD REFERENCE IS ALWAYS INCLUDED. '0': EXCEPT AS ABOVE. THAT IS TO SAY, INFORMATION THAT THE SINK SHOULD REFERENCE MAY NOT NECESSARILY BE INCLUDED. |
| 3D_support_ID (3bits) '001' | INDICATES ID OF packet content TRANSMITTED BY 3D Displaying Support packet. disparity INFORMATION FOR EACH INDIVIDUAL partition, WHERE THE picture HAS BEEN DIVIDED INTO partitions. |
| Payload length (5bits) | INDICATES THE SIZE OF the payload THAT FOLLOWS THE packet header, IN BYTE SIZE. |
| 3D_Metadata_type (3bits) '001' | INDICATES THE TYPE OF 3D Meta INFORMATION. INDICATES THIS IS partitioned disparity information. |
| 3D_Metadata_length (5bits) | INDICATES THE SIZE OF partitioned disparity information. |
| partition_enable (1bit) '1' '0' | INDICATES WHETHER THE CORRESPONDING picture HAS partition disparity. PARTITION REGIONS ARE SPECIFIED IN HORIZONTAL AND VERTICAL DIRECTIONS, EACH HOLDING disparity. THE OVERALL SCREEN HOLDS ONE disparity. |
| partition_type (3bits) '000' INDICATES type00, '001' INDICATES type01, '010' INDICATES type10, '011' INDICATES type11, '100' INDICATES type100, '101' INDICATES type01. | INDICATES THE SCREEN PARTITION PATTERN OF THE CORRESPONDING picture. |
| d_picture (double_picture) (1bit) '0' '1' | INDICATES WHETHER SINGLE PICTURE OR DOUBLE PICTURE. THE TRANSMITTED partition disparity IS A SINGLE PICTURE. THE TRANSMITTED partition disparity IS A DOUBLE PICTURE (WORTH 2 pictures). |
| Picture_reorder (1bit) '0' '1' | IN THE CASE OF TRANSMITTING A DOUBLE PICTURE, INDICATES WHETHER THE TRANSMISSION OF THE TWO PICTURES IS, N+1 HAS N TEMPORALLY FIRST AND N+1 LATER, OR WHETHER THE TRANSMISSION OF N+1 IS TEMPORALLY FIRST AND N IS LATER. THE (N+1) PICTURE IS FIRST AND THE disparity VALUE IS EXPRESSED WITH 8 bits. THE N PICTURE IS LATER, AND THE DIFFERENCE FROM THE disparity OF THE (N+1) PICTURE IS EXPRESSED WITH 4 bits. THE N PICTURE IS FIRST AND THE disparity VALUE IS EXPRESSED WITH 8 bits. THE (N+1) PICTURE IS LATER, AND THE DIFFERENCE FROM THE disparity OF THE N PICTURE IS EXPRESSED WITH 4 bits. |
| partition_count (4bits) '0000' INDICATES 1, '0011' INDICATES 4, '0111' INDICATES 8, '1000' INDICATES 9, '1100' INDICATES 13, '1111' INDICATES 16. | THE TOTAL NUMBER OF PARTITION REGIONS. |
| max_disparity_in_picture (8bits) XXXXXXXX XXXXXXX.X XXXXXXXX | MAXIMUM disparity VALUE OF OVERALL picture. pixels in 4k resolution pixels in 2K resolution (LSB indicates half-pixel) pixels in 4k resolution |
| Min_disparity_in_partition (8bits) XXXXXXXX XXXXXXX.X | MINIMUM disparity VALUE IN EACH PARTITION REGION. pixels in 4k resolution pixels in 2K resolution (LSB indicates half-pixel) |

FIG. 46

Vendor Specific InfoFrame

| Packet Byte # | 7 | 6 | 5 | 4 | 3 | 2 | 1 | 0 |
|---|---|---|---|---|---|---|---|---|
| ... | | | | | | | | |
| PB7 | 3D_Metadata_type(3bits) = 010 | | | 3D_Metadata_length = 01111 | | | | |
| PB8 | partition_type = 010 | | | d_picture = 0 | Partition_count = 1111 | | | |
| PB8+1 | Max_disparity_in_picture (8bits) | | | | | | | |
| PB8+2 | Min_disparity_in_partition 0000 (8bits) | | | | | | | |
| PB8+3 | Min_disparity_in_partition 0001 (8bits) | | | | | | | |
| PB8+4 | Min_disparity_in_partition 0010 (8bits) | | | | | | | |
| ... | | | | | | | | |
| PB8+16 | Min_disparity_in_partition 1110 (8bits) | | | | | | | |
| PB8+17 | Min_disparity_in_partition 1111 (8bits) | | | | | | | |

Picture N

| Packet Byte # | 7 | 6 | 5 | 4 | 3 | 2 | 1 | 0 |
|---|---|---|---|---|---|---|---|---|
| ... | | | | | | | | |
| PB7 | 3D_Metadata_type(3bits) = 1010 | | | | | | | |
| PB8 | d_picture = 1 | Picture_ reorder = 1 | partition_ enable = 1 | Reserved '1' | | partition_count = 1111 | | |
| PB8+1 | Max_disparity_in_picture (8bits) | | | | | | | |
| PB8+2 | Min_disparity_in_partition0001 (8bits) | | | | | | | |
| PB8+3 | Min_disparity_in_partition0010 (8bits) | | | | | | | |
| PB8+4 | Min_disparity_in_partition0011 (8bits) | | | | | | | |
| ... | | | | | | | | |
| PB8+15 | Min_disparity_in_partition1110 (8bits) | | | | | | | |
| PB8+16 | Min_disparity_in_partition1111 (8bits) | | | | | | | |
| PB8+17 | Reserved '1111' | | | | Differential_max_disparity_in_picture (4bits) | | | |
| PB8+18 | Differential_min_disparity_partition0001 (4bits) | | | | Differential_min_disparity_partition0010 (4bits) | | | |
| ... | | | | | | | | |
| PB8+25 | Differential_min_disparity_partition1110 (4bits) | | | | Differential_min_disparity_partition1111 (4bits) | | | |

Vendor Specific InfoFrame

Picture (N+1) : PB8+1 through PB8+16
Picture (N) : PB8+17 through PB8+25

FIG. 56

Packet Header (3Bytes : HB0 - HB2)

| Byte # Bit# | 7 | 6 | 5 | 4 | 3 | 2 | 1 | 0 |
|---|---|---|---|---|---|---|---|---|
| HB0 | 0 | 0 | 0 | 0 | 1 | 0 | 1 | 1 |
| HB1 | 3D_support_ID (3bits) | | | Reserved (5bits) | | | | |
| HB2 | Reserved (3bits) | | | Payload length (5bits) | | | | |

FIG. 57

Packet Contents

| Packet Byte # | 7 | 6 | 5 | 4 | 3 | 2 | 1 | 0 |
|---|---|---|---|---|---|---|---|---|
| PB0 | 3D_Metadata_type(3bits) | | | 3D_Metadata_length= 11010 | | | | |
| PB1 | reserved | | partition_type= 101 | | Partition_count= 1111 | | | |
| PB2 | Max_disparity_in_picture (8bits) | | | | | | | |
| PB3 | Min_disparity_in_partition 0000 (8bits) | | | | | | | |
| PB4 | Min_disparity_in_partition 0001 (8bits) | | | | | | | |
| PB5 | Min_disparity_in_partition 0010 (8bits) | | | | | | | |
| ... | ... | | | | | | | |
| PB17 | Min_disparity_in_partition 1110 (8bits) | | | | | | | |
| PB18 | Min_disparity_in_partition 1111 (8bits) | | | | | | | |

Picture N (PB2–PB18)

FIG. 58

Packet Contents

| Packet Byte # | 7 | 6 | 5 | 4 | 3 | 2 | 1 | 0 | |
|---|---|---|---|---|---|---|---|---|---|
| PB0 | 3D_Metadata_type(3bits) | | | 3D_Metadata_length = 1010 | | | | | Picture (N) |
| PB1 | d_picture =1 | Picture_reorder =0 | partition_enable =1 | Reserved '1' | partition_count = 1111 | | | | |
| PB2 | Max_disparity_in_picture (8bits) | | | | | | | | |
| PB3 | Min_disparity_in_partition0001 (8bits) | | | | | | | | |
| PB4 | Min_disparity_in_partition0010 (8bits) | | | | | | | | |
| PB5 | Min_disparity_in_partition0011 (8bits) | | | | | | | | |
| ••• | ••• | | | | | | | | |
| PB17 | Min_disparity_in_partition1110 (8bits) | | | | | | | | |
| PB18 | Min_disparity_in_partition1111 (8bits) | | | | | | | | |
| PB19 | Reserved '1111' | | | | Differential_max_disparity_in_picture(4bits) | | | | Picture (N+1) |
| PB20 | Differential_min_disparity_partition0001 (4bits) | | | | Differential_min_disparity_partition0010 (4bits) | | | | |
| ••• | ••• | | | | ••• | | | | |
| PB27 | Differential_min_disparity_partition1110 (4bits) | | | | Differential_min_disparity_partition1111 (4bits) | | | | |

FIG. 59

Packet Contents

| Packet Byte # | 7 | 6 | 5 | 4 | 3 | 2 | 1 | 0 |
|---|---|---|---|---|---|---|---|---|
| PB0 | Reserved (3bits) | | | 3D_Metadata_length (upper 5bits) | | | | |
| PB1 | 3D_Metadata_length (lower 8bits) | | | | | | | |
| PB2 | Reserved (5bits) | | | | | partition_type (3bits) | | |
| PB3 | Partition_count (8bits) | | | | | | | |
| PB4 | Max_disparity_in_picture (8bits) | | | | | | | |
| PB5 | Min_disparity_in_partition 0000 (8bits) | | | | | | | |
| PB6 | Min_disparity_in_partition 0001 (8bits) | | | | | | | |
| PB7 | Min_disparity_in_partition 0010 (8bits) | | | | | | | |
| ... | ... | | | | | | | |

FIG. 61

Vendor Specific InfoFrame

| Packet Byte # | 7 | 6 | 5 | 4 | 3 | 2 | 1 | 0 |
|---|---|---|---|---|---|---|---|---|
| PB0 | Checksum ||||||||
| PB1 | 24bits IEEE Registration Identifier (0x000C03) ||||||||
| PB2 | (least significant byte first) ||||||||
| PB3 | |||||||||
| PB4 | HDMI_Video_Format ||| Rsvd (0) | Rsvd (0) | Rsvd (0) | Rsvd (0) | Rsvd (0) |
| PB5 | 3D_Structure(4bits) |||| 3D_Meta _present | ActiveSpace Enable("1") | Reserved(0) ||
| PB6 | 3D_ext_data(4bits) |||| Reserved(0) ||||

TRANSMITTING APPARATUS FOR TRANSMISSION OF RELATED INFORMATION OF IMAGE DATA

CROSS REFERENCE TO RELATED APPLICATIONS

The present application is a continuation of U.S. patent application Ser. No. 14/113,680 filed in USPTO on Oct. 24, 2013 which is a National Stage of PCT/JP2013/053852, filed Feb. 18, 2013, and claims the benefit of priority from Japanese Priority Patent Application JP 2012-045912 filed in the Japan Patent Office on Mar. 1, 2012. Each of the above referenced applications is hereby incorporated by reference in its entirety.

TECHNICAL FIELD

The present invention relates to a transmitting apparatus, transmitting method, and receiving apparatus, and particularly relates to a transmitting apparatus and the like that can favorably perform transmission of related information that relates to image data such as disparity information or the like.

BACKGROUND ART

For example, a transmitting method that uses television broadcast waves of stereoscopic image data is proposed in PTL 1. In this case, left eye image data and right eye image data that make up the stereoscopic image are transmitted, and stereoscopic image display using binocular disparity is performed at the television receiving device.

FIG. 64 indicates, in a stereoscopic image display that uses binocular disparity, the relation between the display position of the left and right images of the object (physical item) on a screen and the playing position of the stereoscopic image thereof. For example, regarding an object A displayed so that a left image La is shifted to the right side and a right image Ra is shifted to the left side on the screen as illustrated in the diagram, the left and right lines of sight intersect nearer than the screen face, so the playing position of the stereoscopic image thereof is nearer than the screen face.

Also, for example, regarding an object B displayed so that a left image Lb and right image Rb are displayed on the screen at the same position as illustrated in the diagram, the left and right lines of sight intersect nearer on the screen face, so the playing position of the stereoscopic image thereof is on the screen face. Further, for example, regarding an object C displayed so that a left image Lc is shifted to the left side and a right image Rc is shifted to the right side on the screen as illustrated in the diagram, the left and right lines of sight intersect on the far side of the screen face, whereby the playing position of the stereoscopic image thereof is on the far side of the screen face.

CITATION LIST

Patent Literature

PTL 1: Japanese Unexamined Patent Application Publication No. 2005-6114

SUMMARY OF INVENTION

Technical Problem

As described above, with a stereoscopic image display, a viewer uses binocular disparity to recognize perspective of the stereoscopic image. Now, the disparity angle corresponding to the nearest object playing position (disparity angle in the intersecting direction) and the disparity angle corresponding to the farthest object playing position (disparity angle in the same-side direction) needs to be within a predetermined range so as not to harm the health of the viewer. That is to say, the disparity angle is checked at the receiving device, and in the case that the disparity angle herein is not contained within the predetermined range, it is expected that the left eye image and right eye image will be reconfigured so as to fit within the predetermined range.

Also, regarding graphics of an OSD (On-Screen Display), which is displayed overlaid onto an image on a receiving device (set-top box, television receiving device, or the like), or of an application or the like, it is expected that not only in two-dimensional space, but also as three-dimensional perspective, rendering is performed coupled with the stereoscopic image display. In the case that graphics are overlaid onto an image to display on a receiving device, it is expected that disparity adjustment will be performed according to the perspective for each object within the image, and that consistency of perspective will be maintained.

The object of the present technology is to enable favorably performing transmission of related information of image data such as disparity information or the like.

Solution to Problem

A concept of the present technology is in a transmitting apparatus that includes
  a data packet generating unit to generate a data packet made up of a header portion and a content portion; and
  a transmitting unit to correlate the data packet to image data and transmit to an external device,
  wherein the data packet generating unit inserts related information of the image data into the content portion, and inserts identification information to identify the type of the related information into the header portion.

According to the present technology, a data packet consisting of a header portion and content portion is generated by a data packet generating unit. Also, the data packet herein is correlated to image data and transmitted to an external device by the transmitting unit. With the data packet generating unit, related information of the image data is inserted into the content portion, and identification information to identify the type of related information is inserted into the header portion.

For example, with the data packet generating unit, the size of the content portion is determined according to the data amount of the related information inserted in the content portion, and the size information indicating the determined size herein may be inserted in the header portion. For example, with the packet generating unit, the data packet may be generated for each of a predetermined number of pictures of the image data. Now, in the case that the predetermined number is 1, data packets are generated corresponding to all of the pictures.

For example, the image data is left eye image data and right eye image data that configures the stereoscopic image, and the related information is disparity information of the other as to one of the left eye image and right eye image, and is set as representative disparity information for each predetermined region of the picture display screen. For example, in this case, a first disparity information corresponding to the object playing position in the nearest of the predetermined region is included in the representative disparity information for each predetermined region. Also, for example, the first disparity information corresponding to the object playing position in the nearest of the predetermined region and a second disparity information corresponding to the object playing position in the farthest of the predetermined region are included in the representative disparity information for each predetermined region.

Thus, according to the present technology, related information of the image data, for example, disparity information or the like, is inserted in the content portion of the data packet, while the identification information to identify the type of related information is inserted in the header portion of the data packet herein, and transmitted to an external device. Therefore, the related information of the image data such as disparity information or the like can be efficiently transmitted to an external device.

Note that according to the present technology, for example, in the data packet generating unit, the representative disparity information may be inserted in the content portion as absolute value data. In this case, positive and negative coding bits are unnecessary, and the dynamic range of the disparity information can be expanded by just that much.

For example, the transmitting unit may be arranged so that the data packet is inserted into a blanking period of the image data and transmitted to an external device. Also, for example, the transmitting unit may be arranged so that transmission data is generated in increments of video field segments that include horizontal blanking periods and vertical blanking periods segmented by the vertical synchronizing signal, and active video spaces having primary picture regions and auxiliary picture regions, and transmitted to an external device, where image data is distributed to the primary picture regions and data packets are distributed to the auxiliary picture regions.

Also, a concept of the present technology is in a transmitting apparatus that includes
an image data obtaining unit to obtain left eye image data and right eye image data that configures a stereoscopic image;
a disparity information obtaining unit to obtain representative disparity information which is the other disparity information as to one of the left eye image and right eye image, for each predetermined picture of the image data, and which is in each partition region corresponding to a partition pattern of a picture display screen;
a disparity information inserting unit to insert the representative disparity information for each partition region into the video stream obtained by the image data having been encoded; and
an image data transmitting unit to transmit a container of a predetermined format that includes a video stream in which the disparity information has been inserted.

According to the present technology, left eye image data and right eye image data configuring the stereoscopic image is obtained by an image data obtaining unit. Representative disparity information that is the other disparity information as to one of the left eye image and the right eye image, and that is in each partition region corresponding to the partition pattern of the picture display screen, is obtained by the disparity information obtaining unit for each predetermined picture of image data. Also, representative disparity information in each partition region is inserted into the video stream where image data is encoded and obtained, by the disparity information inserting unit.

For example, a pattern selecting unit that selects a predetermined partition pattern from multiple partition patterns may be further provided, where the disparity information obtaining unit may obtain representative disparity information in each partition region corresponding to the predetermined partition pattern selected for the picture display screen. In this case, a user can have a situation where representative disparity information of each partition region from a desired partition pattern is obtained by the selection of the partition pattern.

Also, for example, the first disparity information corresponding to the nearest object playing position in the partition region may be included in the representative disparity information in each partition region. Also, for example, the first disparity information corresponding to the nearest object playing position in the partition region and the second disparity information corresponding to the farthest object playing position in the partition region may be included in the representative disparity information in each partition region.

Also, for example, the disparity information inserting unit may be arranged so that the representative disparity information is inserted in the video stream as absolute value data. In this case, positive and negative coding bits are unnecessary, and the dynamic range of the disparity information can be expanded by an amount equivalent thereto.

Also, yet another concept of the present technology is in a receiving apparatus that includes
an image data receiving unit to receive a container of a predetermined format that includes a video stream,
wherein the video stream is obtained by left eye image data and right eye image data that configure a stereoscopic image having been encoded; and
wherein representative disparity information which is the other disparity information as to one of the left eye image and right eye image, at each partition region corresponding to a partition pattern of a picture display screen, is inserted into the video stream for each picture of the image data;
the receiving apparatus further including
an information obtaining unit that obtains the left eye image data and right eye image data from the video stream included in the container, while obtaining representative information for each partition region of each picture of the image data;
an information smoothing unit that performs smoothing processing in the temporal axis direction as to the representative disparity information for each partition region of each of the picture;
a graphics data generating unit that generates graphics data to display graphics on an image; and
an image data processing unit that uses the image data obtained and the smoothed disparity information and the generated graphics data, appends disparity corresponding to the display position of the graphics for each picture to the graphics that overlay a left eye image and right eye image, and obtains left eye image data onto which the graphics have been overlaid and right eye image data onto which the graphics have been overlaid.

According to the present technology, a container of a predetermined format including video stream is received by an image data receiving unit. The video stream herein is obtained by the left eye image data and right eye image data that configure the stereoscopic image having been encoded. Also, representative disparity information that is the other disparity information as to one of the left eye image and the right eye image obtained corresponding to each of a predetermined number of partition region of the picture display screen, and that is in each partition region corresponding to the partition pattern of the picture display screen, is inserted into the video stream herein for each picture of the image data.

Left eye image data and right eye image data is obtained from the video stream included in the container, while representative disparity information for each partition region of each picture of the image data here is obtained, by the information obtaining unit. Also, processing for smoothing the representative disparity information for each partition basin of each picture in the temporal axis direction is performed by an information smoothing unit. Also, graphics data to display graphics on an image is generated by a graphics data generating unit. The graphics here are graphic such as OSD or applications, or EPG information indicating service content, for example.

The obtained image data and the smoothed disparity information and the generated graphics data are used, and data of the left eye image and right eye image where graphics are overlaid is obtained by the image data processing unit. In this case, disparity corresponding to the display position of the graphics herein is appended to each picture in the graphics that are overlaid onto the left eye image and right eye image, whereby data for the left eye image where graphics are overlaid and data for the right eye image where graphics are overlaid are obtained. For example, in the image data processing unit, the disparity information selected from the disparity information of a predetermined number of disparity regions corresponding to the display position of the graphics, for example optimal disparity information such as a minimum value, is used, and appending the disparity to the graphics herein is performed.

Thus, according to the present technology, depth control of the graphics that are overlaid onto the stereoscopic image and displayed is performed, based on the disparity information inserted into the video stream that is transmitted from the transmitting side. In this case, the representative disparity information of each partition region obtained for each picture of the image data is inserted into the video stream, and depth control of the graphics can be favorable performed with picture (frame) precision. Also, in this case, smoothing processing in the temporal axis direction is performed and used as to the representative disparity information for each partition basin of each picture, whereby even as to sudden changes in the disparity information, the occurrence of viewer discomfort can be reduced.

Advantageous Effects of Invention

According to the present invention, transmission of related information of image data such as disparity information or the like can be performed favorably.

BRIEF DESCRIPTION OF DRAWINGS

FIG. 10 is a diagram illustrating a configuration example (Syntax) and primary prescribed content (semantics) of an AVC video descriptor.

FIG. 11 is a diagram illustrating a configuration example (Syntax) and primary prescribed content (semantics) of an MVC extension descriptor.

FIG. 12 is a diagram illustrating a configuration example (Syntax) and primary prescribed content (semantics) of a graphics depth info descriptor (graphics_depth_info_descriptor).

FIG. 13 illustrates an example of a head access unit of a GOP and an access unit other than a head of a GOP, in the case that the encoding format is AVC.

FIG. 14 is a diagram illustrating a configuration example (Syntax) of "depth_information SEI message" and configuration example (Syntax) of "depth_information_data( )".

FIG. 16 is a diagram illustrating a configuration example (Syntax) of "depth_information( )" in the case of inserting disparity information for each picture in picture increments.

FIG. 17 is a diagram illustrating a configuration example (Syntax) of "depth_information( )" in the case of inserting disparity information for each picture in picture increments.

FIG. 18 is a diagram illustrating content (Semantics) of primary information in the configuration example (Syntax) of "depth_information( )".

FIG. 19 is a diagram illustrating a partitioning example of a picture display screen.

FIG. 20 is a diagram illustrating a configuration example (Syntax) of "depth_information( )" in the case that disparity information for each picture is encoded for multiple pictures together.

FIG. 21 is a diagram illustrating a configuration example (Syntax) of "depth_information( )" in the case that disparity information for each picture is encoded for multiple pictures together.

FIG. 22 is a diagram illustrating a configuration example (Syntax) of "depth_information( )" in the case that disparity information for each picture is encoded for multiple pictures together.

FIG. 23 is a diagram illustrating a configuration example (Syntax) of "user_data( )" and a configuration example (Syntax) of "depth_information_data( )".

FIG. 38 is a block diagram illustrating a configuration example of a television receiving device (HDMI input system).

FIG. 39 is a block diagram to describe the control of the depth control unit.

FIG. 40 is a flowchart illustrating an example of the sequence of the control processing of the depth control unit.

FIG. 41 is a diagram illustrating a depth control example of graphics on a television receiving device.

FIG. 43 is a diagram illustrating a configuration example of TMDS transmission data (in the case that image data having 1920 horizontal pixels by 1080 vertical lines is transmitted).

FIG. 44 is a diagram illustrating a packet configuration example of an HDMI Vendor Specific InfoFrame, in the case that HDMI Vendor Specific InfoFrame is used in the transmission of disparity information.

FIG. 45 is a diagram illustrating content of primary information in the packet configuration example of the HDMI Vendor Specific InfoFrame.

FIG. 46 is a diagram illustrating a configuration example of VS_Info, in the case that the mode is for single picture, and the partition region is "16".

FIG. 51 is a diagram illustrating another packet configuration example of VS_Info (HDMI Vendor Specific InfoFrame).

FIG. 52 is a diagram illustrating another packet configuration example of VS_Info (HDMI Vendor Specific InfoFrame).

FIG. 56 is a diagram illustrating a configuration example of a packet header of a 3D displaying support packet as the data packet that is newly defined.

FIG. 57 is a diagram illustrating a configuration example of packet contents.

FIG. 58 is a diagram illustrating another configuration example of packet contents.

FIG. 59 is a diagram illustrating another configuration example of packet contents.

FIG. 61 is a diagram illustrating an example of a packet configuration of the HDMI Vendor Specific InfoFrame, in the case of using an active space region.

DESCRIPTION OF EMBODIMENTS

Figure 1:
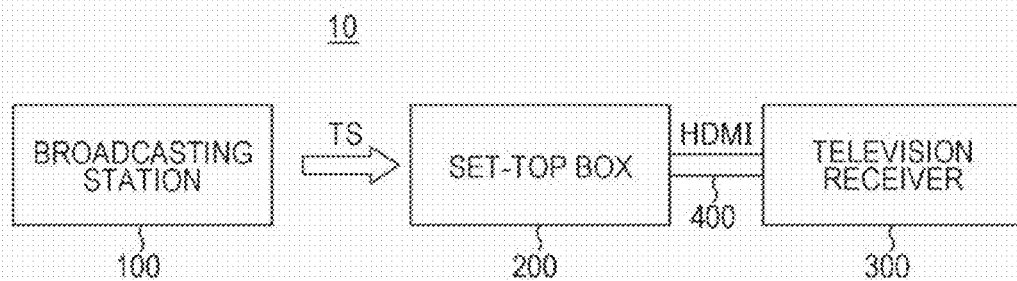
FIG. 1 is a block diagram illustrating a configuration example of an image transmitting/receiving system according to an embodiment.

Embodiments to realize the invention (hereinafter called "embodiments") will be described below. Note that descriptions will be given in the order below.
1. Embodiment
2. Modifications 1. Embodiment Image Transmitting/Receiving System FIG. 1 illustrates a configuration example of an image transmitting/receiving system 10 as an embodiment. The image transmitting/receiving system 10 has a broadcast station 100, a set-top box (STB) 200, and a television receiving device 300 serving as a monitor. The set-top box 200 and television receiving device (TV) 300 are connected via an HDMI (High Definition Multimedia Interface) cable 400.

"Description of Broadcast Station"

The broadcast station 100 transmits a transport stream TS as a container on broadcast waves. The video stream obtained by left eye image data and right eye image data which make up a stereoscopic image having been encoded is included in this transport stream TS. For example, the left eye image data and right eye image data are transmitted in one video stream. In this case, for example, the left eye image data and right eye image data are subjected to interleaving processing, configured as image data of a side-by-side format or top-and-bottom format, and included in one video stream.

Alternatively, for example, the left eye image data and right eye image data are each transmitted in separate video streams. In this case, for example, the left eye image data is included in a MVC base view stream, and the right eye image data is included in a MVC non-base view stream.

Other disparity information (Disparity data) as to one of the left eye image and right eye image, obtained for each predetermined picture of the image data, is inserted into the video stream, in this case, obtaining the disparity information presupposes that at least the disparity information is performed with pictures that should be transmitted.

Now, the disparity information for each picture is made of representative disparity information in the predetermined regions of the picture display screen. According to this embodiment, first disparity information and second disparity information are included as this representative disparity information, but only the first disparity information being included may also be conceived. The first disparity information is disparity information corresponding to the nearest object playing position in the predetermined region of the picture display screen. Also, the second disparity information is disparity information corresponding to the farthest object playing position in the predetermined region of the picture display screen.

Figure 64:
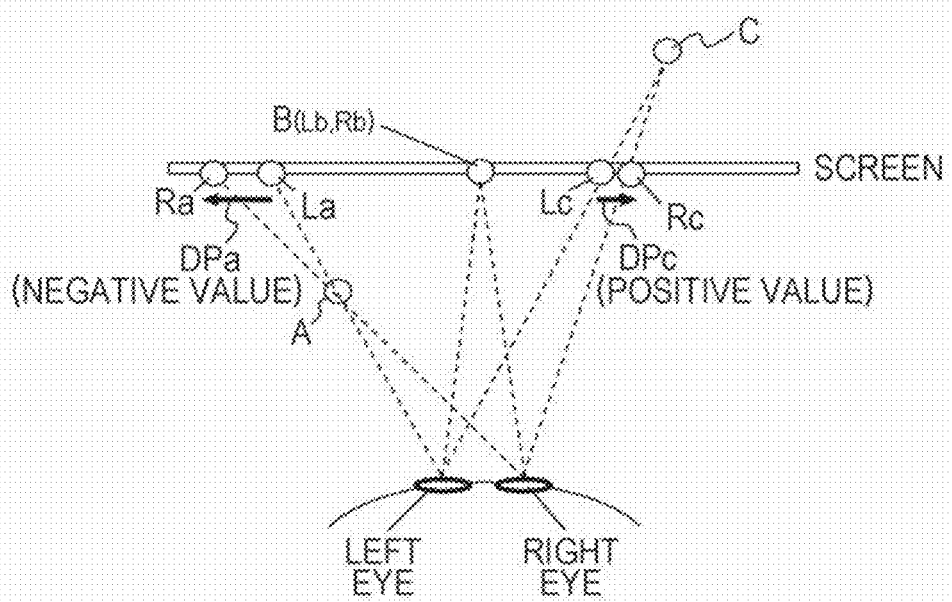
FIG. 64 is a diagram illustrating the relation between the display positions of the left and right images of an object on a screen and the playing position of the stereoscopic image thereof, in a stereoscopic image display that uses binocular disparity.

If the screen position is at disparity zero, in the case that the object playing position is on the near side of the screen, the disparity information herein can be obtained with a negative value (see DPa in FIG. 64). On the other hand, in the case that the object playing position is on the far side of the screen, the disparity information herein can be obtained with a positive value (see DPc in FIG. 64). Therefore, as the first disparity information, for example, of the disparity information in the predetermined regions, the minimum value disparity information may be used. Also, as the second disparity information, for example, of the disparity information in the predetermined regions, the maximum value disparity information may be used.

In this case, as the first disparity information and second disparity information, for example, the following obtain methods may be conceived.

(1) First disparity information in each partition region obtained by partitioning the picture display screen into a plurality is obtained, and second disparity information of the entire picture display screen is obtained, based on partition pattern information.

(2) First disparity information and second disparity information in each partition region obtained by partitioning the picture display screen into a plurality are obtained, based on partition pattern information.

(3) First disparity information in each partition region obtained by partitioning the picture display screen with first partitioning information is obtained, and second disparity information in each partition region obtained by partitioning the picture display screen with second partitioning information is obtained, based on partition pattern information.

(4) First disparity information in the entire picture display screen is obtained, and second disparity information in the entire picture display screen is obtained, based on partition pattern information.

Figure 2:
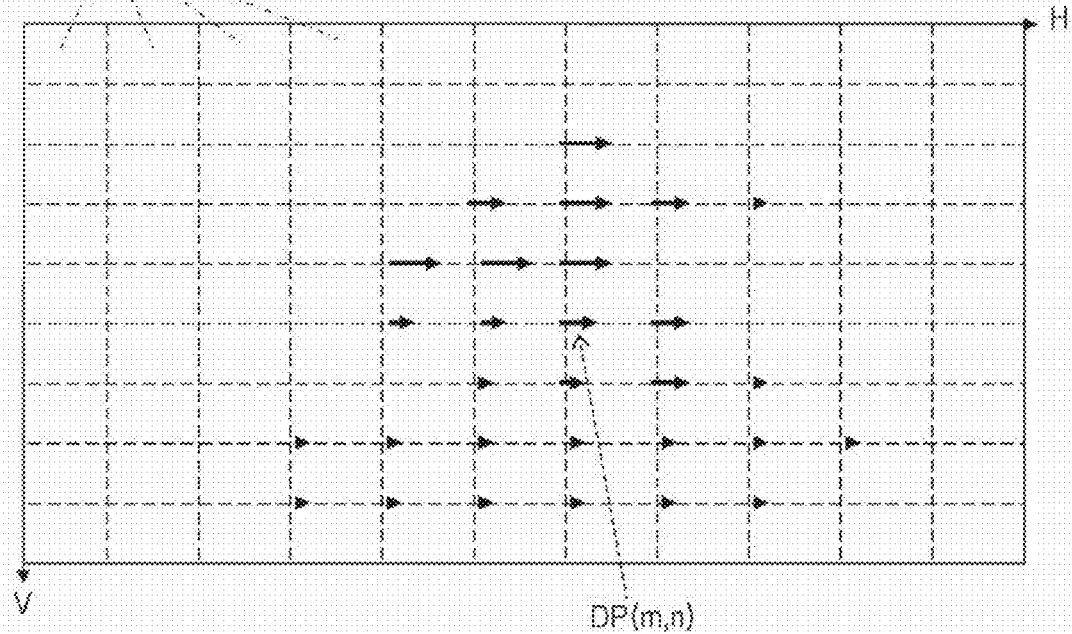
FIG. 2 is a diagram illustrating an example of disparity information (disparity vectors) for each block.

The disparity information in the entire picture display screen or in each partition region is obtained by the disparity information for each block being subjected to downsizing processing. FIG. 2 illustrates and example of disparity information (disparity vector) for each block.

Figure 3:
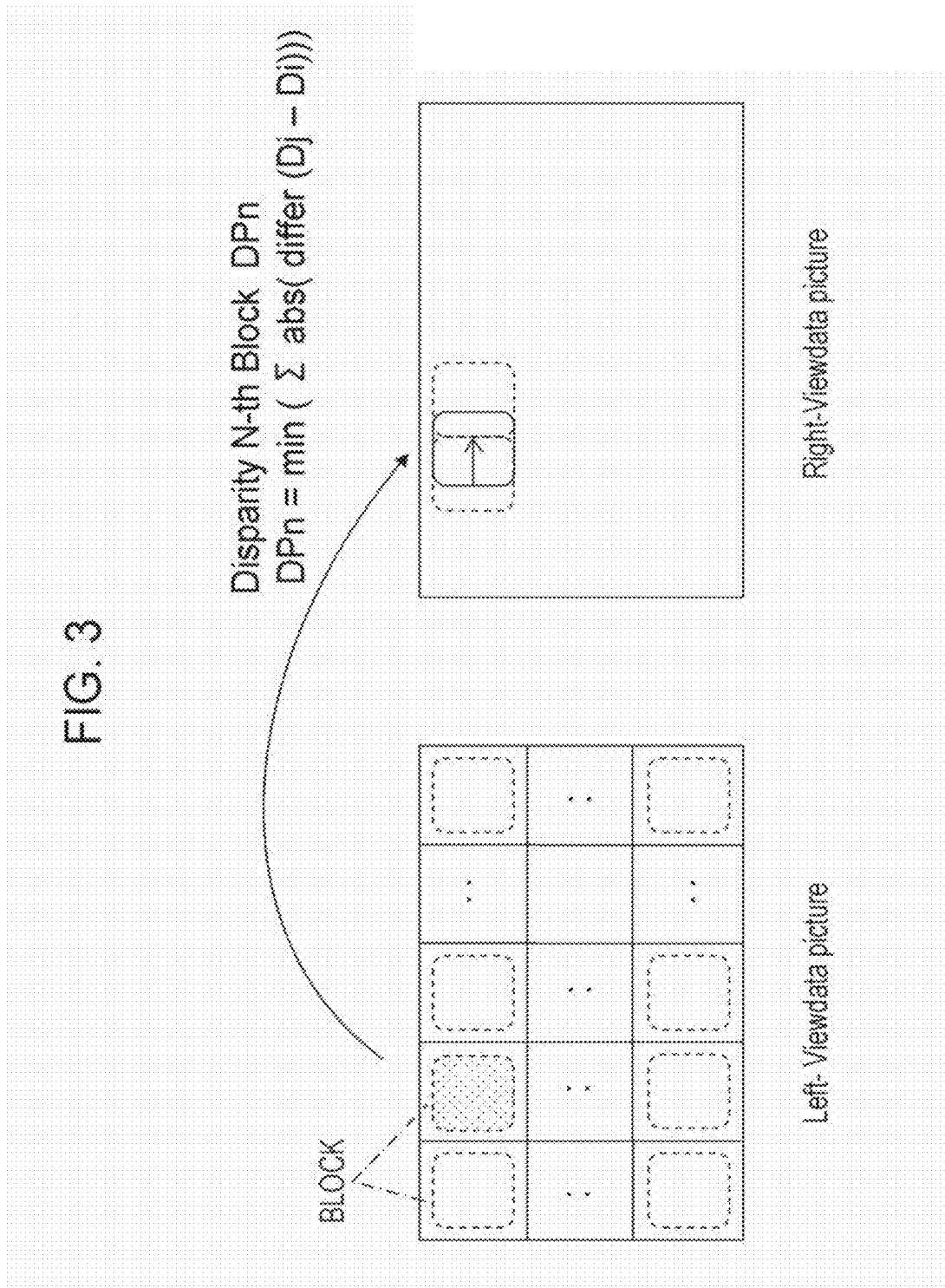
FIG. 3 is a diagram to describe an example of a generating method of disparity information in increments of blocks.

FIG. 3 illustrates an example of a generating method for disparity information in block increments. This example is an example to find disparity information that indicates a right eye view (Right-View) from a left eye view (Left-View). In this case, a pixel block (disparity detection block) such as 4*4, 8*8, or 16*16, for example, is provided to the picture of the left eye view.

As illustrated in the diagram, the picture of the left eye view is set as a detection image, the picture of the right eye view is set as a reference image, and block searching is performed for the picture of the right eye view so that the sum of absolute differences between pixels is the smallest, for each block of the picture of the left eye view, whereby disparity data is found.

That is to say, the disparity information DPn of the N'th block is found by block searching so that the difference absolute value sum in the N'th block herein is minimum, as shown in the Expression (1) below, for example. Note that in Expression (1) herein, Dj indicates the pixel value in the picture of the right eye view, and Di indicates the pixel value in the picture of the left eye view.

$$DPn = \min(\Sigma abs(\text{differ}(Dj-Di))) \qquad (1)$$

Figure 4:
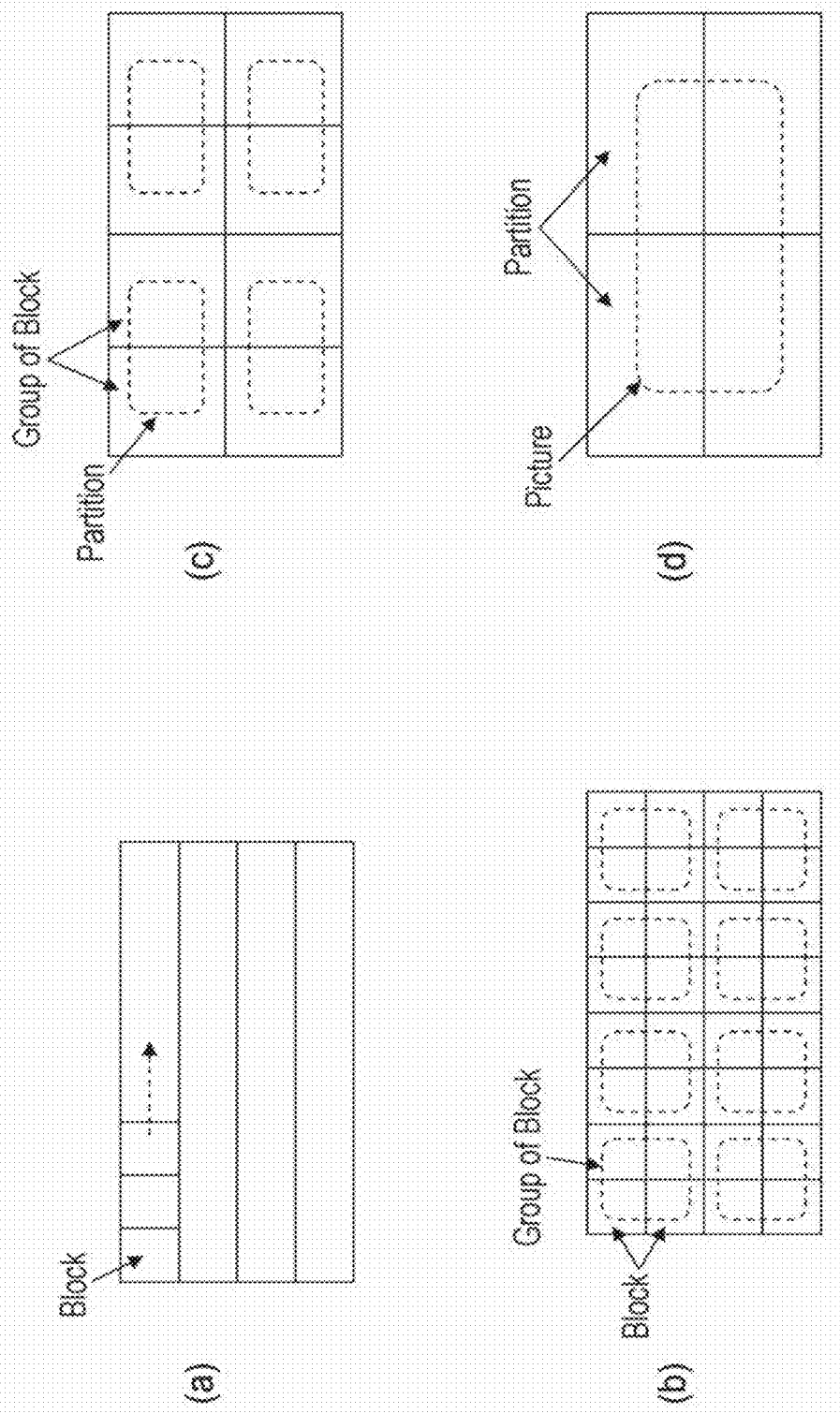
FIG. 4 is a diagram to describe an example of downsizing processing which is in order to obtain disparity information of predetermined divided regions from the disparity information for each block.

FIG. 4 illustrates an example of downsizing processing. FIG. 4(a) illustrates disparity information for each block obtained as described above. Based on this disparity information for each block, first disparity information and second disparity information for each group (Group of Block) is found, as illustrated in FIG. 4(b). A group is a hierarchical level above a block, and is obtained by grouping multiple adjacent blocks. In the example in FIG. 4(b), each group is made up of four blocks bundled together with a broken-line frame. Also, the first disparity information of each group is obtained by the disparity information of the minimum value being selected from the disparity information of all of the blocks within the group thereof, for example. Also, the second disparity information of each group is obtained by the disparity information of the maximum value being selected from the disparity information of all of the blocks within the group thereof, for example.

Next, based on the disparity vectors for each group, the first disparity information and second disparity information for each partition is found, as illustrated in FIG. 4(c). A partition is a hierarchical level above a group, and is obtained by grouping together multiple adjacent groups. In the example in FIG. 4(c), each partition is made up of two groups bundled together with a broken-line frame. Also, the first disparity information of each partition is obtained by the minimum value first disparity information being selected from the first disparity information of the entire group within the partition thereof, for example. Also, the second disparity information of each partition is obtained by the maximum value second disparity information being selected from the second disparity information of the entire group within the partition thereof, for example.

Next, based on this disparity information for each partition, the first disparity information and second disparity information for the entire picture (entire picture display screen), which is the uppermost hierarchical level, is found, as illustrated in FIG. 4(d). In the example in FIG. 4(d), four partitions bundled together with a broken-line frame are included in the entire picture. Also, the first disparity information of the entire picture is obtained by the minimum value first disparity information being selected from the first disparity information of all of the partitions included in the entire picture, for example. Also, the second disparity information of the entire picture is obtained by the maximum value second disparity information being selected from the second disparity information of all of the partitions included in the entire picture, for example.

Figure 5:
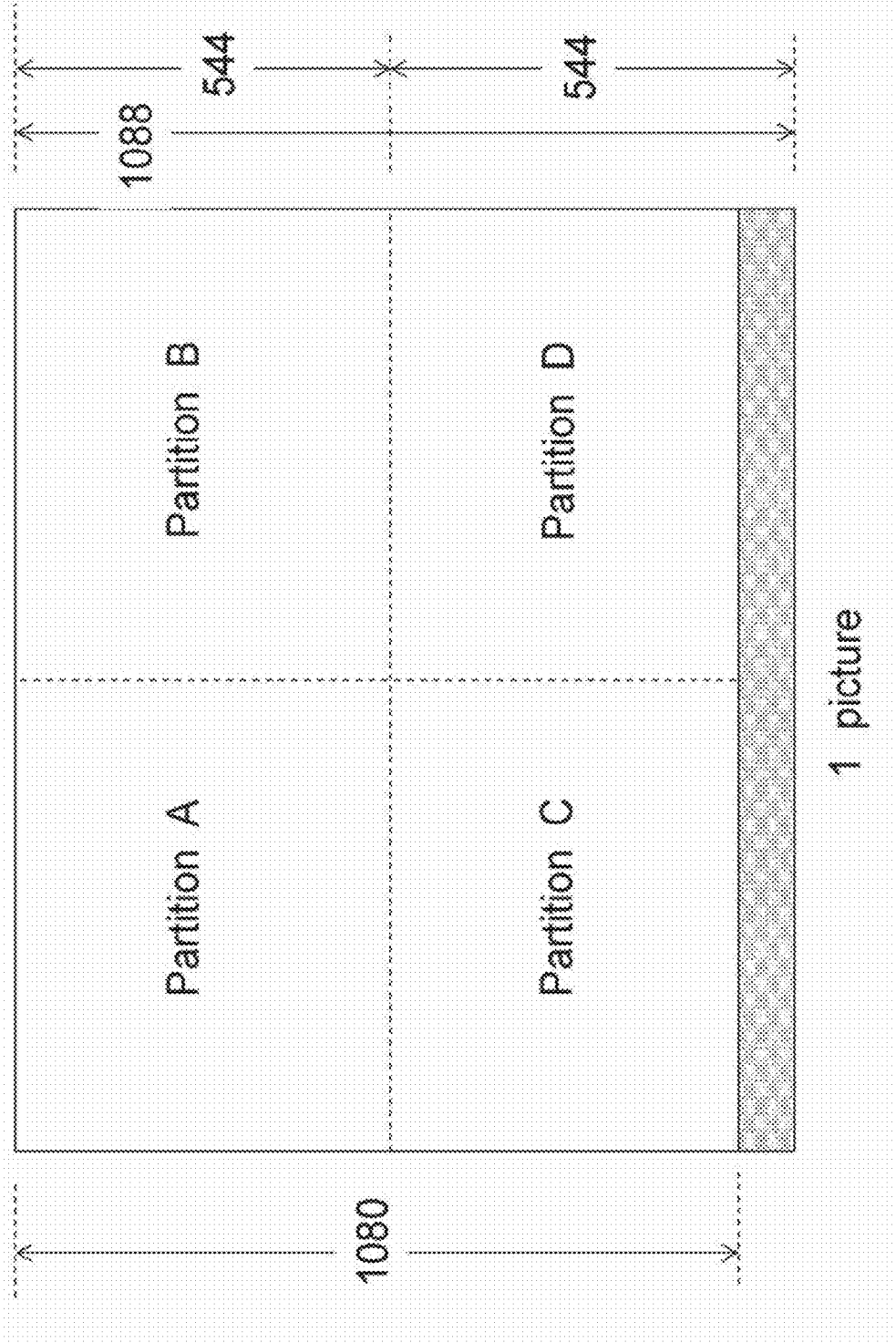
FIG. 5 is a diagram to describe a picture display screen being divided so that encoded block borders are not straddled.

The picture display screen is partitioned based on the partition information, and the disparity information for each partition region is obtained as described above. In this case, the picture display screen is partitioned so that the encoded block borders are not straddled. FIG. 5 illustrates a partition detail example of a picture display screen. This example is an example of a 1920*1080 pixel format, and is an example where partitions are in two each horizontally and vertically, whereby four partition regions of Partition A, Partition B, Partition C, and Partition D are obtained. On the transmitting side, encoding is performed for each block of 16×16, whereby eight lines made up of blank data are appended, and encoding is performed as image data of 1.920 pixels*1088 lines. Now, in the vertical direction, partitioning is done into two, based on the 1088 lines.

Figure 6:
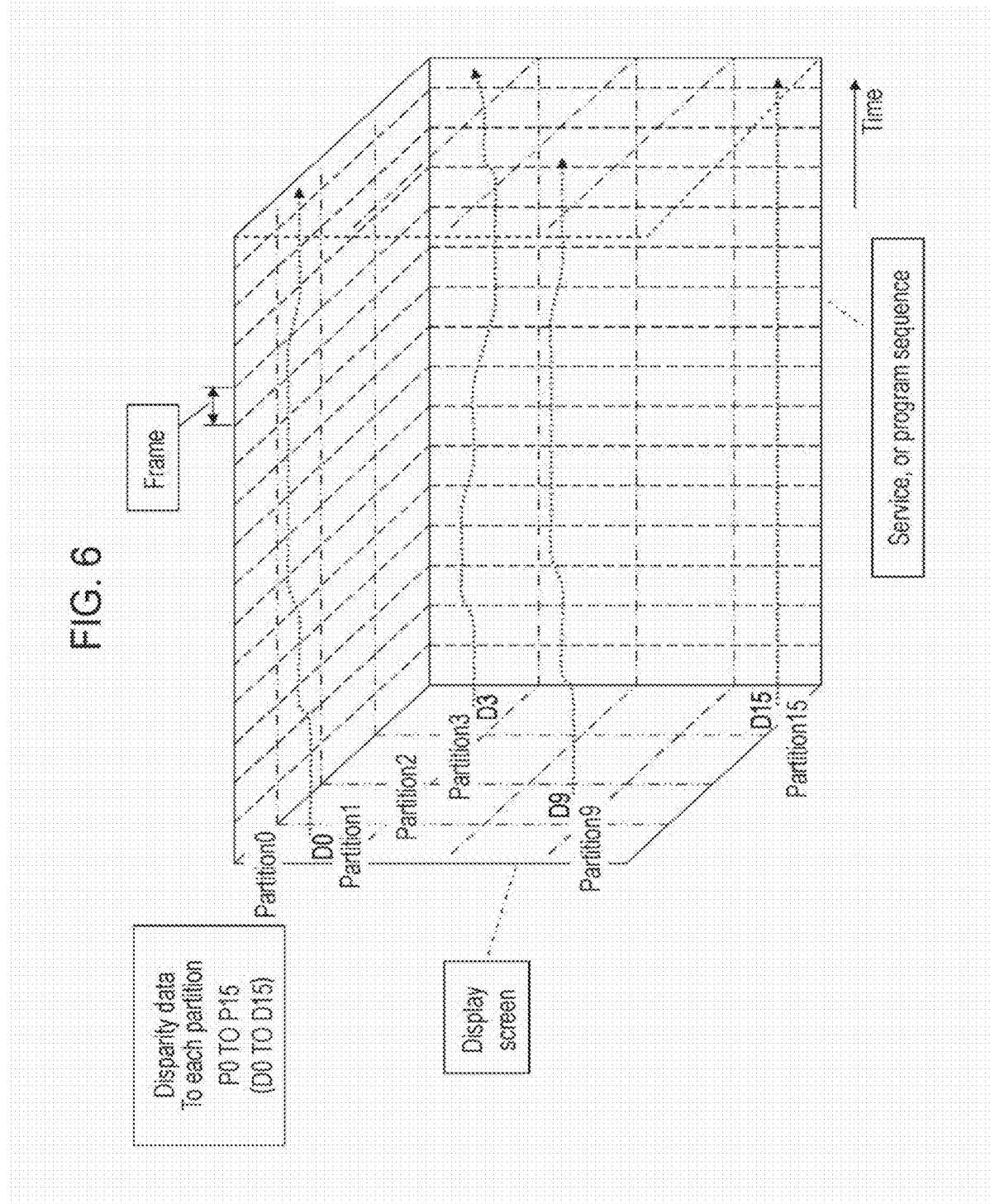
FIG. 6 is a diagram schematically illustrating an example of transition of disparity information of each partition region for each picture.

As described above, the disparity information (first disparity information, second disparity information) of the entire picture display screen of the partition regions obtained for each predetermined picture (frame) of the image data is inserted in the video stream. FIG. 6 schematically illustrates a shifting example of disparity information of each partition region. This example is an example where partitions are in four each horizontally and vertically, whereby sixteen partition of Partition 0 through Partition 1.5 exist. In this example, for simplification of the diagram, only the shifting of the disparity information D0, D3, D9, and D15 of Partition 0, Partition 3, Partition 9, and Partition 15 are illustrated. There are cases where the each value of disparity information may change with time, (D0, D3, D9) and cases where the values are fixed (D15).

Figure 7:
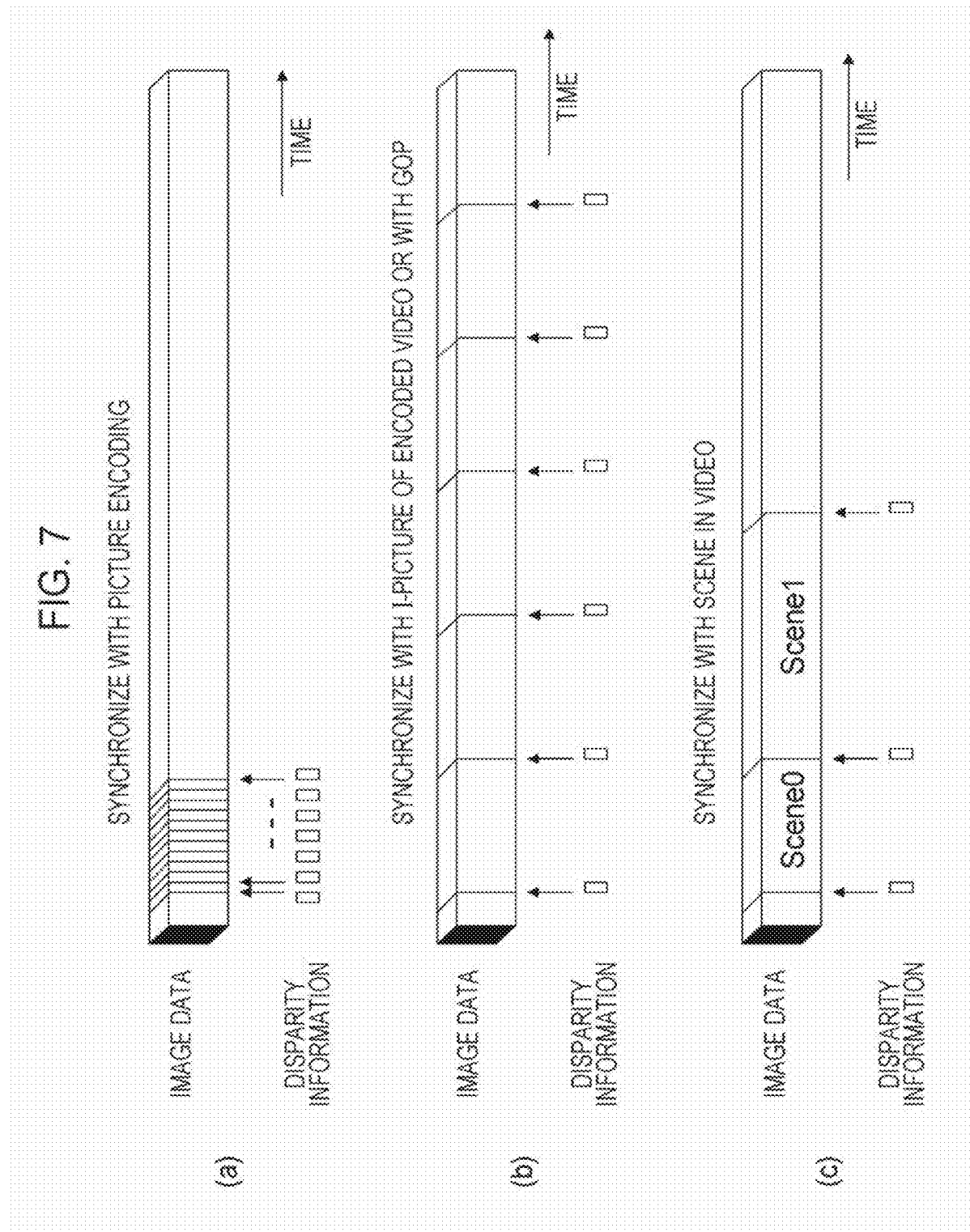
FIG. 7 is a diagram to describe the timing for inserting disparity information obtained for each picture of the image data into the video stream.

The disparity information obtained for each predetermined picture of the image data is inserted into the video stream in picture increments or GOP increments or the like. FIG. 7(a) illustrates an example of synchronizing with the picture encoding, i.e. an example of inserting disparity information into the video stream in picture increments. In this example, delays in the event of transmitting the image data may be fewer, so is appropriate to live broadcasting that transmits image data imaged by a camera.

FIG. 7(b) illustrates an example of synchronizing with an I-picture (Intra picture) of the encoded video or a GOP (Group Of Pictures), i.e. an example of inserting the disparity information into the video stream in GOP increments. In this example, delays in the event of transmitting the image data may increase as compared to the example in FIG. 7(a), but disparity information for multiple pictures (frames) can be transmitted together, whereby the number of processing times to obtain the disparity information on the receiving side can be reduced. FIG. 7(c) illustrates an example of synchronizing with a video scene, i.e. an example of inserting the disparity information into the video stream in scene increments. Note that FIGS. 7(a) through (c) are examples, and inserting in other increments may also be conceived.

Also, identification information to identify whether or not disparity information (first disparity information, second disparity information) has been inserted in the video stream may be inserted into a layer of the transport stream TS. This identification information is inserted beneath a program map table (PMT) included in the transport stream TS or beneath an event information table (EIT), for example. With this identification information, determination can be made readily on the receiving side as to whether or not disparity information has been inserted into the video stream. Details of this identification information will be described later.

"Configuration Example of Transmission Data Generating Unit"

Figure 8:
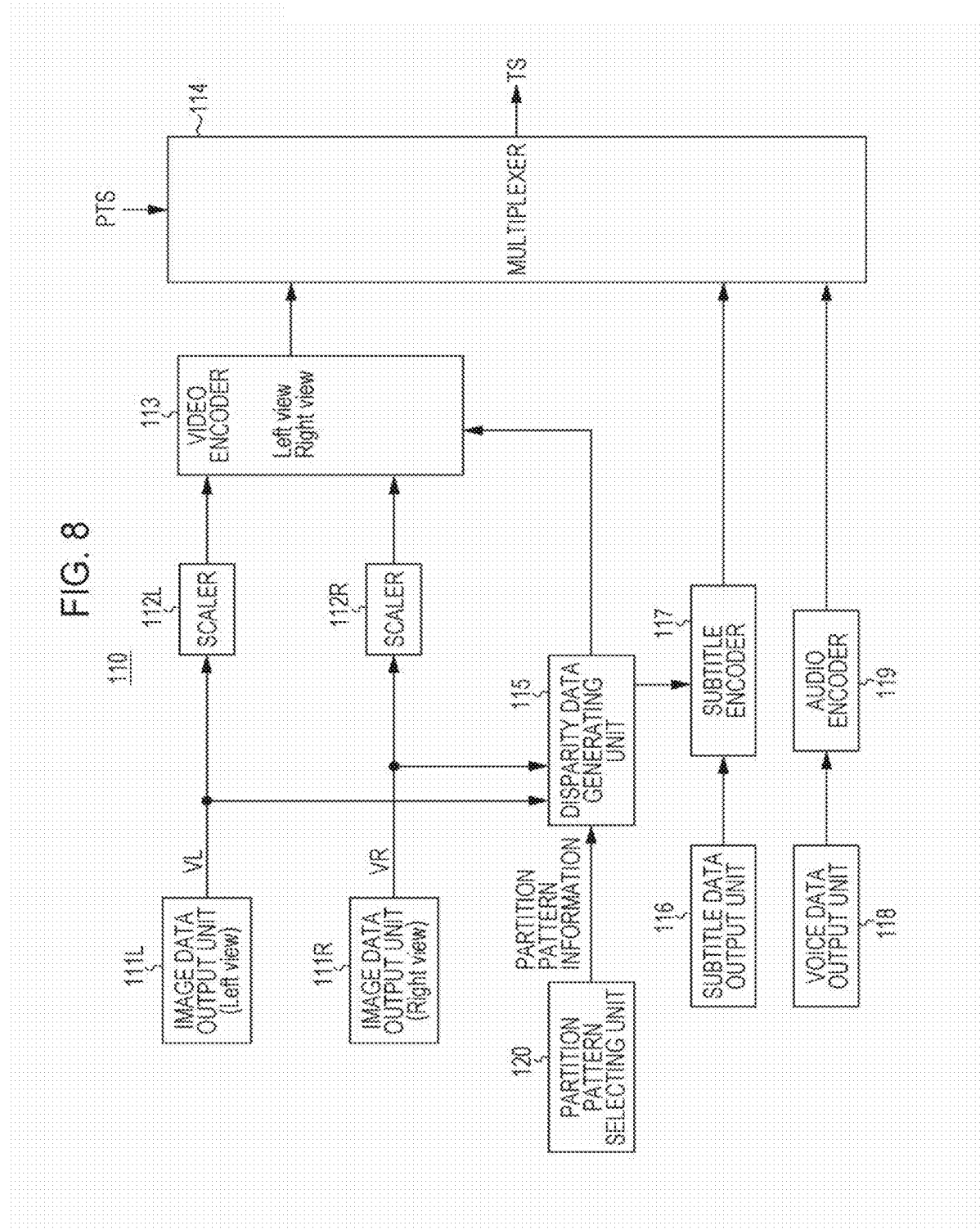
FIG. 8 is a block diagram illustrating a configuration example of transmission data generating unit to generate a transport stream at a broadcast station.

FIG. 8 illustrates a configuration example of a transmission data generating unit 110 that generates the above-described transport stream TS at the broadcast station 100. This transmission data generating unit 110 has image data output units 111L and 111R, scalers 112L and 112R, video encoder 113, multiplexer 114, and disparity data generating unit 115. Also, this transmission data generating unit 110 has a subtitle data output unit 116, subtitle encoder 117, audio data output unit 118, audio encoder 119, and partition pattern selecting unit 120.

The image data output units 111L and 111R output left eye image data VL and right eye image data VR, respectively, that make up the stereoscopic image. The image data output units 111L and 111R are made up of a camera that images a subject and outputs image data or an image data readout unit that reads out image data and outputs from a storage medium, or the like, for example. The image data VL and VR are image data of a size that is full-HD of 1920*1080, for example.

The scalers 112L and 112R perform scaling processing in the horizontal direction and vertical direction as needed, as to the image data VL and VR, respectively. For example, in order to transmit the image data VL and VR in one video stream, in the case of configuring the image data with a side-by-side format or top-and-bottom format, the image data is scaled down to ½ in the horizontal direction or the vertical direction, and is output. Also, for example, in the case of transmitting the image data VL and VR in individual video streams such as an MVC base view stream and non-base view stream, respectively, scaling processing is not performed, and the image data VL and VR is output without change.

The video encoder 113 performs encoding such as MPEG4-AVC (MVC), MPEG2video, or HEVC (High Efficiency Video Coding) or the like, for example, as to the left eye image data and right eye image data output from the scalers 112L and 112R, thereby obtaining encoded video data. Also, this video encoder 113 generates a video stream including the encoded data herein with a stream formatter (unshown) that is provided at a later stage. In this case, the video encoder 113 generates one or two video streams (video elementary streams) that include an encoded video stream of the left eye image data and right eye image data.

The disparity data generating unit 115 generates disparity information for each picture (frame) based on the left eye image data VL and right eye image data VR that is output from the image data output units 111L and 111R. In this case, the disparity data generating unit 115 performs processing to obtain the first disparity information and second disparity information, based on information of the partition pattern selected with the partition pattern selecting unit 120 according to operations by the user, for example.

First, the disparity data generating unit 115 obtains disparity information for each block as described above, for each picture. Note that in the case that the image data output units 111L and 111R are image data readout units that have a storage medium, a configuration can be conceived wherein the disparity data generating unit 115 reads out and obtains the disparity information for each block together with the image data from the storage medium. Also, a method may be conceived to use the results from block matching that is performed between the right eye image data and left eye image data in the video encoder 113, and to detect disparity information.

Subsequently, the disparity information generating unit 115 performs downsizing processing as to the disparity information for each block, and generates the first disparity information and second disparity information of the entire picture display screen or each partition region obtained by partitioning the picture display screen. In this event, the partition pattern information described above is used. With this partition pattern information, information is provided to the disparity data generating unit 115, such as generating disparity information over the entire picture display screen, or generating disparity information in each partition region obtained by partitioning the picture display screen by a predetermined number, or the like.

The video encoder 113 inserts the first disparity information and second disparity information for each picture generated by the disparity data generating unit 115 into the video stream. In this case, for example, the disparity information for each picture is inserted in the video stream in picture increments or in GOP increments (see FIG. 7). Note that in the case that the left eye image data and right eye image data are each transmitted with separate video data, insertion may be into just one of the video streams.

The subtitle data output unit 116 outputs the data of subtitles that overlay the image. The subtitle data output unit 116 is made up of a personal computer or the like, for example. The subtitle encoder 117 generates the subtitle stream (subtitle elementary stream) that includes the subtitle data output from the subtitle data output unit 116. Note that the subtitle encoder 117 references the disparity information for each block that is generated by the disparity data generating unit 115, and appends disparity information corresponding to the display position of the subtitle to the subtitle data. That is to say, subtitle data included in the subtitle stream holds disparity information corresponding to the display position of the subtitle.

The audio data output unit 118 outputs audio data corresponding to the image data. This audio data output unit 118 is made up of a microphone or an audio data readout unit or the like that reads and outputs audio data from a storage medium, for example. The audio encoder 119 performs encoding such as MPEG-2Audio, AAC, or the like as to the audio data output from the audio data output unit 118, and generates an audio stream (audio elementary stream).

The multiplexer 114 subjects each elementary stream generated by the video encoder 113, subtitle encoder 117, and audio encoder 119 to PES packetizing, and generates a transport stream TS. In this case, a PTS (Presentation Time Stamp) is inserted into each the header of each PES (Packetized Elementary Stream) packet for synchronized playing on the receiving side.

The multiplexer 114 inserts the above-described identification information in a layer of the transport stream TS. This identification information is information to identify whether or not disparity information (first disparity information, second disparity information) has been inserted in the video stream. This identification information is inserted beneath a program map table (PMT) included in the transport stream TS or beneath an event information table (EIT) or the like, for example.

Operations of the transmission data generating unit 110 illustrated in FIG. 8 will be briefly described. The left eye image data VL and right eye image data VR that configure the stereoscopic image output from the image data output units 111L and 111R are supplied to the scalers 112L and 112R, respectively. Scaling processing in the horizontal direction and vertical direction is performed as needed as to the image data VL and VR, with the scalers 112L and 112R, respectively. The left eye image data and right eye image data output from the scalers 112L and 112R are supplied to the video encoder 113.

With the video encoder 113, encoding such as MPEG4-AVC (MVC), MPEG2video, and HEVC or the like, for example, is performed as to the left eye image data and right eye image data, and encoded video data is obtained. Also, with this video encoder 113, a video stream that includes this encoded data is generated by a stream formatter which will be provided at a later stage. In this case, one or two video streams that include the encoded video data of the left eye image data and right eye image data are generated.

Also, the left eye image data VL and right eye image data VR that configure the stereoscopic image output from the image data output units 111L and 111R is supplied to the disparity data generating unit 115. With this disparity data generating unit 115, disparity information for each block is obtained for each picture. Also, with this disparity data generating unit 115, further, downsizing processing is performed as to the disparity information for each block, and first disparity information and second disparity information is generated in each partition region obtained by partitioning the entire picture display screen or the picture display screen, based on the partition pattern information.

The first disparity information and second disparity information for each picture that is generated by the disparity data generating unit 115 is supplied to the video encoder 113. With the video encoder 113, the first disparity information and second disparity information for each picture is inserted into the video stream in picture increments or in GOP increments.

Also, the data of the subtitles that overlay onto the image is output by the subtitle data output unit 116. This subtitle data is supplied to the subtitle encoder 117. A subtitle stream that includes the subtitle data is generated by the subtitle encoder 117. In this case, the disparity information for each block generated with the disparity data generating unit 115 is referenced at the subtitle encoder 117, and disparity information corresponding to the display position is appended to the subtitle data.

Also, audio data corresponding to the image data is output by the audio data output unit 118. This audio data is supplied to the audio encoder 119. Encoding such as MPEG-2Audio, AAC, and the like is performed as to the audio data with this audio encoder 119, and the audio stream is generated.

The video stream obtained with the video encoder 113, the subtitle stream obtained with the subtitle encoder 117, and the audio stream obtained with the audio encoder 119 are each supplied to the multiplexer 114. The elementary stream supplied from each encoder is subjected to PES packetizing and multiplexed by the multiplexer 114, and a transport stream TS is generated. In this case, PTS is inserted into each of the PES headers for synchronized playing on the receiving side. Also, in the multiplexer 114, identification information to identify whether or not disparity information has been inserted into the video stream is inserted beneath a PMT or beneath an EIT, or the like.

[Identification Information, Configuration of Disparity Information, TS Configuration]

Figure 9:
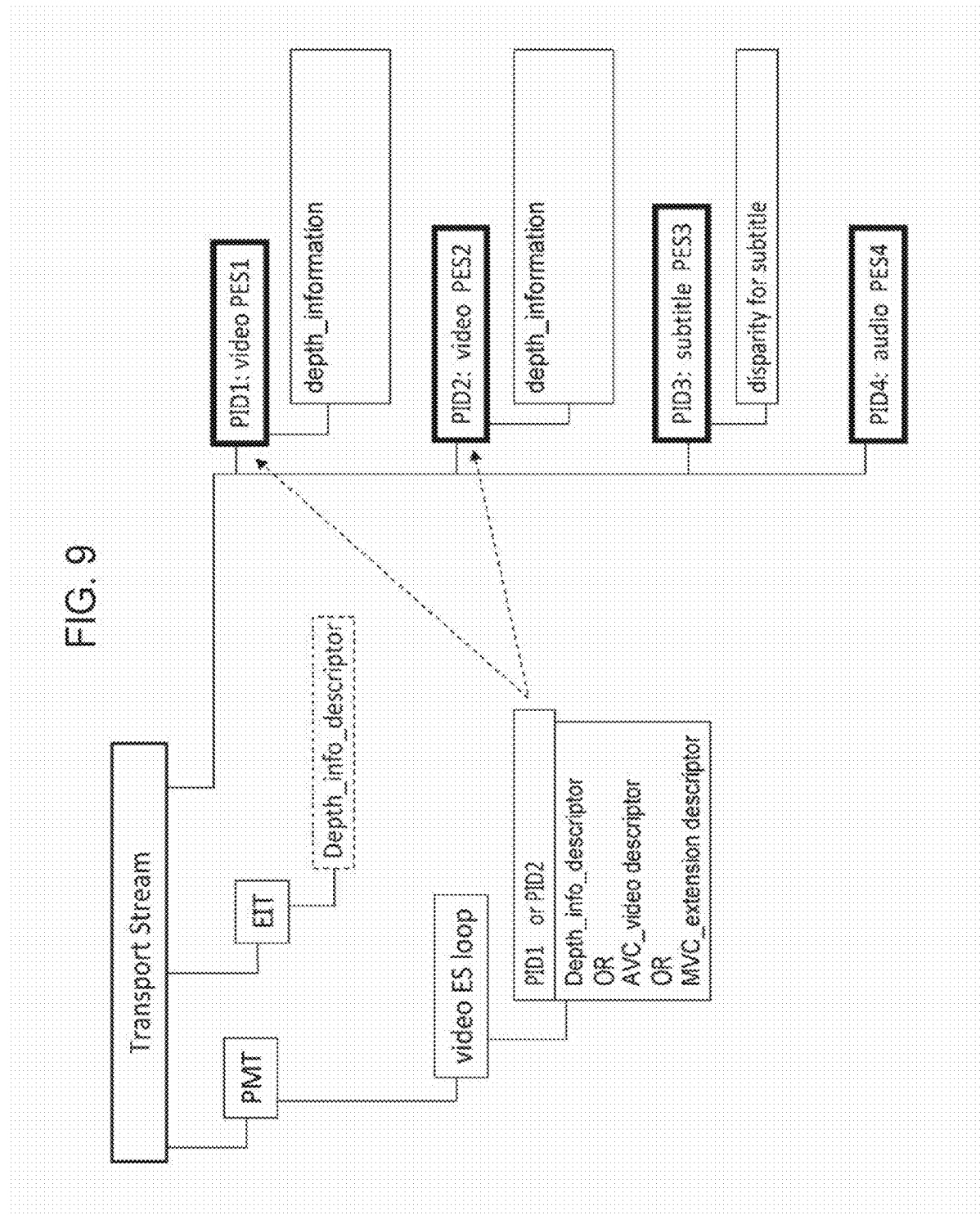
FIG. 9 is a diagram illustrating a configuration example of a transport stream.

FIG. 9 illustrates a configuration example of a transport stream TS. In this configuration example, an example is illustrated where left eye image data and right eye image data are each transmitted in separate video streams. That is to say, a PES packet "video PES1" of a video stream in which left eye image data is encoded and a PES packet "video PES2" of a video stream in which right eye image data is encoded are included. Also, a PES packet "subtitle PES3" of a subtitle in which subtitle data (including disparity information) is encoded and a PES packet "audio PES4" of an audio stream in which audio data is encoded, is included in this configuration example.

Depth information/SEI (depth_information( )) that includes the first disparity information and second disparity information for each picture is inserted in a user data region of the video stream. For example, in the case that disparity information for each picture is inserted in picture increments, this depth information/SEI is inserted into the user data region of each picture in the video stream. Also, for example, in the case that the disparity information for each picture is inserted in GOP increments, this depth information/SEI is inserted into the user data region of the picture that corresponds to the head of the GOP of the video stream or the position where the sequence parameter information is inserted. Note that in the illustration of this configuration example, depth information/SEI is inserted into both of two video streams, but insertion may be into only one of the video streams.

A PMT (Program Map Table) is included as a PSI (Program Specific information) in the transport stream TS. This PSI is information that indicates the program to which each elementary stream included in the transport stream TS belongs. Also, an EIT (Event information Table) serving as an SI (Serviced Information) that performs managing in event increments is included in the transport stream TS.

An elementary loop having information that is related to each elementary stream exists beneath the PMT. Information such as a packet identifier (PID) for each stream is disposed on this elementary loop, while a descriptor that describes information related to the elementary stream is also disposed.

In the case of inserting identification information illustrating whether or not disparity information (first disparity information, second disparity information) is inserted into the above-described video stream, this is described in a descriptor that is inserted beneath the video elementary loop of the program map table, for example. This descriptor is, for example, an existing AVC video descriptor or MVC extension descriptor (MVC_extension_descriptor), or is a newly defined depth info descriptor (Depth_info_descriptor). Note that regarding the depth info descriptor, inserting beneath the EIT as described with broken lines in the diagram may also be conceived.

FIG. 10(a) illustrates a configuration example (Syntax) of an AVC video descriptor in which identification information is described. This descriptor can be applied in the case that the video is in MPEG4-AVC Frame compatible format. This descriptor itself is already in the specifications of H.264/AVC. Now, one-bit flag information of "depth_info_not_existed_flag[0]" is newly defined in this descriptor.

This flag information indicates whether or not the depth information/SEI (depth_informtion_sei( )) that includes disparity information for each picture is inserted into the corresponding video stream, as illustrated in the specification content (semantics) in FIG. 10(b). When this flag information is "0", this indicates insertion. On the other hand, when this flag information is "1", this indicates no insertion.

FIG. 11(a) illustrates a configuration example (Syntax) of the MVC extension descriptor in which identification information is described. This descriptor can be applied in the case that the video is in MPEG4-AVC Annex HMVC format. This descriptor itself is already in the specifications of H.264/AVC. Now, one-bit flag information of "depth_info_not_existed_flag" is newly defined in this descriptor.

This flag information indicates whether or not depth information/SEI (depth_information( )) that includes disparity information for each picture is inserted in the corresponding video stream, as illustrated in the specification content (semantics) in FIG. 11(b). When this flag information is "0", this indicates insertion. On the other hand, when this flag information is "1", this indicates no insertion.

FIG. 12(a) illustrates a configuration example (Syntax) of the depth info descriptor (depth_info_descriptor). An 8-bit field of "descriptor tag" indicates that this descriptor is a "depth_info_descriptor". Numbers of data bytes thereafter are indicated in the 8-bit field of "descriptor_length". Also, 1-bit flag information of "depth_info_not-existed_flag" is described in this descriptor.

This flag information indicates whether or not depth information/SEI (depth_information( )) that includes disparity information for each picture is inserted in the corresponding video stream, as illustrated in the specification content (semantics) in FIG. 12(b). When this flag information is "0", this indicates insertion. On the other hand, when this flag information is "1", this indicates no insertion.

Next, description will be given for a case where depth information/SEI (depth_information( )) that includes disparity information for each picture is inserted into the user data region of the video stream.

For example, in the case that the encoding format is AVC, "depth_information( )" is inserted as "depth_information SEI message" in the "SEIs" portion of an access unit. FIG. 13(a) indicates an access unit of the head of a GOP (Group Of Pictures), and FIG. 13(b) indicates an access unit at other than the head of the GOP. In the case that disparity information for each picture is inserted in GOP increments, the "depth_information SEI message" is inserted only into the access unit at the head of the GOP.

FIG. 14(a) illustrates a configuration example (Syntax) of "depth_information SEI message". "uuid_iso_iec_11578" has a UUID value expressed as "ISO/IEC 11578:1996AnnexA.". The "depth_information_data( )" is inserted in the "user_data_payload_byte" field. FIG. 14(b) illustrates a configuration example (Syntax) of "depth_information_data( )". Depth information/SEI "depth_information_data( )" is inserted therein. "userdata_id" is an identifier of the "depth_information( )" that is expressed in 16 bits with no sign.

Figure 15:
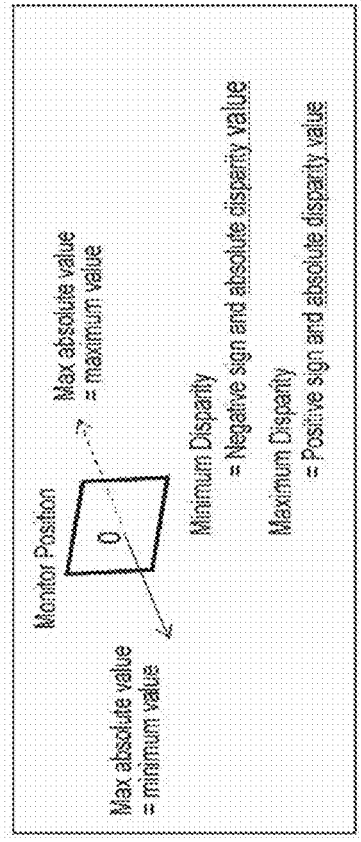
FIG. 15 is a diagram illustrating a configuration example (Syntax) of "depth_information( )" in the case of inserting disparity information for each picture in picture increments.

FIG. 15(a), FIG. 16, and FIG. 17 each illustrate a configuration example (Syntax) of "depth_information( )" in the case of inserting disparity information for each picture in picture increments. FIG. 18 illustrates content (Semantics) of primary information of these configuration examples.

FIG. 15(a) illustrates a configuration example (Syntax) that corresponds to an obtaining method of "obtain first disparity information in each partition region obtained by partitioning a picture display screen into a plurality, based on partition pattern information, and obtain second disparity information over the entire picture display screen" in (1) described above.

A 3-bit field of "partition_type" indicates a partition type of the picture display screen. "000" indicates partition type "type000", as illustrated in FIG. 19(a). "001" indicates partition type "type001", as illustrated in FIG. 19(b). "010" indicates partition type "type010", as illustrated in FIG. 19(c). "011" indicates partition type "type011", as illustrated in FIG. 19(d). "100" indicates partition type "type100", as illustrated in FIG. 19(e). "101" indicates partition type "type101", as illustrated in FIG. 19(f).

A 4-bit field of "partition_count" indicates the total number of partition regions, which is a value that depends on the above-described "partition type". For example, when "partition_type=000", the total number of partition regions is "1", as indicated in FIG. 19(a). Also, for example, when "partition_type=001", the total number of partition regions is "4", as indicated in FIG. 19(b). Also, for example, when "partition_type=010", the total number of partition regions is "8", as indicated in FIG. 19(c).

An 8-bit field of "max_disparity_in_picture" indicates the second disparity information of the overall picture display screen, i.e. the maximum disparity information (disparity value) over the entire picture. An 8-bit field of "min_disparity_in_partition" indicates the first disparity information of each partition region, i.e. the minimum disparity information (disparity value) in each partition region.

Now, "min_disparity_in_partition" which is the first disparity information and "max_disparity_in_picture" which is the second disparity information are set as absolute value data. "min_disparity_in_partition" can be restricted to the forward side from the monitor position, whereby even without indicating sign bits, on the receiving side, the disparity information value (absolute value) to be transmitted can be converted to a negative value and used, as illustrated in FIG. 15(b). Similarly, "max_disparity_in_picture" can be restricted to the far side from the monitor position, whereby even without indicating sign bits, on the receiving side, the disparity information value (absolute value) to be transmitted can be converted to a positive value and used, as illustrated in FIG. 15(b).

Thus, the range of values of the disparity information expressed with 8 bits is (−255, +255), and necessary disparity expressions can be used with 8 bits, even with a superhigh quality image having a resolution at the level of 4,000 horizontal pixels, for example. Also, as to a conventional resolution at the level of 2,000 horizontal pixels, the 8 bits can be divided into "7 bits" plus "1 bit", where a disparity expression of (−127.5, +1.27.5) can be used. In this case, the decimal portions express a half-pixel, and by appropriately interpolating the graphics object to be overlaid, a smoother automatic update in the depth direction can be realized.

FIG. 16 illustrates a configuration example (Syntax) that corresponds to an obtaining method of "obtain first disparity information and second disparity information in each partition region obtained by partitioning a picture display screen into a plurality, based on partition pattern information" in (2) described above. Portions in FIG. 16 herein that correspond to FIG. 15 will have the descriptions thereof omitted as appropriate.

A 3-bit field of "partition_type" indicates a partition type of the picture display screen. A 4-bit field of "partition_count" indicates the total number of partition regions, which is a value that depends on the above-described "partition type". An 8-bit field of "max_disparity_in_partition" indicates the second disparity information of each partition region, i.e. the maximum disparity information (disparity value) in each partition region. An 8-bit field of "min_disparity_in_partition" indicates the first disparity information of each partition region, i.e. the minimum disparity information (disparity value) in each partition region. Now, "min_disparity_in_partition" which is the first disparity information and "max_disparity_in_partition" which is the second disparity information are set as absolute value data.

FIG. 17 illustrates a configuration example (Syntax) that corresponds to an obtaining method of "obtain first disparity information in each partition region obtained by partitioning a picture display screen with first partition information, and obtain second disparity information in each partition region obtained by partitioning a picture display screen with second partition information based on partition pattern information" in (3) described above. Portions in FIG. 17 herein that correspond to FIG. 15 and FIG. 16 will have the descriptions thereof omitted as appropriate.

The 3-bit field of "min_partition_type" indicates a partition type of picture display screen related to obtaining the first disparity information. The 4-bit field of "min_partition_count" indicates the total number of partition regions in which first disparity information is obtained, and is a value that depends on the above-described "min_partition_type". The 3-bit field of "max_partition_type" indicates a partition type of picture display screen relating to obtaining the second disparity information. The 4-bit field of "max_partition_count" indicates the total number of partition regions in which second disparity information is obtained, and is a value that depends on the above-described "max_partition_type".

The 8-bit field of "min_disparity_in_partition" indicates the first disparity information of each partition region, i.e. the minimum disparity information (disparity value) in each partition region. An 8-bit field of "max_disparity_in_partition" indicates the second disparity information of each partition region, i.e. the maximum disparity information (disparity value) in each partition region. Now, "min_disparity_in_partition" which is the first disparity information and "max_disparity_in_partition" which is the second disparity information are set as absolute value data.

FIG. 20, FIG. 2.1, and FIG. 22 each illustrate a configuration example (Syntax) of "depth_information( )" in the case of encoding multiple pictures as in the case of inserting the disparity information for each pictures in GOP increments. Content (Semantics) of primary information in these configuration examples are illustrated in FIG. 18.

FIG. 20 illustrates a configuration example (Syntax) that corresponds to an obtaining method of "obtain first disparity information in each partition region obtained by partitioning a picture display screen into a plurality, based on partition pattern information, and obtain second disparity information over the entire picture display screen" in (1) described above. Portions in FIG. 20 herein that correspond to FIG. 15 described above will have the descriptions thereof omitted as appropriate.

A 6-bit field of "picture_count" indicates the number of pictures. First disparity information and second disparity information of the numbers of pictures is included in this "depth_information( )". A 4-bit field of "partition_count" indicates the total number of partition regions. An 8-bit field of "max_disparity_in_picture" indicates the second disparity information of the entire picture display screen, i.e. the maximum disparity information (disparity value) over the entire picture. An 8-bit field of "min_disparity_in_partition" indicates the first disparity information of each partition region, i.e. the minimum disparity information (disparity value) in each partition region. Detailed descriptions will be omitted, but other portions in the configuration example in FIG. 20 are similar to the configuration example illustrated in FIG. 15.

FIG. 21 illustrates a configuration example (Syntax) that corresponds to an obtaining method of "obtain first disparity information and second disparity information in each partition region obtained by partitioning a picture display screen into a plurality, based on partition pattern information" in (2) described above. Portions in FIG. 21 herein that correspond to FIG. 16 and FIG. 20 will have the descriptions thereof omitted as appropriate.

The 6-bit field of "picture_count" indicates the number of pictures. First disparity information and second disparity information of the numbers of pictures is included in this "depth_information( )". The 4-bit field of "partition_count" indicates the total number of partition regions. The 8-bit field of "max_disparity_in_partition" indicates the second disparity information of each partition region, i.e. the maximum disparity information (disparity value) in each partition region. The 8-bit field of "min_disparity_in_partition" indicates the first disparity information of each partition region, i.e. the minimum disparity information (disparity value) in each partition region. Detailed descriptions will be omitted, but other portions in the configuration example in FIG. 21 are similar to the configuration example illustrated in FIG. 16.

FIG. 22 illustrates a configuration example (Syntax) that corresponds to an obtaining method of "obtain first disparity information in each partition region obtained by partitioning a picture display screen with first partition information, and obtain second disparity information in each partition region obtained by partitioning a picture display screen with second partition information, based on partition pattern information" in (3) described above. Portions in FIG. 22 herein that correspond to FIG. 17, FIG. 20, and FIG. 21 will have the descriptions thereof omitted as appropriate.

The 6-bit field of "picture_count" indicates the number of pictures. First disparity information and second disparity information of the numbers of pictures is included in this "depth_information( )". The 3-bit field of "min_partition_type" indicates a partition type of picture display screen related to obtaining the first disparity information. The 3-bit field of "max_partition_type" indicates a partition type of picture display screen relating to obtaining the second disparity information. The 4-bit field of "min_partition_count" indicates the total number of partition regions in which first disparity information is obtained, and the 4-bit field of "max_partition_count" indicates the total number of partition regions in which second disparity information is obtained.

The 8-bit field of "min_disparity_in_partition" indicates the first disparity information of each partition region, i.e. the minimum disparity information (disparity value) in each partition region. The 8-bit field of "max_disparity_in_partition" indicates the second disparity information of each partition region, i.e. the maximum disparity information (disparity value) in each partition region. Detailed descriptions will be omitted, but other portions in the configuration example in FIG. 22 are similar to the configuration example illustrated in FIG. 17.

Note that description is given above for a case in which the encoding format is AVC. For example, in the case that the encoding format is MPEG2video, "depth_information( )" is inserted as user data "user_data( )" in the user data region of the picture header portion. FIG. 23($a$) illustrates a configuration example (Syntax) of "user_data( )". The 32-bit field of "user_data_start_code" is a starting code for user data (user_data), and is a fixed value of "0x000001B2".

The 32-bit field that follows this starting code is an identifier that identifies the content of the user data. Here this is "depth_information_data_identifier", and can identify that the user data is "depth_information_data". As the main data after this identifier, "depth_information_data( )" is inserted. FIG. 23($b$) illustrates a configuration example (Syntax) of "depth_information_data( )". "depth_information( )" is inserted herein (see FIG. 15 through FIG. 17 and FIG. 20 through FIG. 22).

Note that description is given of an insertion example of disparity information to the video stream in the case in which the encoding format is AVC or MPEG2video. Detailed description will be omitted, but insertion of disparity information into the video stream can be performed with a similar configuration even with other similar configurations of encoding formats, e.g. HEVC.

"Description of Set-Top Box"

The set-top box 200 receives the transport stream TS that is transmitted on broadcast waves from the broadcast station 100. Also, the set-top box 200 decodes the video stream included in this transport stream TS, and generates left eye image data and right eye image data that configures the stereoscopic image. Also, the set-top box 200 extracts the disparity information (first disparity information, second disparity information) for each picture of the image data, which is inserted in the video stream.

Based on the first disparity information and the second disparity information, the set-top box 200 checks whether or not the disparity angle corresponding to the nearest object playing position (disparity angle in the intersecting direction) and the disparity angle corresponding to the farthest object playing position (disparity angle in the same-side direction) are within a predetermined range so as not to harm the health of the viewer. Also, in the case this is not contained within a predetermined range, the set-top box 200 reconfigures the left eye image data and right eye image data so as to be contained, and corrects the first disparity information and second disparity information.

Also, in the case of overlaying and displaying the graphics (STB graphics) on the image, the set-top box 200 uses the image data and disparity information (first disparity information) and graphics data, and obtains data for the left eye image data and right eye image data on which graphics have been overlaid. In this case, the set-top box 200 appends disparity, which corresponds to the display position of these graphics for each picture, to the graphics overlaid onto the left eye image and right eye image, and obtains left eye image data on which graphics are overlaid and right eye image data on which graphics are over laid.

By appending disparity to the graphics as described above, the graphics (STB graphics) overlaid and displayed on the stereoscopic image can be displayed nearer than the object of the stereoscopic image at the display position thereof. Thus, in the case of overlaying and displaying graphics such as an OSD or application or graphics such as EPG of program information onto the image, consistency in perspective as to each object within the image can be maintained.

Figure 24:
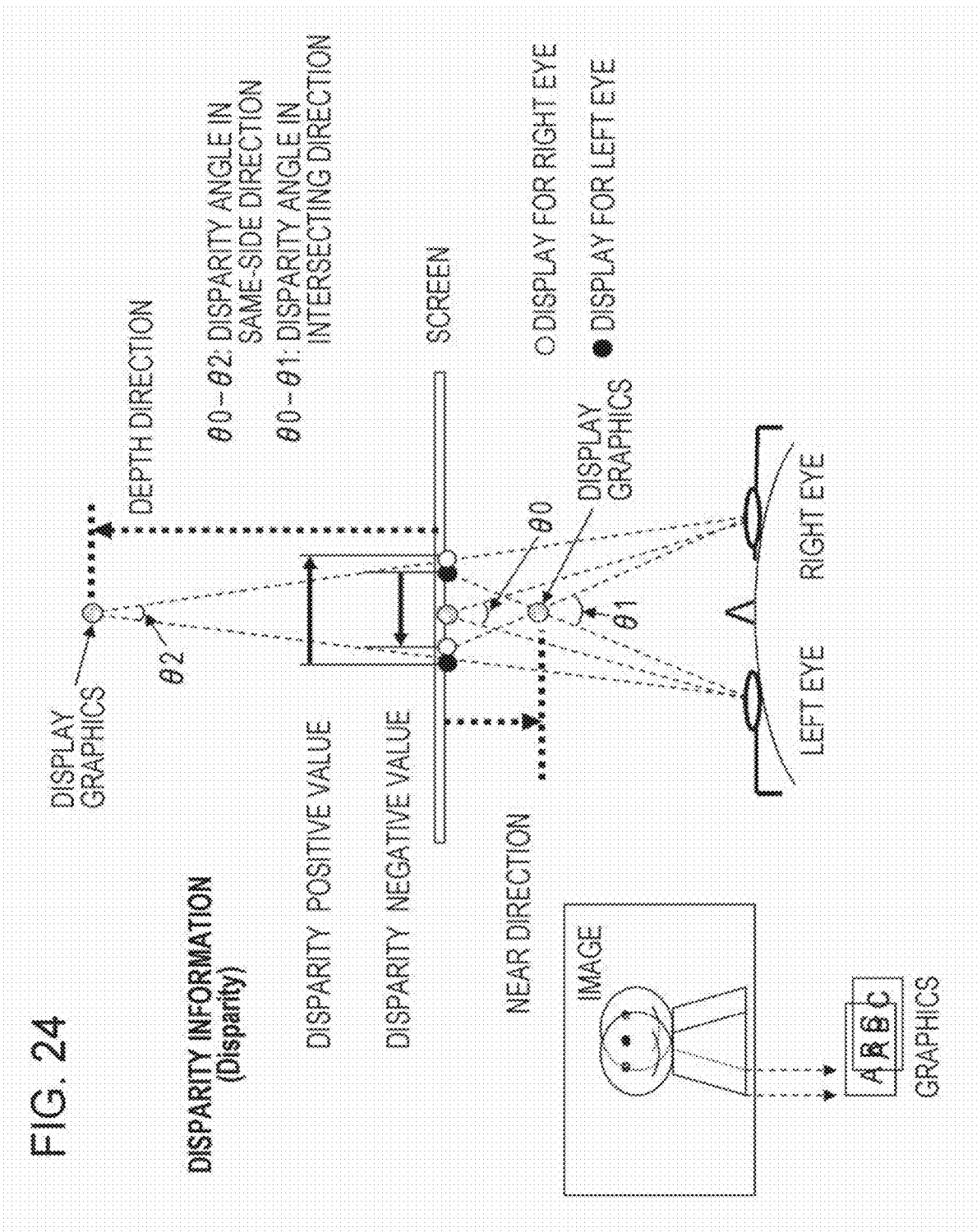
FIG. 24 is a diagram illustrating a concept of depth control of graphics by disparity information.

FIG. 24 illustrates a concept of graphics depth control by the disparity information. In the case that the disparity information is a negative value, disparity is appended so that the graphics for the left eye display shifts to the right side of the screen and the graphics for the right eye display shifts to the left side. In this case, the display position of the graphics is on the near side of the screen. Also, in the case that the disparity information is a positive value, disparity is appended so that the graphics for the left eye display shifts to the left side of the screen and the graphics for the right eye display shifts to the right side. In this case, the display position of the graphics is on the far side of the screen.

As described above, disparity information obtained for each picture of the image data is inserted into the video stream. Therefore, the set-top box 200 can accurately perform graphics depth control with disparity information, using disparity information that matches the display timing of the graphics.

Also, FIG. 24 illustrates the disparity angle in the same-side direction (θ0-θ2) and the disparity angle in the intersecting direction (θ0-θ1). A check is performed at the set-top box 200 as to whether or not these disparity angles are within a predetermined range so as not to harm the health of the viewer, based on the first disparity information and second disparity information of each picture that are inserted in the video stream.

Figure 25:
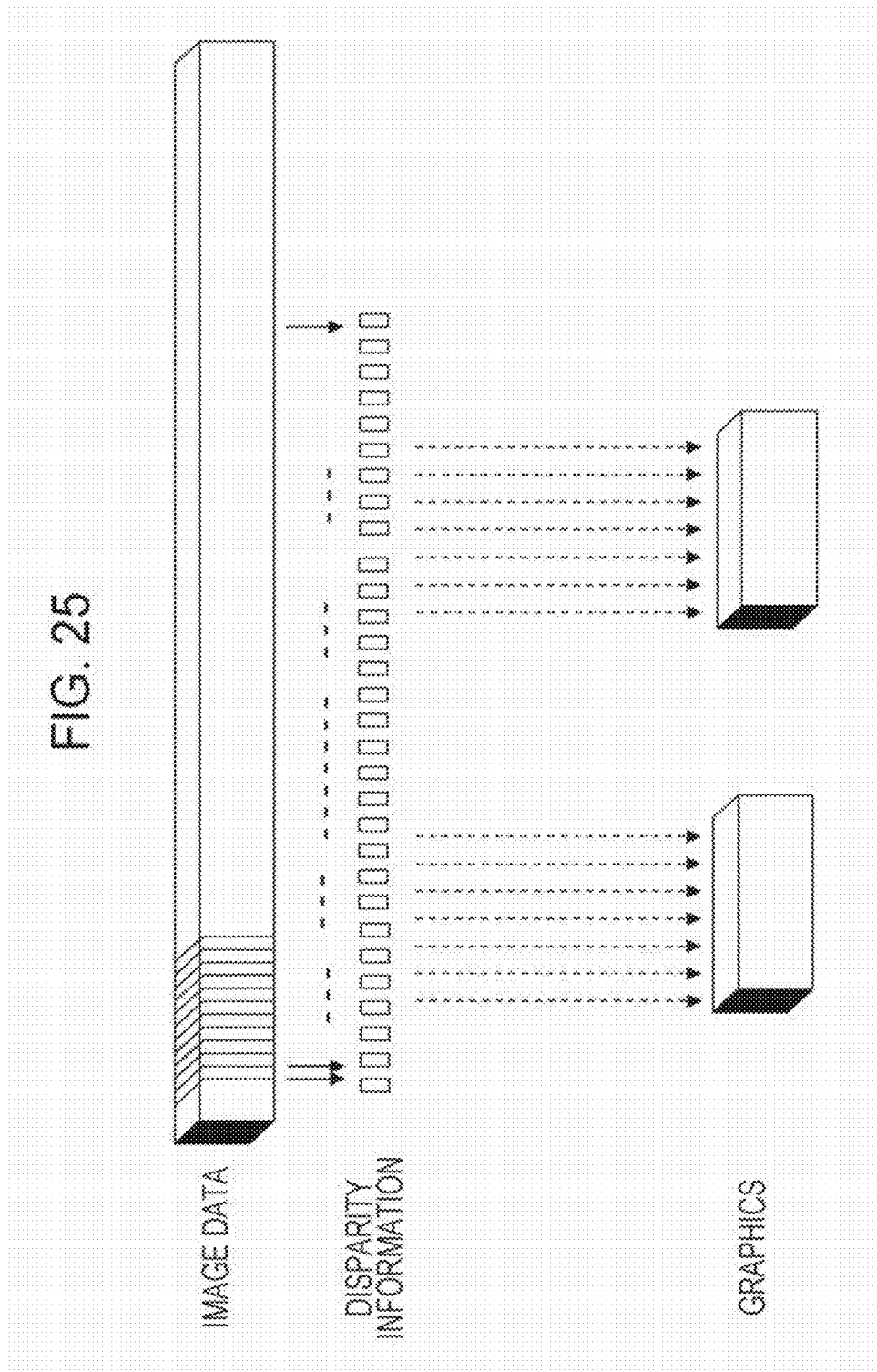
FIG. 25 is a diagram illustrating that disparity information is obtained sequentially at picture timing of the image data, in the case that disparity information is inserted into the video stream in picture increments.
Figure 26:
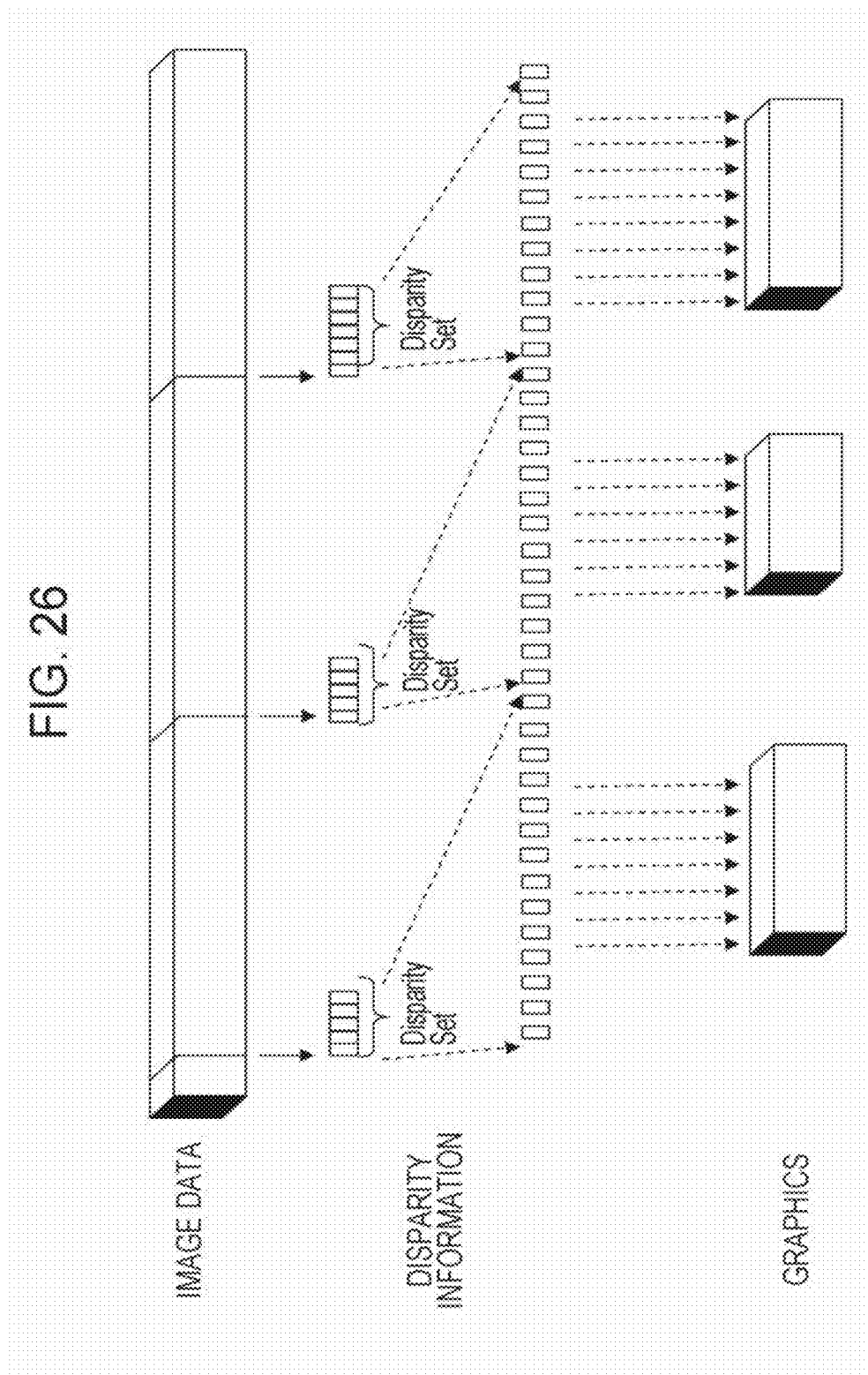
FIG. 26 is a diagram illustrating that disparity information for each picture within the GOP is obtained together at the head timing of the GOP of the image data, in the case that disparity information is inserted into the video stream in GOP increments.

FIG. 25 is an example in the case of disparity information being inserted in the video stream in picture increments, and at the set-top box 200, disparity information is obtained sequentially with the picture timing of the image data. Disparity information (first disparity information) matching the graphics display timing is used in the display of graphics, and appropriate disparity is appended to the graphics. Also, FIG. 26 is an example in the case of disparity information being inserted in the video stream in GOP increments, and at the set-top box 200, disparity information (disparity information set) is obtained together, for each picture within the GOP, at the head timing of the GOP of the image data. Disparity information (first disparity information) matching the graphics display timing is used in the display of graphics (STB graphics), and appropriate disparity is appended to the graphics.

Figure 27:
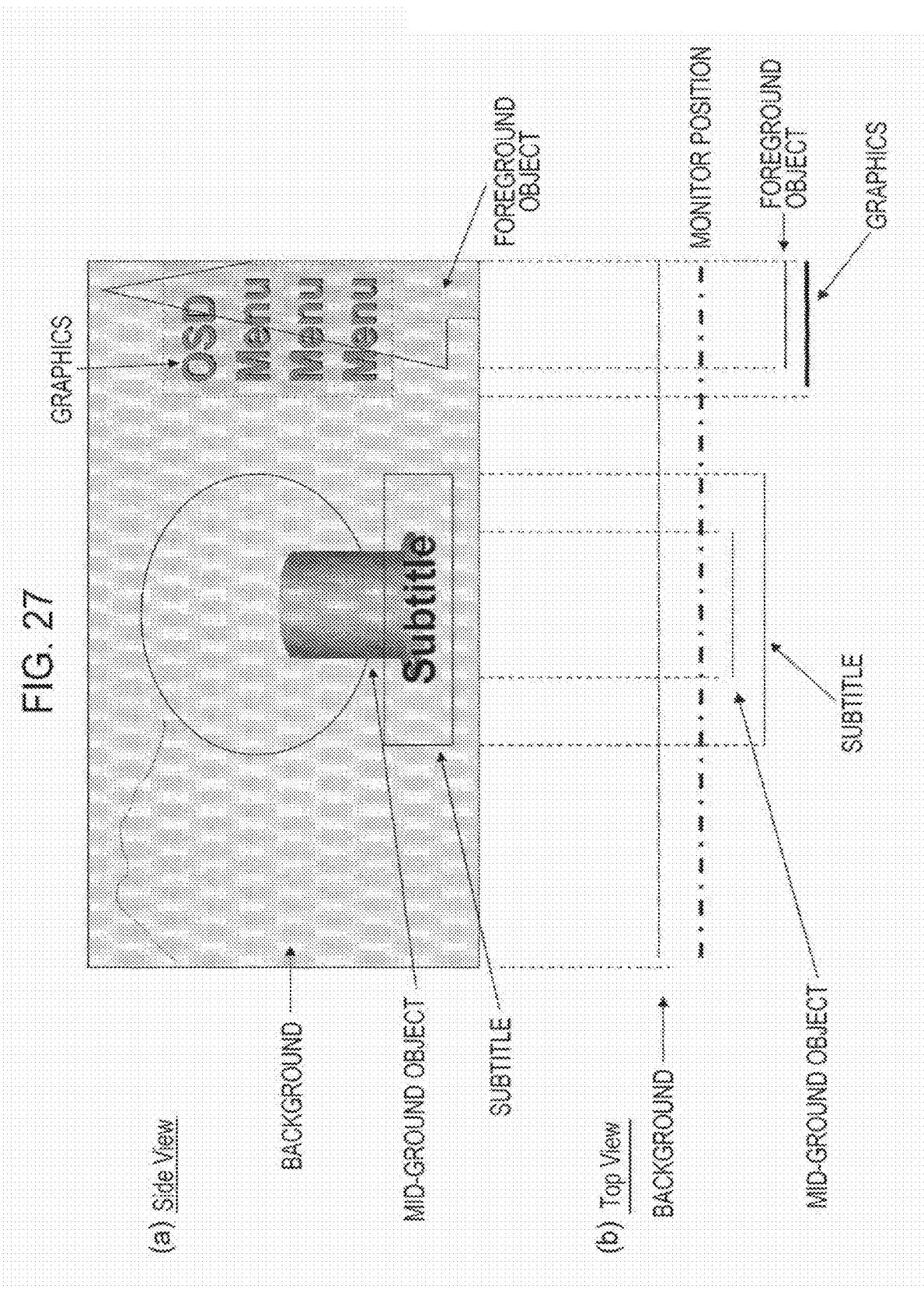
FIG. 27 is a diagram illustrating a display example of a subtitle on an image and OSD graphics.

The "Side View" in FIG. 27(a) illustrates a display example of the subtitle on the image and the OSD graphic. This display example is an example where subtitles and graphics are overlaid onto the image that is made up of a background, mid-field object, and near-field object. The "Top View" in FIG. 27(b) illustrates perspectives of the background, mid-field object, near-field object, subtitle, and graphics. The illustration shows that the subtitle and graphics are recognized as being nearer than objects corresponding to the display positions. Note that while not illustrated in the diagram, in the case that the display positions of the subtitle and graphics are overlaid, appropriate disparity is appended to the graphics so that the graphics are recognized to be nearer than the subtitle, for example.

"Configuration Example of Set-Top Box"

Figure 28:
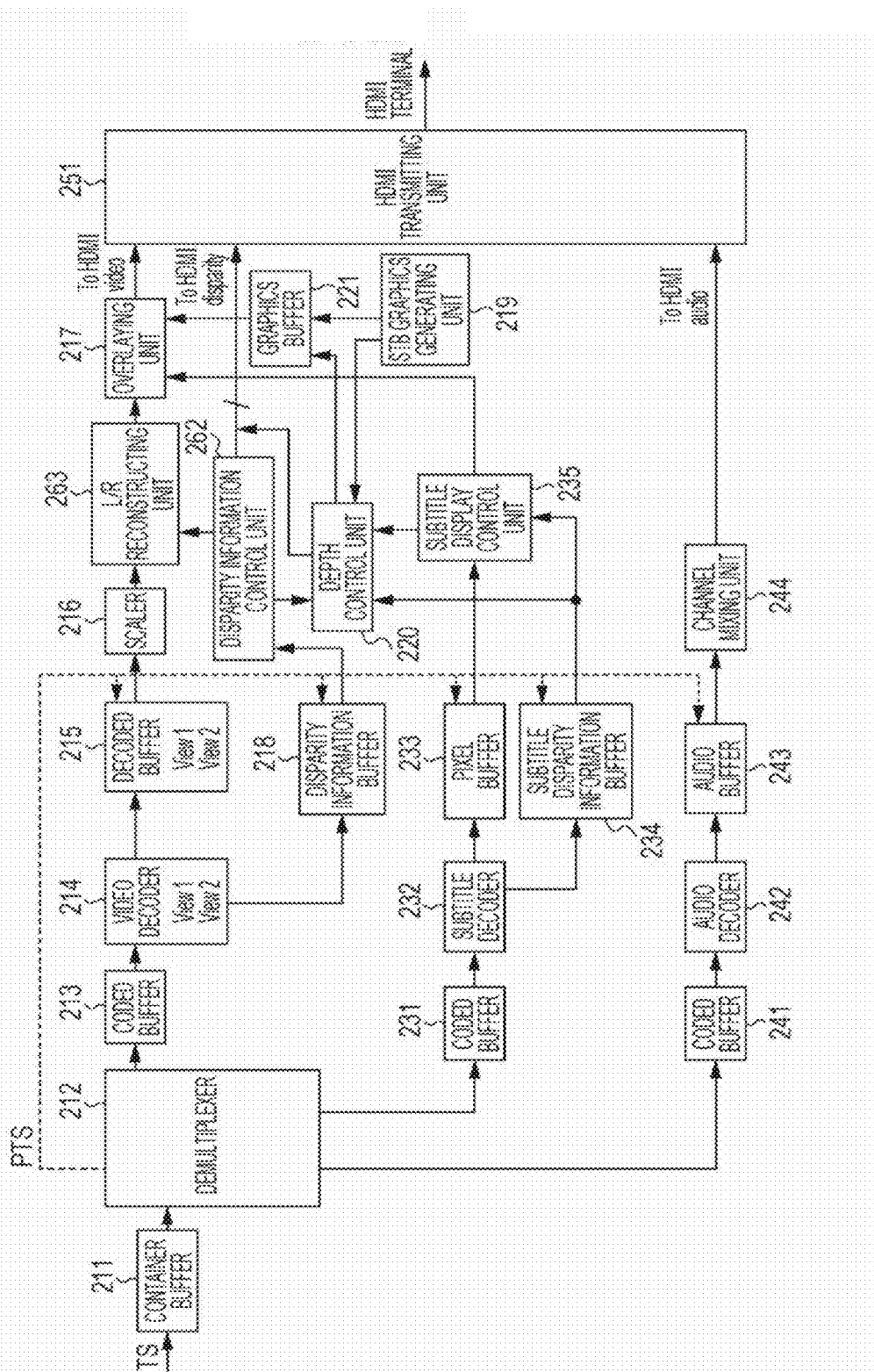
FIG. 28 is a block diagram illustrating a configuration example of a set-top box.

FIG. 28 illustrates a configuration example of the set-top box 200. The set-top box 200 has a container buffer 211, demultiplexer 212, coded buffer 213, video decoder 214, decoded buffer 215, scaler 216, L/R reconfiguring unit 263, and overlaying unit 217. Also, the set-top box 200 has a disparity information buffer 218, disparity information control unit 262, set-top box (STB) graphics generating unit 219, depth control unit 220, and graphics buffer 221.

Also, the set-top box 200 has a coded buffer 231, subtitle decoder 232, pixel buffer 233, subtitle disparity information buffer 234, and subtitle display control unit 235. Further, the set-top box 200 has a coded buffer 241, audio decoder 242, audio buffer 243, channel mixing unit 244, and HDMI transmitting unit 251.

The container buffer 211 temporarily stores the transport stream TS received by an unshown digital tuner or the like. A video stream, subtitle stream, and audio stream are included in this transport stream TS. One or two video streams obtained by left eye image data and right eye image data having been encoded are included in a video stream.

For example, image data in a side-by-side format or top-and-bottom format may be configured by left eye image data and right eye image data and transmitted in one video stream. Also, for example, the left eye image data and right eye image data may each be transmitted in separate video streams, such as a MVC base view stream and non-base view stream.

The demultiplexer 212 extracts a stream for each of the video, subtitle, and audio from the transport stream TS that has been temporarily stored in the container buffer 211. Also, the demultiplexer 212 extracts identification information (flag information of "graphics_depth_info_not_existed_flag [0]") that indicates whether or not disparity information is inserted in the video stream, and transmits this to an unshown control unit (CPU). When the identification information indicates insertion of disparity information, the video decoder 214 obtains disparity information (first disparity information, second disparity information) from the video stream, as described later, under the control of the control unit (CPU).

The coded buffer 213 temporarily stores the video stream extracted by the demultiplexer 212. The video decoder 214 performs decoding processing on the video stream stored in the coded buffer 213, and obtains the left eye image data and right eye image data. Also, the video decoder 214 obtains the disparity information (first disparity information, second disparity information) for each picture of the image data inserted into the video stream. The decoded buffer 215 temporarily stores the left eye image data and right eye image data obtained with the video decoder 214.

The disparity information buffer 218 temporarily stores the disparity information (first disparity information, second disparity information) for each picture of the image data obtained with the video decoder 214. The disparity information control unit 262 checks whether or not the disparity angle corresponding to the nearest object playing position (disparity angle in the intersecting direction) and the disparity angle corresponding to the farthest object playing position (disparity angle in the same-side direction) are within a predetermined range so as not to harm the health of the viewer, based on first disparity information and second disparity information for each picture stored in the disparity information buffer 218.

Also, in the case that the disparity angle is not contained within a predetermined range, the disparity information control unit 262 instructs the L/R reconfiguration unit 263 to reconfigure the left eye image data and right eye image data so the disparity angle will be contained within a predetermined range, and corrects the first disparity information and second disparity information. Also, the disparity information control unit 262 corrects and outputs the first disparity information and/or the second disparity information to match the reconfigured left eye image data and right eye image data. Note that in the case that the disparity angle is contained within a predetermined range, the disparity information control unit 262 outputs the left eye image data and right eye image data without change, without instructing the L/R reconfiguring unit 263 to reconfigure the left eye image data and right eye image data, and without correcting the first disparity information and second disparity information.

Figure 29:
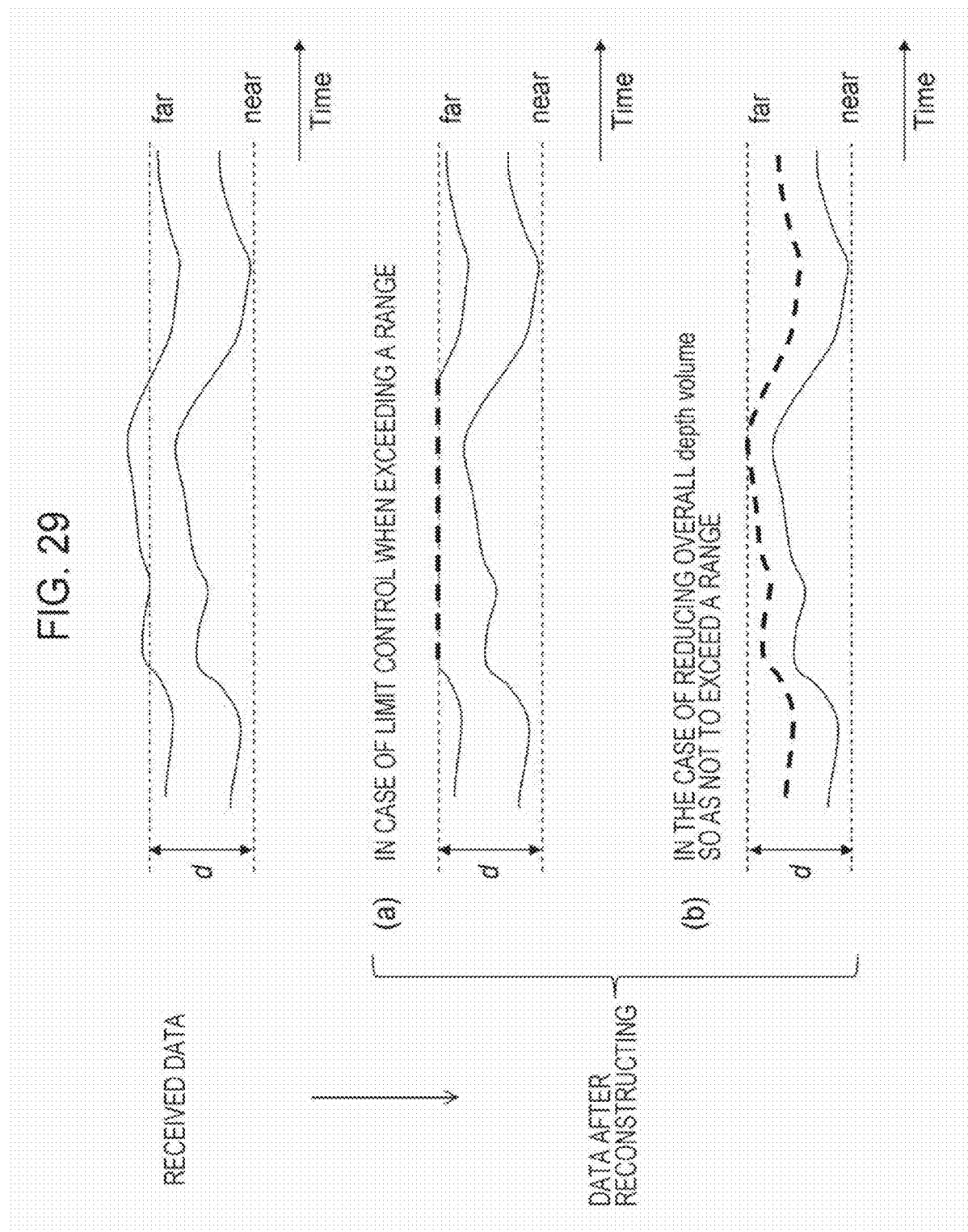
FIG. 29 is a diagram to describe checking of disparity angles and reconfiguration of image data.

The upper portion of FIG. 29 illustrates an example of time shifting of the disparity angles on the near side and far sides in the receiving data (left eye image data and right eye image data). A range d indicates the range of disparity angles that do not harm the health of the viewer. In this example, there is a segment in the disparity angle on the far side that is not contained in the range d.

The lower portion of FIG. 29 illustrates an example of time shifting of the disparity angles on the near side and far sides in the reconfigured data (left eye image data and right eye image data). (a) is an example in the case of limiting control being performed in the event that the range d has been exceeded. (b) is an example in the case that the overall depth volume is reduced so that the range d is not exceeded.

Figure 30:
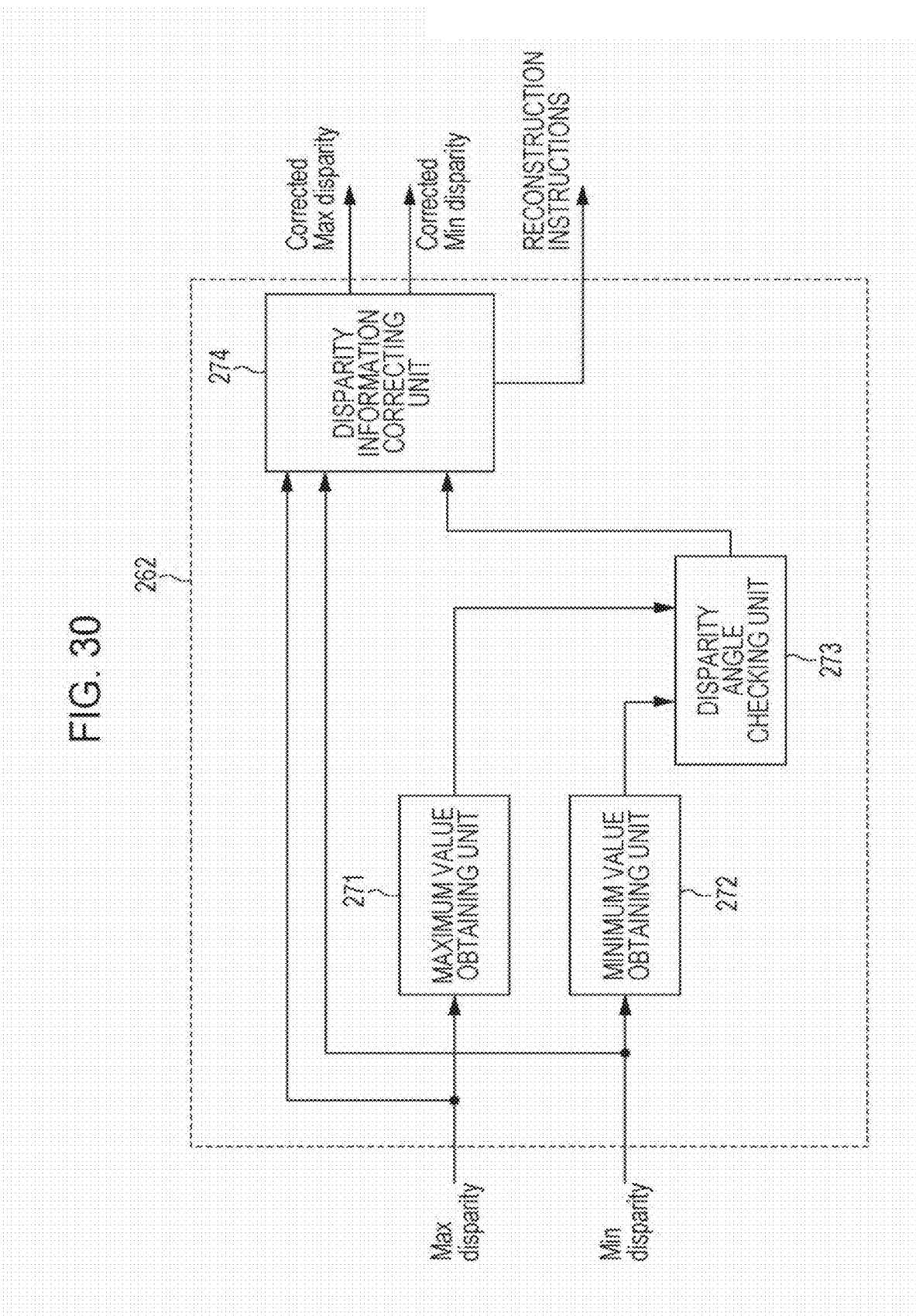
FIG. 30 is a block diagram illustrating a configuration example of a disparity information control unit.

FIG. 30 illustrates a configuration example of the disparity information control unit 262. The disparity information control unit 262 has a maximum value obtaining unit 271, minimum value obtaining unit 272, disparity angle checking unit 272, and disparity information correcting unit 274. The maximum value obtaining unit 271 selects the maximum value from the received second disparity information (Max disparity), and supplies this to the disparity angle checking unit 273. The received second disparity information is made up of one piece in the case of being for an overall picture screen, and is multiple pieces in the case of being for multiple partition regions. The minimum value obtaining unit 272 selects the minimum value from the received first disparity information (Min disparity), and supplies this to the disparity angle checking unit 273. The received first disparity information is made up of one piece in the case of being for an overall picture screen, and is multiple pieces in the case of being for multiple partition regions.

The disparity angle checking unit 273 checks whether or not the disparity angle of the near side and the disparity angle of the far side are contained within a range d (see FIG. 29) that are within a predetermined range so as not to harm the health of the viewer, based on first disparity information and second disparity information, and supplies the results of checking to the disparity information correcting unit 274. When the disparity angle is not contained in the range d, the disparity information correcting unit 274 instructs the L/R reconfiguring unit. 263 to reconfigure the received left eye image data and right eye image data so that the disparity angles are contained in the range d.

Also, the received first disparity information (Min disparity) and second disparity information (Max disparity) are supplied to the disparity information correcting unit 274. The disparity information correcting unit 274 performs correcting processing as to the first disparity information and second disparity information to match the reconfiguring instructions of the left eye image data and right eye image data described above, and outputs the first disparity information (Corrected Min disparity) and second disparity information (Corrected Max disparity) after correction. Note that when the disparity angle is contained in the range d, the disparity information correcting unit 274 does not instruct the L/R reconfiguring unit 263 to reconfigure the left eye image data and right eye image data, and outputs the first disparity information and second disparity information without correcting.

Returning to FIG. 28, the scaler 216 performs scaling processing in the horizontal direction and vertical direction as to the left eye image data and right eye image data output from the decoded buffer 215, as needed. For example, in the case that the left eye image data and right eye image data are transmitted in one video stream as image data of a side-by-side format or a top-and-bottom format, the data is scaled up to double in the horizontal direction or the vertical direction, and output. Also, for example, in the case that the left eye image data and right eye image data is each transmitted in separate video streams, such as a MVC base view stream and non-base view stream, scaling processing is not performed, and the left eye image data and right eye image data is output without change.

The L/R reconfiguring unit 263 reconfigures the left eye image data and right eye image data. That is to say, when at least one of the disparity angles in the same-side direction or intersecting direction exceed the predetermined range where the health of the listener is not harmed, the L/R reconfiguring unit 263 reconfigures the left eye image data and right eye image data so as to be contained within the predetermined range, based on the above-described reconfiguring instructions from the disparity information control unit 262.

The coded buffer 231 temporarily stores a subtitle stream extracted with the demultiplexer 214. The subtitle decoder 232 performs opposite processing from the subtitle encoder 117 of the transmission data generated unit 110 (see FIG. 8) described above. That is to say, the subtitle decoder 232 performs decoding processing for the subtitle stream stored in the coded buffer 231, and obtains the subtitle data.

Bitmap data for the subtitle, the display position information "Subtitle rendering position (x2, y2)", and the disparity information of the subtitle "Subtitle disparity" are included in this subtitle data. The pixel buffer 233 temporarily stores the subtitle bitmap data and the subtitle display position information "Subtitle rendering position (x2, y2)" obtained by the subtitle decoder 232. The subtitle disparity information buffer 234 temporarily stores the disparity information of the subtitle "Subtitle disparity" obtained by the subtitle decoder 232.

The subtitle display control unit 235 generates bitmap data for the subtitle and bitmap data of the subtitle "Subtitle data" for left eye display and for right eye display to which disparity has been appended, based on the display position information and disparity information of the subtitle. The set-top box (STE) graphics generating unit 219 generates graphics such as OSD or application, or graphics data such as EPG. Graphics bitmap data "Graphics data" and graphics display position information "Graphics rendering position (x1, y1)" are included in this graphics data.

The graphics buffer 221 temporarily stores the graphics bitmap data "Graphics data" generated by the set-top box graphics generating unit 219. The overlaying unit 217 overlays bitmap data for the subtitle "Subtitle data" for the left eye display and for the right eye display, which is generated by the subtitle display control unit 235, over the left eye image data and right eye image data, respectively.

Also, the overlaying unit 217 overlays the graphics bitmap data "Graphics data" that is stored in the graphics buffer 221 over each of the left eye image data and right eye image data. In this event, disparity is appended to the graphics bitmap data "Graphics data" that is overlaid over each of the left eye image data and right eye image data by a later-described depth control unit 220. Now, in the case that the graphics bitmap data "Graphics data" shares the same pixel as the bitmap data "Subtitle data" of the subtitle, the overlaying unit 217 overwrites the graphics data over the subtitle data.

The depth control unit 220 appends disparity to the graphics bitmap data "Graphics data" overlaid onto each of the left eye image data and right eye image data. Therefore, the depth control unit 220 generates display position information "Rendering position" of the graphics for the left eye display and for the right eye display, for each picture of the image data, and performs shifting control of the overlay position to the left eye image data and right eye image data of the graphics bitmap data "Graphics data" stored in the graphics buffer 221.

Figure 31:
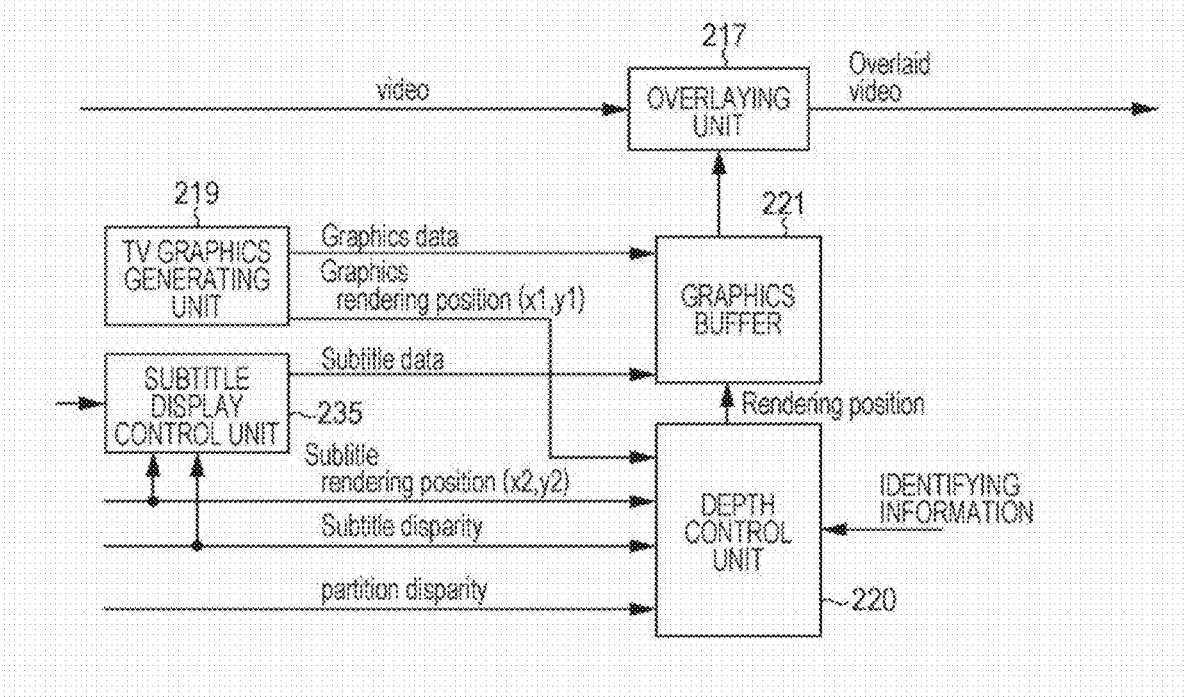
FIG. 31 is a block diagram to describe the control of the depth control unit.

The depth control unit 220 uses the information below to generate display position information "Rendering position", as illustrated in FIG. 31. That is to say, the depth control unit 220 uses the first disparity information (Min disparity) for each picture output from the disparity information control unit 262. Also, the depth control unit 220 uses the display position information "Subtitle rendering position (x2, y2)" of the subtitle stored in the pixel buffer 233.

Note that if we focus on changes to the depth for each partition region in an active depth update, in the event that an object in a background stereoscopic image changes spatial position, the change amount of depth instantly becomes significant, and if this is used without modification for overlay on graphics, it goes without saying that the viewer will experience discomfort regarding depth. Therefore, in order to suppress such discomfort, the depth control unit 220 performs processing (filtering processing) described below as to the first disparity information (Min disparity) of each partition region for each picture, that smoothes in the temporal direction, for example, and suppresses sudden changes to be smooth changes. Now, the first disparity information is a received absolute value that has been converted to a negative value.

Figure 32:
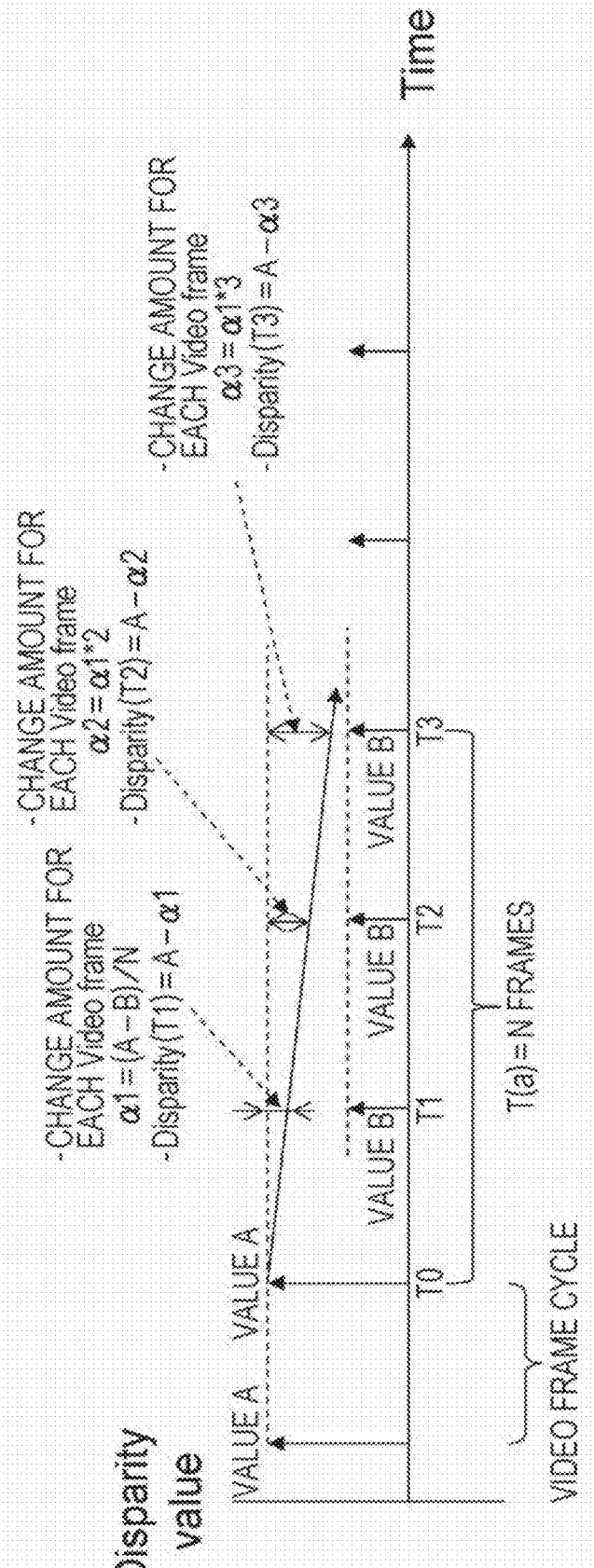
FIG. 32 is a diagram to describe an example of a filtering processing that smoothes in the temporal direction.

FIG. 32 illustrates an example of filtering processing. This example is an example in a case where the disparity information value at timing T0 is A, the disparity information value at timing T1 is B, and change is sudden. In this case, the disparity information value at timing T1 is not B itself, but rather (A−α1). Similarly, this is (A−α1*2) at timing T2 and (A−α1*3) at timing T3. Here, α1 (A−B)/N. Thus, filtering processing is performed so that the disparity information difference of (A−B) changes gradually over time of N video frames, and finally the disparity information value settles down to B.

Now, in the case that the (A−B) disparity information difference is N pixels, for example, changes are made over a period of N video frames at a change rate of one pixel for one frame. Also, in the case that the (A−B) disparity information difference is not an integer multiple of N pixels, a decimal value occurs in the change amount for each frame, but a so-called sub-pixel control can also be performed, where graphics to be overlaid onto the image is subjected to interpolating, expanding/shrinking and so forth.

Figure 33:
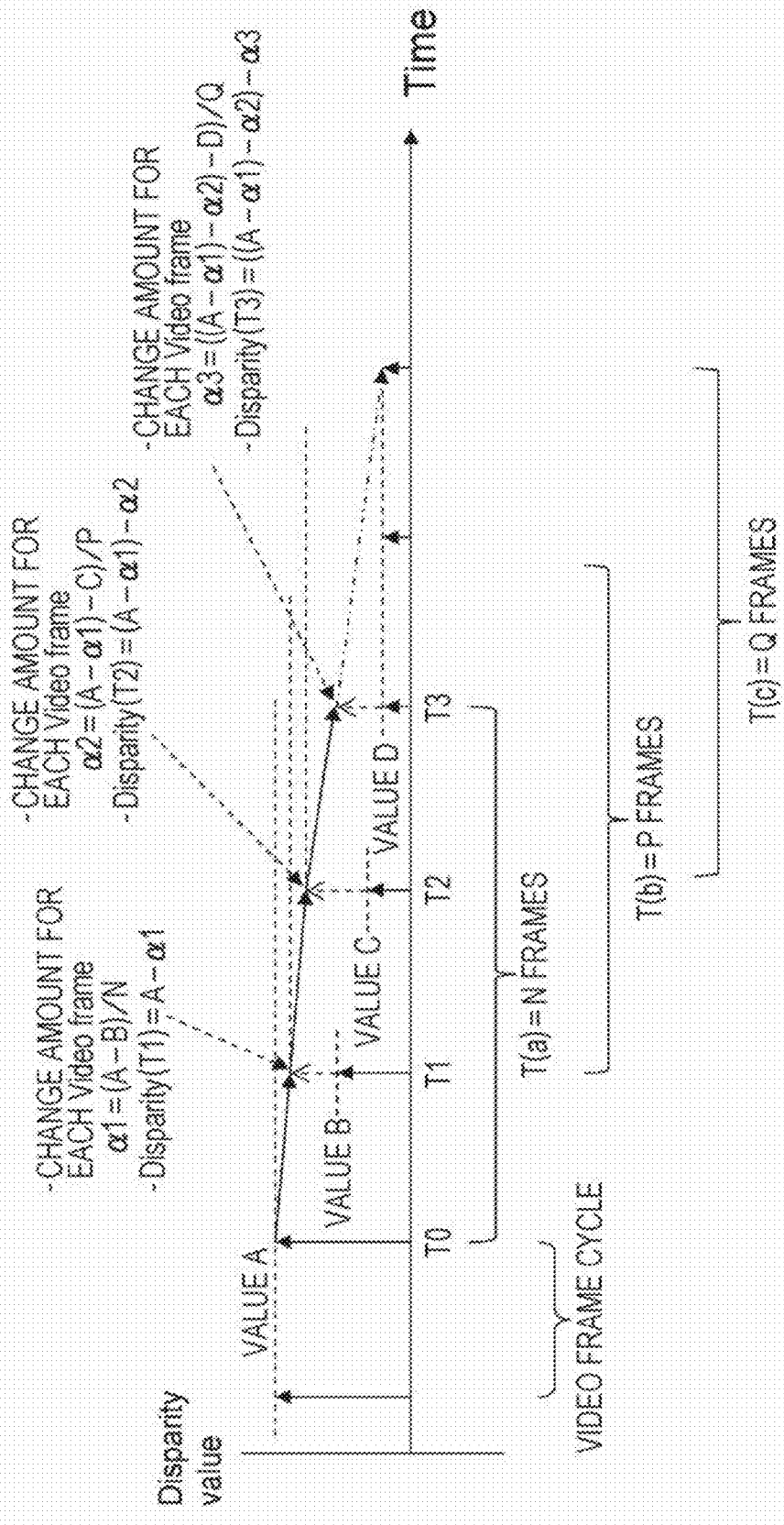
FIG. 33 is diagram to describe another example of a filtering processing that smoothes in the temporal direction.

FIG. 33 illustrates another example of filtering processing. This example is an example in a case where the disparity information value at timing T0 is A, the disparity information value at each of timings T1, T2, and T3 is B, C, D, and change is sudden. In this case, the disparity information value at timing T1 is not B itself, but rather (A−θ1). Here, α1=(A−B)/N. In this case, filtering processing is performed so that the disparity information difference of (A−B) changes gradually over time of N video frames.

Also, the disparity information value at timing T2 is not C itself, but rather is (A−α1)−α2. Here, α2=((A−α1)−C)/P. In this case, filtering processing is performed so that the disparity information difference of ((A−α1)−C) changes gradually over time of P video frames.

Further, the disparity information value at timing T2 is not D itself, but rather is ((A−α1)−α2)−α3). Here, α3=(((A−α1)−α2)−D)/Q. In this case, filtering processing is performed so that the disparity information difference of (((A−α1)−α2)−D) changes gradually over time of Q video frames, and finally the disparity information value settles down to D.

Note that the processing for smoothing in the temporal direction (filtering processing) is not limited to the above-described example, and other methods may be used. The main point is that sudden changes to disparity information can be suppressed by this filtering processing.

Returning to FIG. 31, also, the depth control unit 220 uses disparity information "Subtitle disparity" of the subtitle stored in the subtitle disparity information buffer 234. Also, the depth control unit 220 uses graphics display position information "Graphics rendering position (x1, y1)" that is generated by the set-top box graphics generating unit 219. Also, the depth control unit 220 uses identification information that indicates whether or not disparity information is inserted into the video stream.

Also, the depth control unit 220 updates the first disparity information (Min disparity) for each picture output from the disparity information control unit 262, according to the overlaying of a subtitle or graphics onto the image. In this case, the depth control unit 220 updates the disparity information value of the partition region corresponding to the subtitle display position and the graphics display position to a value of the disparity information uses to append disparity to the subtitle or graphics.

Figure 34:
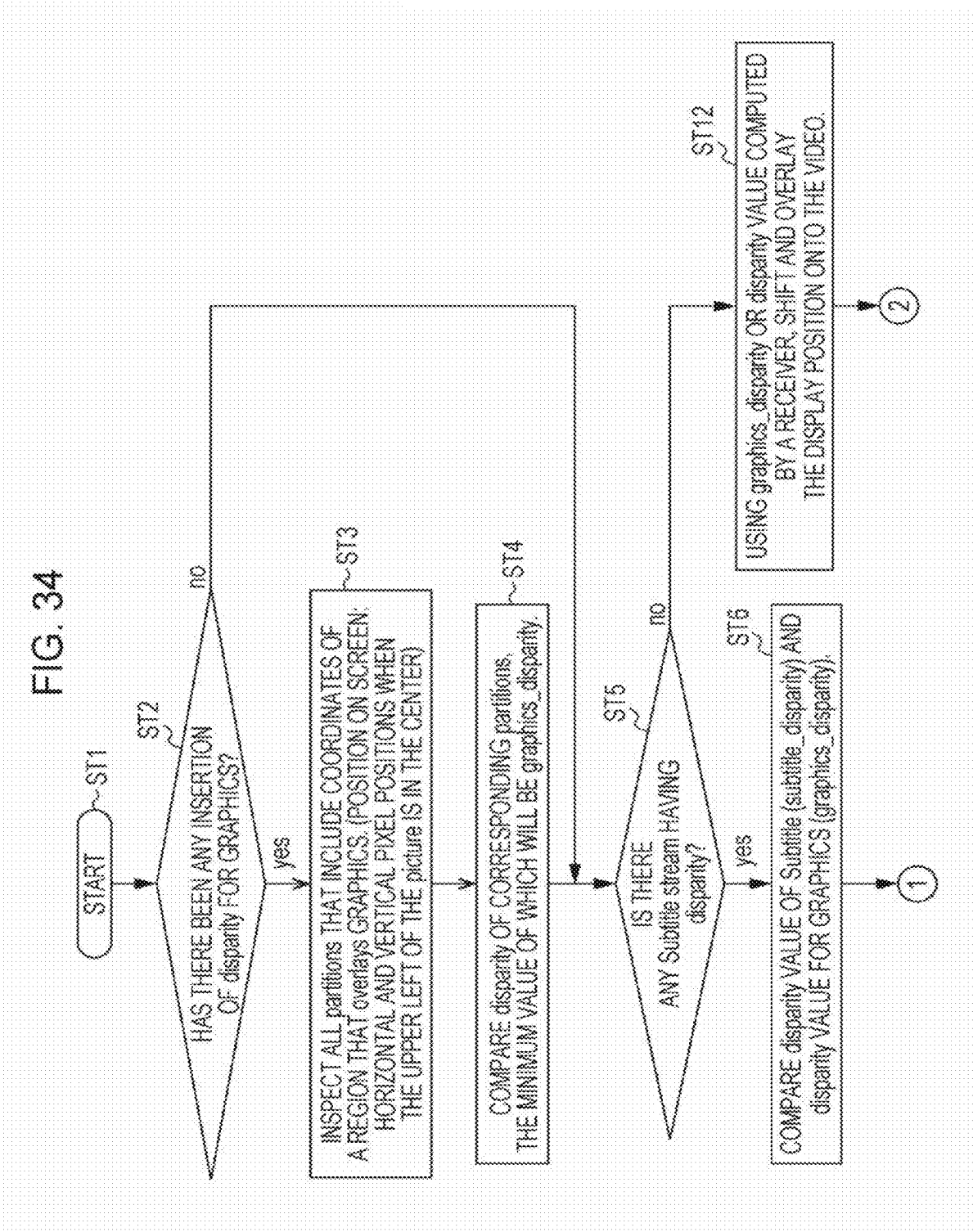
FIG. 34 is a flowchart (1/2) illustrating an example of a control processing sequence of the depth control unit.
Figure 35:
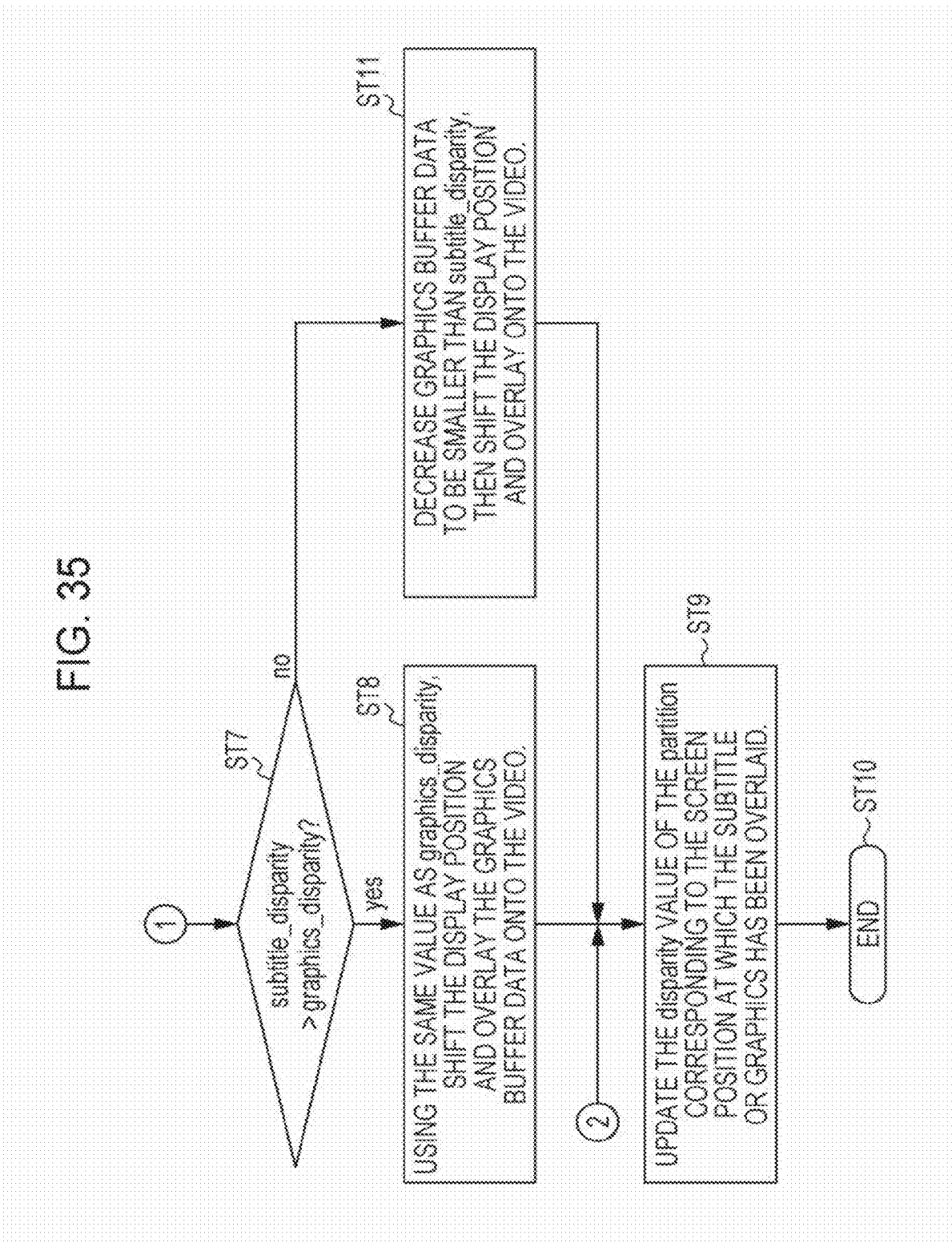
FIG. 35 is a flowchart (2/2) illustrating an example of a control processing sequence of the depth control unit.

The flowcharts in FIG. 34 and FIG. 35 illustrate an example of procedures of the control processing of the depth control unit 220. The depth control unit 220 executes this control processing for each picture (frame) in which graphics display is performed. The depth control unit 220 starts the control processing in step ST1. Subsequently, in step ST2, determination is made as to whether or not disparity information for graphics has been inserted into the video stream, based on the identification information.

When disparity information for graphics has been inserted into the video stream, the depth control unit 220 moves to the processing in step ST3. In this step ST3, all of the partition regions including coordinates for graphics overlay display are inspected. Also, in step ST4, the depth control, unit 220 compares the disparity information of the partition region to be used, selects an optimal value, for example a minimum value, for the value of the graphics disparity information (graphics_disparity).

Next, the depth control unit 220 moves to the processing in step ST5. When disparity information has not been inserted into the video stream in the step ST2 described above, the depth control unit 220 moves to the processing in step ST5. In this step ST5, the depth control unit 220 determines whether or not there is a subtitle stream having disparity information.

When there is a subtitle stream having disparity information, in step ST6 the depth control unit 220 compares the value of the disparity information for subtitles (subtitle_disparity) and the disparity information value for graphics (graphics_disparity). Note that when disparity information for graphics (disparity) has not been inserted into the video stream, the disparity information value for graphics (graphics_disparity) will be "0", for example.

Next, the depth control unit 220 determines in step ST7 whether or not the condition of "subtitle_disparity>(graphics_disparity) is satisfied. When this condition is satisfied, in step ST8 the depth control unit 220 uses the same value as the disparity information value for graphics (graphics_disparity) as to the graphics bitmap data "Graphics data" stored in the graphics buffer 221, obtains graphics bitmap data for left eye display and for right eye display in which the display positions have been shifted, and overlays these to the left eye image data and right eye image data, respectively.

Next, in step ST9, the depth control unit 220 updates the value of the disparity information of the partition region corresponding to the screen position on which the subtitle or graphics are overlaid. After the processing in step ST9, in step ST10 the depth control unit 220 ends the control processing.

On the other hand, when conditions are not satisfied in step ST7, in step ST10 the depth control unit 220 uses a value smaller than subtitle disparity information as to the graphics bitmap data "Graphics data" stored in the graphics buffer 221, obtains graphics bitmap data for left eye display and for right eye display in which the display positions have been shifted, and overlays these to the left eye image data and right eye image data, respectively. After the processing of step ST11, the depth control unit 220 goes through the processing of step ST9 and ends the control processing in step ST10.

Also, when there is no subtitle stream having disparity information in step ST5, the depth control unit 220 moves to the processing in step ST12. In this step ST12, the depth control unit 220 performs graphics depth control by using the value for graphics disparity information (graphics_disparity) obtained in step ST4 or the value of disparity information calculated by the set-top box 200.

That is to say, the depth control unit 220 uses the value for graphics disparity information (graphics_disparity) or the value of the calculated disparity information as to the graphics bitmap data "Graphics data" stored in the graphics buffer 221, obtains graphics bitmap data for left eye display and for right eye display in which the display positions have been shifted, and overlays these to the left eye image data and right eye image data, respectively. After the processing in step ST12, in step ST10 the depth control unit 220 ends the control processing via the processing in step ST9.

Figure 36:
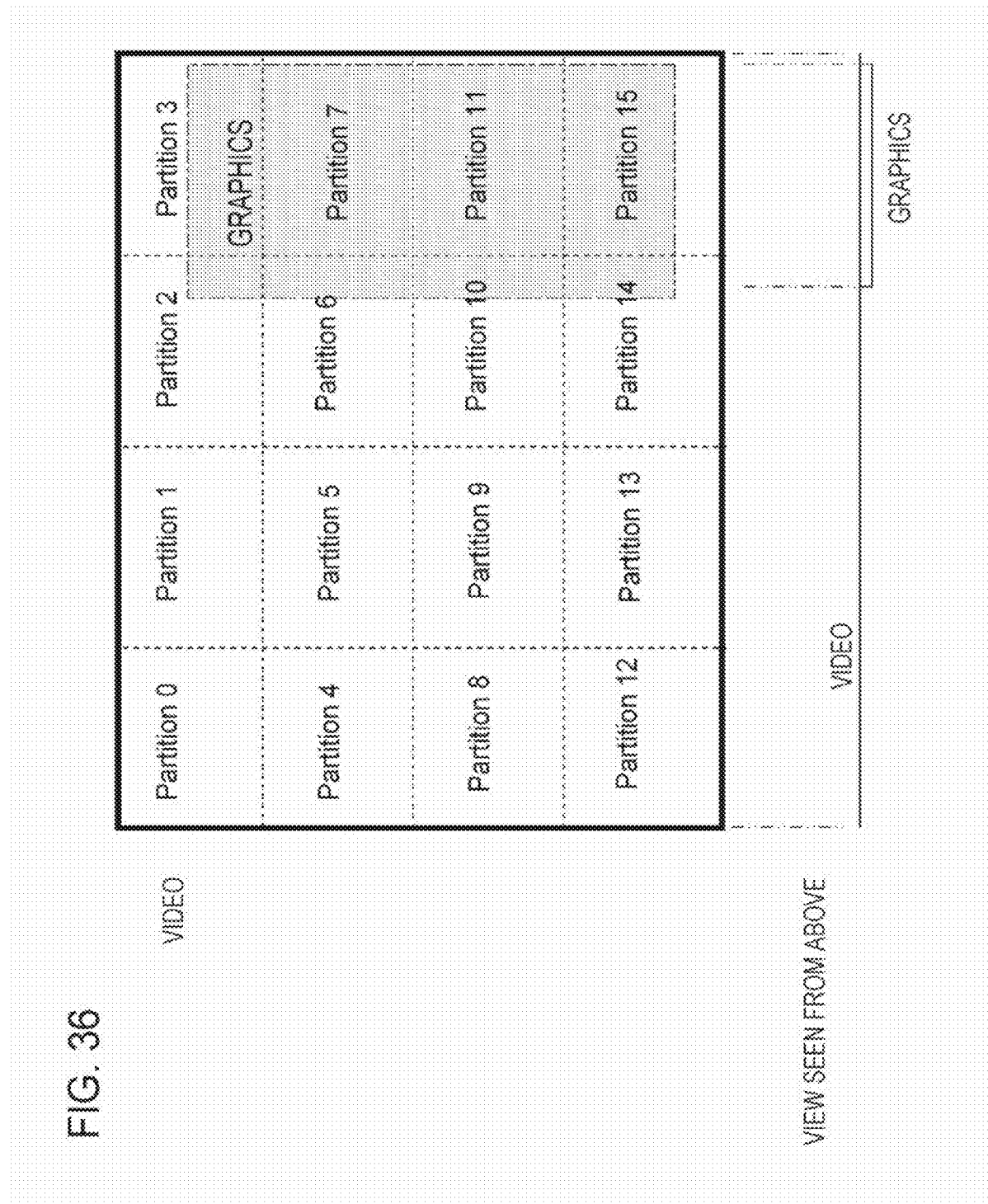
FIG. 36 is a diagram illustrating a depth control example of graphics in a set-top box.

FIG. 36 illustrates a graphics depth control example with the set-top box 200. In this example, the graphics (STE graphics) have disparity appended to the graphics for the left eye display and graphics for the right eye display, based on the disparity information of the minimum value from the disparity information of eight partition regions on the right side (Partition 2, 3, 6, 7, 10, 11, 14, 15). Consequently, the graphics are displayed nearer than the image (video) object of these eight partition regions.

Figure 37:
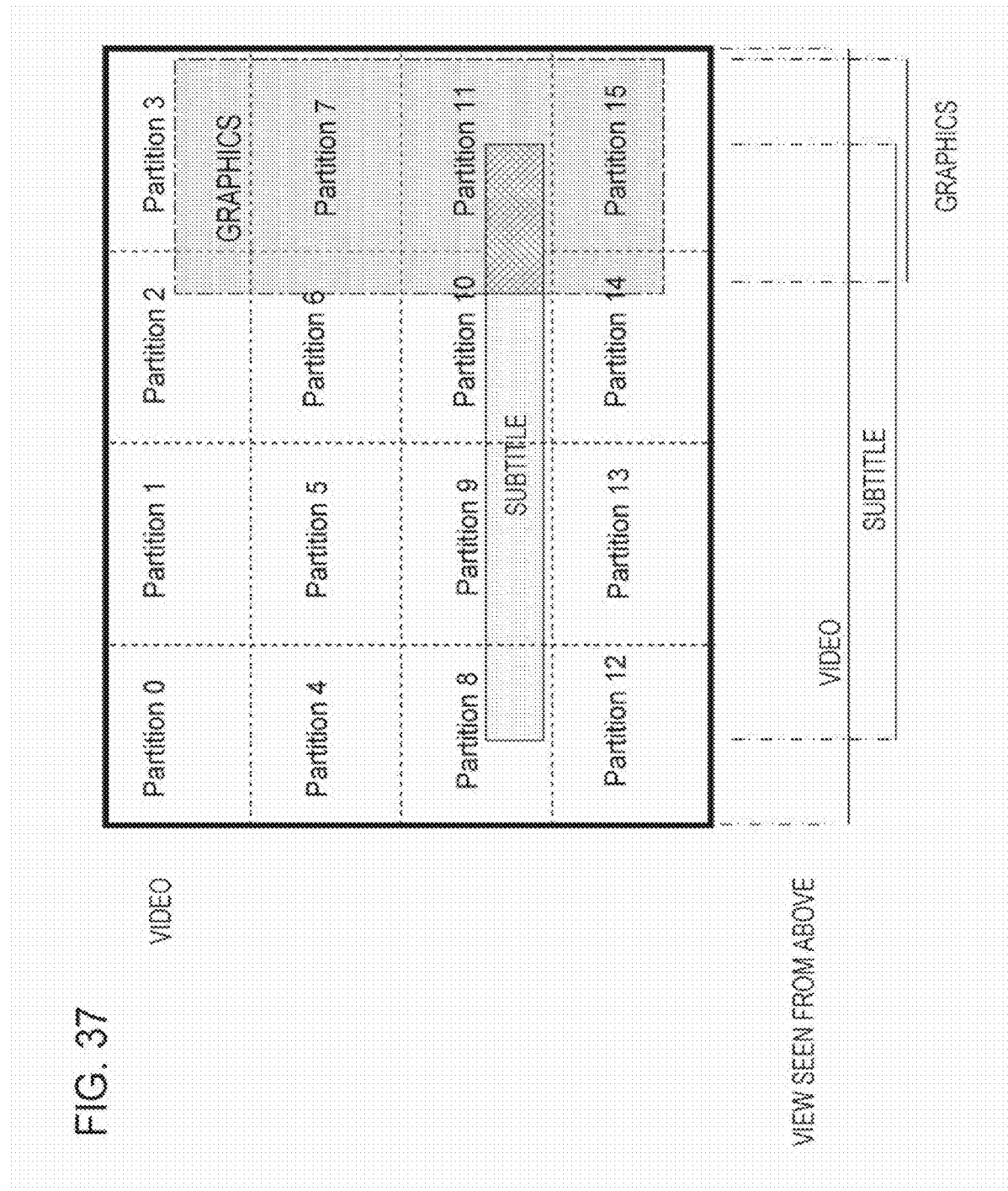
FIG. 37 is a diagram illustrating another depth control example of graphics in a set-top box.

FIG. 37 also illustrates a graphics depth control example with the set-top box 200. In this example, the graphics (STB graphics) have disparity appended to the graphics for the left eye display and graphics for the right eye display, based on the disparity information of the minimum value from the disparity information of eight partition regions on the right side (Partition 2, 3, 6, 7, 10, 11, 14, 15) and further based on the disparity information of the subtitle.

Consequently, the graphics are displayed nearer than the image (video) object of these eight partition regions, and further, are displayed nearer than the subtitle. Note that in this case, the subtitle is also displayed nearer than the image (video) object of the four partition regions (Partition 8, 9, 10, 11) corresponding to the subtitle display positions.

Note that updating processing of the disparity information in the case of the depth control example in FIG. 37 is performed as follows. That is to say, first, the disparity information values of four partition regions (Partition 8, 9, 10, 11) corresponding to the subtitle display positions are updated with the disparity information values (subtitle_disparity) used to append disparity to the subtitles. Subsequently, the disparity information values of eight partition regions (Partition 2, 3, 6, 7, 10, 11, 14, 15) are updated with the disparity information values (graphics_disparity) used to append disparity to the graphics.

Returning to FIG. 28, the coded buffer 241 temporarily stores the audio stream extracted by the demultiplexer 212. The audio decoder 242 performs processing that is opposite to the audio encoder 119 (see FIG. 8) of the transmission data generating unit 110 described above. That is to say, the audio decoder 242 performs decoding processing on the audio stream stored in the coded buffer 241, and obtains decoded audio data. The audio buffer 243 temporarily stores the audio data obtained by the audio decoder 242. The channel mixing unit 244 generates and outputs audio data for each channel to realize 5.1 ch surround or the like, for example, as to audio data stored in the audio buffer 243.

Note that reading out of information (data) from the decoded buffer 215, disparity information buffer 218, pixel buffer 233, subtitle disparity information buffer 234, and audio buffer 243 is performed based on PTS, and transfer synchronization is performed.

The HDMI transmitting unit 251 transmits left eye image data and right eye image data obtained by subtitle and graphics overlay processing having been performed at the overlaying unit 217, and audio data of each channel obtained at the channel mixing unit 244, to an HDMI sink device, the television receiving device 300 according to the present embodiment, by communication conforming to HDMI. Now, the left eye image data obtained with the overlaying unit 217 is left eye image data on which subtitles and STB graphics for the left eye display are overlaid. Also, the right eye image data obtained with the overlaying unit 217 is right eye image data on which subtitles and STB graphics for the right eye display are overlaid.

Also, this HDMI transmitting unit 251 transmits the first disparity information (Min disparity) of each picture updated by the depth control unit 220 and the second disparity information (Min disparity) of each picture output from the disparity information control unit 262 to the television receiving device 300 by way of an HDMI interface. According to the present embodiment, this first disparity information and second disparity information are inserted into an image data blanking period or an active space region, and transmitted. Details of this HDMI transmitting unit 251 will be described later.

Operations of the set-top box 200 illustrated in FIG. 28 will be described briefly. The transport stream TS received by a digital tuner or the like is temporarily stored in the container buffer 211. A video stream, subtitle stream, and audio stream are included in this transport stream TS. As a video stream, one or two video streams obtained by the left eye image data and right eye image data being encoded are included.

With the demultiplexer 212, streams for each of video, subtitles, and audio are extracted from the transport stream TS that has been temporarily stored in the container buffer 211. Also, with the demultiplexer 212, identification information indicating whether or not disparity information is inserted in the video stream (flag information of "graphics_depth_info_not_existed_flag[0]") is extracted from this transport stream TS, and is sent to an unshown control unit (CPU).

The video stream extracted by the demultiplexer 212 is supplied to the coded buffer 213 and temporarily stored. Also, decoding processing of the video stream stored in the coded buffer 213 is performed in the video decoder 214, and left eye image data and right eye image data is obtained. The left eye image data and right eye image data are temporarily stored in the decoded buffer 215.

Also, disparity information (first disparity information, second disparity information) for each picture of image data inserted into the video stream is obtained by the video decoder 214. This disparity information is temporarily stored in the disparity information buffer 218. In the disparity information control unit 262, based on the first disparity information and second disparity information for each picture stored in the disparity information buffer 218, checks are performed as to whether or not the disparity angle corresponding to the nearest object playing position (disparity angle in the intersecting direction) and the disparity angle corresponding to the farthest object playing position (disparity angle in the same-side direction) are contained within a range d (see FIG. 29) that does not harm the health of the viewer.

Now, with this disparity information control unit 262, in the case that the disparity angles are not contained within a predetermined range, instructions to reconfigure the left eye image data and right eye image data are given to the L/R reconfiguring unit 263 so that the disparity angles are contained within the predetermined range. Also, in this case, with the disparity information control unit 262, the first disparity information and/or second disparity information are corrected and output to match the reconfigured left eye image data and right eye image data. Note that with the disparity information control unit 262, in the case that the disparity angles are contained within a predetermined range d. The L/R reconfiguring unit 263 is not instructed to reconfigure the left eye image data and right eye image data, and also, the first disparity information and second disparity information are output without being corrected.

With the scaler 216, scaling processing in the horizontal direction and the vertical direction as to the left eye image data and right eye image data output from the decoded buffer 215 is performed, as necessary. Left eye image data and right eye image data of full-HD that is 1.920*1080, for example, is obtained from this scaler 216. This left eye image data and right eye image data is supplied to the overlaying unit 217, via the L/R reconfiguring unit 263.

Reconfiguring of left eye image data and right eye image data is performed, as needed, with the L/R reconfiguring unit 263. That is to say, with the L/R reconfiguring unit 263, when one of the disparity angles in the same-side direction or the intersecting direction is not contained within the range d (see FIG. 29) which does not harm the health of the viewer, reconfiguring the left eye image data and right eye image data is performed so that the disparity angles thereof are contained within the predetermined range, based on reconfiguring instructions from the disparity information control unit 262.

Also, the subtitle stream extracted by the demultiplexer 212 is supplied to the coded buffer 231 and temporarily stored. With the subtitle decoder 232, decoding processing of the subtitle stream stored in the coded buffer 231 is performed, and subtitle data is obtained. Bitmap data of the subtitle, display position information "Subtitle rendering position (x2, y2)" of this subtitle, and disparity information of the subtitle "Subtitle disparity" are included in this subtitle data.

The bitmap data of the subtitle and the display position information "Subtitle rendering position (x2, y2)" of this subtitle obtained by the subtitle decoder 232 are temporarily stored in the pixel buffer 233. Also, the subtitle disparity information "Subtitle disparity" obtained at the subtitle decoder 232 is temporarily stored in the subtitle disparity information buffer 234.

Subtitle bitmap data "Subtitle data" for left eye display and for right eye display to which disparity has been appended is generated by the subtitle display control unit 235, based on the subtitle bitmap data and the display position information and disparity information of this subtitle. The subtitle bitmap data "Subtitle data" data for left eye display and for right eye display thus generated is supplied to the overlaying unit 217, and overlaid over the left eye image data and right eye image data, respectively.

OSD or applications, or graphics data such as EPG are generated in the set-top box (STB) graphics generating unit 219. Graphics bitmap data "Graphics data" and the display position information of these graphics "Graphics rendering position (x1, y1)" are included in this graphics data. Graphics data generated by the set-top box (STB) graphics generating unit 219 is temporarily stored in the graphics buffer 221.

The graphics bitmap data "Graphics data" that is stored in the graphics buffer 221 is overlaid over the left eye image data and right eye image data at the overlaying unit 217. In this event, the of the first disparity information for each partition region of each picture of the image data output from the disparity information control unit 262, disparity is appended to the graphics bitmap data "Graphics data" that is overlaid onto each of the left eye image data and right eye image data, based on disparity information corresponding to the graphics display position, by the depth control unit 220.

In this case, in the case that the graphics bitmap data "Graphics data" shares the same pixels as the subtitle bitmap data "Subtitle data", the graphics data is overwritten over the subtitle data by the overlaying unit 217. Also, in this case, as described above, the first disparity information is not used without change, but is smoothed in the temporal direction and used by the depth control unit 220 in order to prevent discomfort of depth perception of the graphics overlay.

The left eye image data, over which the subtitle and graphics for the left eye display is overlaid, and the right eye image data, over which the subtitle and graphics for the right eye display is overlaid, are obtained from the overlaying unit 217. This left eye image data and right eye image data are supplied to the HDMI transmitting unit 251.

Also, the audio stream extracted by the demultiplexer 212 is supplied to the coded buffer 241 and temporarily stored. With the audio decoder 242, decoding processing of the audio stream stored in the coded buffer 241 is performed, and decoded audio data is obtained. This audio data is supplied to the channel mixing unit 244 via the audio buffer 243. Audio data for each channel to realize a 5.1 ch sound or the like as to the audio data, for example, is generated by the channel mixing unit 244. This audio data is supplied to the HDMI transmitting unit 251.

Also, with the depth control unit 220, the first disparity information for each partition region of each picture of the image data output from the disparity information control unit 262 is updated according to overlaying of subtitles or graphics onto the image. In this case, the values of the disparity information of the partition region corresponding to the subtitle display position and graphics display position are updated to the values of the disparity information used to append disparity to subtitles or graphics, for example. This updated disparity information is supplied to the HDMI transmitting unit 251. Also, the second disparity information of each picture of the image data output from the disparity information control unit 262 is also supplied to the HDMI transmitting unit 251.

Left eye image data and right eye image data, audio data, and further, disparity information (first disparity information, second disparity information) of each picture of the image data, is transmitted by the HDMI transmitting unit 251, with communication that is HDMI-compliant, to the television receiving device 300. The details of the HDMI transmitting unit 251 will be described later.

The disparity information is inserted in a blanking period of the image data or an active video space, and transmitted. Specifically, an HDMI Vendor Specific InfoFrame serving as an information packet that is disposed in the blanking period of the image data, for example, may be used. Also, for example, a data packet disposed in a data island period that is newly defined, for example, may be used. Also, for example, an active space region, which exists in an active video space, may be used.

[Description of Television Receiving Device]

Returning to FIG. 1, the television receiving device 300 receives left eye image data and right eye image data, audio data, and further, disparity information (first disparity information, second disparity information) of each picture of the image data that is transmitted from the set-top box 200 via the HDMI cable 400.

In the event of performing overlay display of graphics (TV graphics) onto an image, for example, the television receiving device 300 uses the image data and first disparity information and the graphics data to obtain the left eye image and right eye image data on which the graphics are overlaid. In this case, the television receiving device 300 appends disparity corresponding to the display position of the graphics, for each picture, to the graphics that are overlaid onto the left eye image and right eye image, and obtains the data of the left eye image over which graphics are overlaid and data of the right eye image over which graphics are overlaid.

By appending disparity to the graphics as described above, the graphics (TV graphics) that are overlaid and displayed over a stereoscopic image can be displayed nearer than an object in the stereoscopic image at the display position thereof. Thus, in the case of overlaying and displaying graphics of an OSD or an application or EPT of program information or the like, consistency in perspective as to each object within the image can be maintained.

Also, the television receiving device 300 can check whether or not the disparity angle corresponding to the nearest object playing position (disparity angle in the intersecting direction) and the disparity angle corresponding to the farthest object playing position (disparity angle in the same-side direction) are contained within a range d (see FIG. 47) that does not harm the health of the viewer, based on the first disparity information and the second disparity information, and if not contained, can reconfigure the left eye image data and right eye image data.

[Configuration Example of Television Receiving Device]

FIG. 38 illustrates a configuration example of an HDMI input system of the television receiving device 300. Note that the checking system for disparity angles is omitted. The television receiving device 300 has an HDMI receiving unit 311, scaler 312, overlaying unit 313, depth control unit 314, graphics buffer 315, television (TV) graphics generating unit 316, and audio processing unit 317.

The HDMI receiving unit 311 receives left eye image data and right eye image data that configures the stereoscopic image and audio data from an HDMI source device, which is the set-top box 200 according to the present embodiment, from communication that is HDMI-compliant. Also, this HDMI receiving unit 311 receives disparity information (first disparity information, second disparity information) for each picture of the image data from the set-top box 200 with an HDMI interface. Details of this HDMI receiving unit 311 will be described later.

The scaler 312 performs scaling processing as needed on the left eye image data and right eye image data received by the HDMI receiving unit 311. For example, the scale 312 matches the sizes of the left eye image data and right eye image data to a display size. The television (TV) graphics generating unit 316 generates an OSD or application or graphics data such as an EPG. Graphics bitmap data "Graph- ics data" and display position information "Graphics rendering position (x1, y1)" of the graphics thereof are included in this graphics data.

The graphics buffer 315 temporarily stores the graphics bitmap data "Graphics data" generated by the television graphics generating unit 316. The overlaying unit 313 overlays the graphics bitmap data "Graphics data" stored in the graphics buffer 315 to each of the left eye image data and right eye image data. In this event, disparity is appended to the graphics bitmap data "Graphics data" that is overlaid onto each of the left eye image data and right eye image data, by the later-described depth control unit 314.

The depth control unit 314 appends disparity to the graphics bitmap data "Graphics data" that is overlaid onto each of the left eye image data and right eye image data. Therefore, the depth control unit 314 generates display position information "Rendering position" of the graphics for the left eye display and for the right eye display, for each picture of the image data, and performs shifting control of the overlay position to the left eye image data and right eye image data of the graphics bitmap data "Graphics data" stored in the graphics buffer 315.

The depth control unit 314 generates a display position information "Rendering position", using the information below, as illustrated in FIG. 39. That is to say, the depth control unit 314 uses the first disparity information (Min disparity) of each partition region for each picture of the image data received by the HDMI receiving unit 311. Also, the depth control unit 314 uses the graphics display position information "Graphics rendering position (x1, y1)" generated by the television graphics generating unit 316. Also, the depth control unit 314 uses receiving information that indicate whether or not the disparity information is received by the HDMI receiving unit 311.

The flowchart in FIG. 40 illustrates an example of procedures of control processing of the depth control unit 314. The depth control unit 314 executes this control processing with each picture (frame) that performs graphics display. The depth control unit 314 starts the control processing in step ST21. Subsequently, in step ST22, determination is made as to whether or not disparity information for graphics has been received by the HDMI receiving unit 311. Note that the when the "PRTY" identification information of the packet of the HDMI Vendor Specific InfoFrame, which is to be described later, indicates the existence of disparity information as information to be referenced, the HDMI receiving unit 311 extracts the disparity information from the packet, and provides for use. In this case, the receiving information is "there is reception".

When there is reception of disparity information, the depth control unit 314 moves to the processing in step ST23. In step ST23, all of the partition regions wherein coordinates for overlaying and displaying graphics are included are inspected. Also, in step ST24, the depth control unit 314 compares the first disparity information (Min disparity) of the partition regions to be used, selects an optimal value, e.g. a minimum value, and sets this as the value of the graphics disparity information (graphics_disparity).

Next, in step ST25, the depth control unit 314 uses an equivalent value as to the disparity information value for graphics (graphics_disparity) as to the graphics bitmap data "Graphics data" stored in the graphics buffer 315, obtains graphics bitmap data for left eye display and for right eye display in which the display positions have been shifted, and overlays these to the left eye image data and right eye image data, respectively. After the processing in step ST25, in step ST26 the depth control unit 314 ends the control processing.

Also, when there is no reception of disparity information in step ST22, in step ST27 the depth control unit 314 uses the value of the disparity information calculated by the television receiving device 300 as to the graphics bitmap data "Graphics data" stored in the graphics buffer 315, obtains graphics bitmap data for left eye display and for right eye display in which the display positions have been shifted, and overlays these to the left eye image data and right eye image data, respectively. After the processing in step ST27, in step ST26 the depth control unit 314 ends the control processing.

FIG. 41 illustrates a depth control example of graphics in the television receiving device 300. In this example, disparity is appended to the graphics for left eye display and the graphics for right eye display, based on the disparity information of the minimum value of the first disparity information of four partition regions on the right side (Partition 10, 11, 14, 15). As a result, the TV graphics are displayed nearer than the image (video) object in these four partition regions. Note that in this case, the subtitles and further, the STB graphics, are already overlaid onto the image (video) by the set-top box 200.

Operations of the television receiving device 300 illustrated in FIG. 38 will be briefly described. With the HDMI receiving unit 311, left eye image data and right eye image data, audio data, and further, disparity information (first disparity information, second disparity information) for each picture of the image data is received from the set-top box 200 by communication that is HDMI-compliant.

Upon scaling processing having been performed as needed by the scaler 312, the left eye image data and right eye image data received by the HDMI receiving unit 311 is supplied to the overlaying unit 313. With the television TV) graphics generating unit 316, an OSD or application or graphics data such as EPG is generated. Graphics bitmap data "Graphics data" and the display position information of these graphics "Graphics rendering position (x1, y1)" are included in this graphics data. The graphics data generated by the television graphics generating unit 315 is temporarily stored in the graphics buffer 315.

The graphics bitmap data "Graphics data" stored in the graphics buffer 315 is overlaid onto the left eye image data and right eye image data by the overlaying unit 313. In this event, disparity is appended to the graphics bitmap data "Graphics data", which is overlaid onto each of the left eye image data and right eye image data, by the depth control unit 314, based on the first disparity information (Min disparity) corresponding to the graphics display position.

The first disparity information of each partition region for each picture of the image data, and the graphics display position information "Graphics rendering position (x1, y1)" generated by the television graphics generating unit 316, which are received by the HDMI receiving unit 311, are used by the depth control unit 314 for the control thereof.

Left eye image data onto which TV graphics for left eye display is overlaid is obtained, and right eye image data onto which TV graphics for right eye display is obtained, from the overlaying unit 313. This image data is transmitted to the processing unit for stereoscopic image display, and stereoscopic image display is performed.

Also, the audio data from each channel received by the HDMI receiving unit 311 is supplied to a speaker via the audio processing unit 317 which performs adjustments to sound quality and volume, and audio output that matches the stereoscopic image display is performed.

[Configuration Example of HDMI Transmitting Unit and HDMI Receiving Unit]

Figure 42:
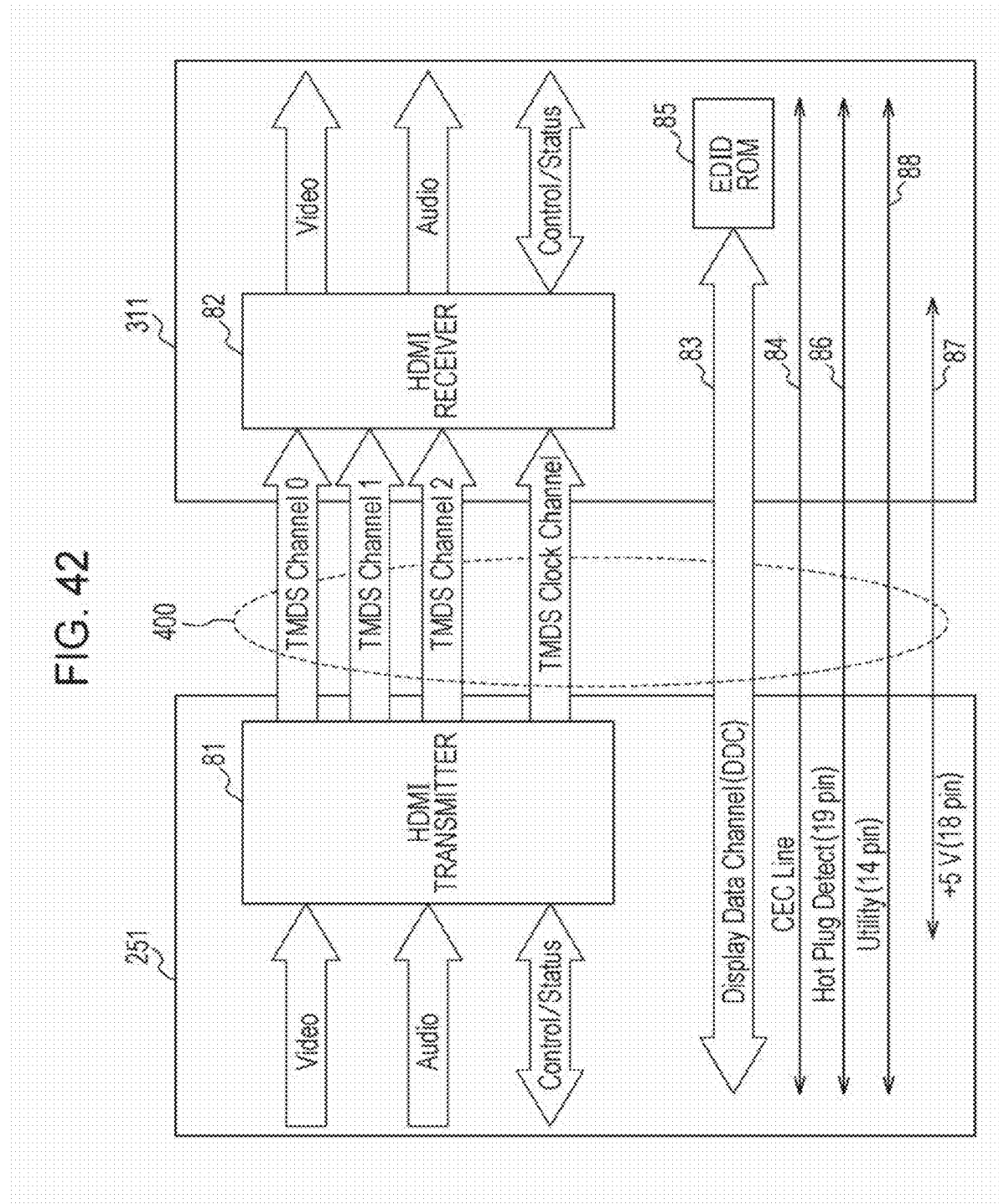
FIG. 42 is a block diagram illustrating a configuration example of an HDMI transmitting unit of a source device and an HDMI receiving unit of a sink device.

FIG. 42 illustrates a configuration example of the HDMI transmitting unit 251 of the set-top box 200 and the HDMI receiving unit 311 of the television receiving device 300 in the image transmitting/receiving system 10 in FIG. 1.

The HDMI transmitting unit 251 transmits a differential signal corresponding to image data of a non-compressed image for one screen, in one direction to the HDMI receiving unit 311, with multiple channels, in valid image segments (hereinafter, also called active video spaces). Now, the valid image segment is a segment that has removed horizontal blanking interval and vertical blanking interval from a segment of one vertical synchronized signal to the next vertical synchronized signal. Also, the HDMI transmitting unit 251 transmits in one direction to the HDMI receiving unit 311, a differential signal that corresponds to at least audio data and control data, and other auxiliary data or the like that is associated with the image, with multiple channels, in a horizontal blanking interval or vertical blanking interval.

A transmission channel of the HDMI system made up of the HDMI transmitting unit 251 and HDMI receiving unit 311 may be the following transmission channel. That is to say, there are three TMDS channels, #0 through #2, which are transmission channels that synchronize the image data and audio data to a pixel clock, and transmit serially in one direction from the HDMI transmitting unit 251 to the HDMI receiving unit 311. Also, there is a TMDS clock channel, which is a transmission channel to transmit pixel clocks.

The HMDI transmitting unit 251 has an HDMI transmitter 81. The transmitter 81 converts the image data of a non-compressed image to a corresponding differential signal, and through the three TMDS channels #0, #1, and #2 which are multiple channels, transmits serially in one direction to the HDMI receiving unit 311 which is connected via the HDMI cable 400.

Also, the transmitter 81 converts the audio data associated to a non-compressed image, and further, other auxiliary data or the like such as necessary control data, to a corresponding differential signal, and through the three TMDS channels #0, #1, and #2, transmits serially in one direction to the HDMI receiving unit 311.

Further, the transmitter 81 transmits a pixel clock that is synchronized to the image data transmitted through the three TMDS channels #0, #1, and #2 to the HDMI receiving unit 311 connected via the HDMI cable 400, through a TMDS clock channel. Now, 10 bits of image data are transmitted in the time of one clock of a pixel clock, through one TMDS channel #i (i=0, 1, 2).

The HDMI receiving unit 311 receives the differential signal corresponding to the pixel data, which is transmitted from the HDMI transmitting unit 251 in one direction through multiple channels, in an active video space. Also, this HDMI receiving unit 311 receives differential signals corresponding to the audio data and control data transmitted in one direction from the HDMI transmitting unit 251, through multiple channels, in a horizontal blanking interval or vertical blanking interval.

That is to say, the HDMI receiving unit 311 has an HDMI receiver 82. This HDMI receiver 82 receives a differential signal corresponding to pixel data and differential signals corresponding to audio data and control data, which are transmitted in one direction from the HDMI transmitting unit 251 through the TMDS channels #0, #1, and #2. In this case, the signals transmitted from the HDMI transmitting unit 251 through the TMDS clock channel are synchronized to the pixel clock, and received.

The transmission channel of the HDMI system may be a transmission channel called DDC (Display Data Channel) 83 or CEC line 84, besides the above-described TMDS channels #0 through #2 and the TMDS clock channel. The DDC 83 is made up of two unshown signal lines included in the HDMI cable 400. The DDC 83 is used for the HDMI transmitting unit 251 to read out E-EDID (Enhanced Extended Display Identification Data) from the HDMI receiving unit 311.

That is to say, the HDMI receiving unit 311 has an EDID ROM (Read Only Memory) 85, which stores the E-EDID which is capability information relating to its own capability (Configuration/capability), besides the HDMI receiver 81. The HDMI transmitting unit 251 reads out the E-EDID from the HDMI receiving unit 311 that is connected via the HDMI cable 400, via the DDC 83, according to a request from an unshown control unit (CPU), for example.

The HDMI transmitting unit 251 transmits the read-out E-EDID to the control unit (CPU). Based on this E-EDID, the control unit (CPU) can recognize the settings of the capabilities of the HDMI receiving unit 311. For example, the control unit (CPU) recognizes whether or not the television receiving device 300 having the HDMI receiving unit 311 can handle stereoscopic image data, and if capable, whether any TMDS transmission data configuration can be handled.

The CEC line 84 is made up of one unshown signal line included in the HDMI cable 400, and is used to perform bi-directional communication of control data between the HDMI transmitting unit 251 and HDMI receiving unit 311. This CEC line 84 makes up a control data line.

Also, a line (HPD line) 86 connected to a pin called an HPD (Hot Plug Detect) is included in the HDMI cable 400. The source device can use this line 86 and detect connections of the sink device. Note that this HPD line 86 is also used as an HEAC− line which makes up a hi-directional communication path. Also, a line (power line) 87 that is use to supply power from the source device to the sink device is included in the HDMI cable 400. Further, a utility line 88 is included in the HMDI cable 400. This utility line 88 is also used as an HEAC+ line which makes up a bi-directional communication path.

FIG. 43 illustrates a configuration example of TMDS transmission data. This FIG. 43 illustrates a segment of various types of transmission data in the case that image data having horizontal×vertical dimensions of 1920 pixels×1080 lines is transmitted through the TMDS channels #0, 1, and #2.

Three types of segments exits in a video field in which transmission data is transmitted through the three TMDS channels #0, #1, and #2 of HDMI, according to the type of transmission data. These three types of segments are a video data period, data island period, and control period.

Now, the video field segment is a segment from the active edge of a certain vertical synchronizing signal to the active edge of the next vertical synchronizing signal. This video field segment can be divided in a horizontal blanking period, vertical blanking period, and active video space (Active Video). This active video space is a segment which has removed the horizontal blanking period and vertical blanking period from the video field segment.

The video data period is allocated to an active video space. In this video data period, data of active pixels for 1920 pixels*1080 lines making up one screen of non-compressed image data is transmitted.

The data island period and control period are allocated to the horizontal blanking period and vertical blanking period. In the data island period and control period, auxiliary data is transmitted. That is to say, the data island period is allocated to a portion of the horizontal blanking period and vertical blanking period. With this data island period, of the auxiliary data, data that is not related to control, for example packets of audio data or the like, is transmitted.

The control period is allocated to other portions than the horizontal blanking period and vertical blanking period. In this control period, of the auxiliary data, data that is related to control, for example vertical synchronizing signals and horizontal synchronizing signals, control packets, and the like are transmitted.

[Disparity Information Transmitting/Receiving Method with HDMI]

A method to transmit/receive disparity information of each partition region for each picture of the image data with an HDMI interface will be described.

"(1) Example of Using HDMI Vendor Specific InfoFrame"

The transmission of disparity information in each partition region for each picture of the image data, using HDMI Vendor Specific InfoFrame (VS_Info) will be described.

According to this method, in the VS_Info, "HDMI_Video_Format="010"" and "3D_Meta_present=1", whereby "Vendor Specific InfoFrame extension" is specified. In this case, "3D_Metadata_type" is defined as an unused "001", for example, and disparity information of each partition region is specified.

FIG. 44 illustrates a VS_Info packet configuration example. This VS_Info is defined in CEA-861-D, so detailed information will be omitted. FIG. 45 illustrates content of the primary information in the packet configuration ample illustrated in FIG. 44.

3-bit information "HDMI_Video_Format" indicating the type of image data is disposed from the seventh bit to the fifth bit of the fourth byte (PB4). In the case that the image data is 3D image data, this 3-bit information is "010". Also, in the case that the image data is 3D image data, 4-bit information "3D_Structure" indicating a TMDS transmission data configuration is disposed from the seventh bit to the fourth bit of the fifth byte (PB5). For example, in the case of a frame packing method, this 4-bit information is "0000".

Also, in the case that "3D_Meta_present" is disposed in the third bit of the fifth byte (PB5) and Vendor Specific InfoFrame extension is specified, this 1-bit is "1". Also, "3D_Metadata_type" is disposed from the seventh bit to the fifth bit of the seventh byte (PB7). In the case of specifying disparity information of each partition region, this 3-bit information is an unused "001", for example.

Also, "3D_Metadata_length" is disposed from the fourth byte to the 0'th byte of the seventh byte (PB7). This 5-bit information indicates the size of the disparity information of each partition region.

Also, 1-bit identification information of "PRTY" is disposed in the 0th bit of the sixth byte (PB6). This identification information is information that the HDMI sink side should reference, and here indicates whether or not the disparity information is included in this VS_Info. "1" indicates that information that the HDMI sink should reference is always included. "0" indicates that information that the HDMI sink should reference is not necessarily included.

This 1-bit identification information of "PRTY" is disposed, whereby the HDMI sink, which is the television receiving device 300 according to the present embodiment, can determine whether or not the information that should be referenced is included in the VS_Info, even without inspecting "3D_Metadata_type" and below. Accordingly, at the HDMI sink, extracting processing of information to be referenced from the VS_Info can be performed without waste due to this identification information, and processing load can be reduced.

Also, "partition_type" is disposed from the seventh bit to the fifth bit of the eighth byte (PB8). This 3-bit information indicates the partition type of the display screen for the subject picture. "000" indicates partition type "type000" as indicated in FIG. 19(a). "001" indicates partition type "type001" as indicated in FIG. 19(b). "010" indicates partition type "type010" as indicated in FIG. 19(c). "011" indicates partition type "type011" as indicated in FIG. 19(d). "100" indicates partition type "type100" as indicated in FIG. 19(e). "101" indicates partition type "type101" as indicated in FIG. 19(f).

Also, 1-bit identification information of "d_picture" is disposed in the fourth bit of the eighth byte (PB8). This identification information indicates either single picture or double picture. "0" indicates a single picture, i.e., that the mode is to transmit the amount of one picture as disparity information of each partition region. "1" indicates a double picture, i.e., that the mode is to transmit the amount of two pictures as disparity information of each partition region.

Also, "partition_count" is disposed from the third bit to the 0'th bit in the eighth byte (P8). This 4-bit information indicates the total number of partition regions, and is a value that depends on the above-described "partition_type". For example, "0000" indicates 1, "0011" indicates 4, "0111" indicates 8, "1000" indicates 9, "1100" indicates 13, and "1111" indicates 16.

Also, at the eighth+1 byte (PB8+1) and thereafter, disparity information (first disparity information, second disparity information) for one picture or two pictures is sequentially disposed. The 8-bit information of "Max_disparity_in_picture" indicates the second disparity information of the entire picture display screen (entire picture), i.e., the maximum disparity information (disparity value) of the entire picture. The 8-bit information of "Min_disparity_in_picture" indicates the first disparity information of each partition region, i.e., the minimum disparity information (disparity value) of each partition region.

FIG. 46 illustrates a VS_Info configuration example in the case of "d_picture=0", that the mode is for single picture, "partition_type=010", and the partition region is "16". In this case, disparity information for each partition region for one picture is disposed at the eighth+1 byte (PB8+1) and thereafter.

As described above, in the case that disparity information is inserted into the video stream in picture increments, the set-top box 200 obtains disparity information for one picture at the timing for each picture of the image data (see FIG. 25). Also, as described above, in the case that disparity information is inserted into the video stream in GOP increments, the set-top box 200 obtains the disparity information for each picture within the GOP (disparity information set) together, and the head timing of the GOP of the image data (see FIG. 26).

In either case, the set-top box 200 can optionally select either mode of single picture or double picture, based on negotiation using the CEC line 84 between the television receiving device 300, or from settings with the EDIDROM 85, for example. In this case, the set-top box 200 can select the mode according to the transmission band for transmitting disparity information for each picture, or processing capability of the set-top box 200 and television receiving device 300, whereby transmitting disparity information to the television receiving device 300 can be favorably performed.

With the television receiving device 300, disparity information of all of the pictures can be accurately received, regardless of which mode of transmission is used, based on the mode identification information of the "d_picture" disposed in the VS_Info and the identification information of whether or not the above-described "PRTY" reference information exists.

Figure 47:
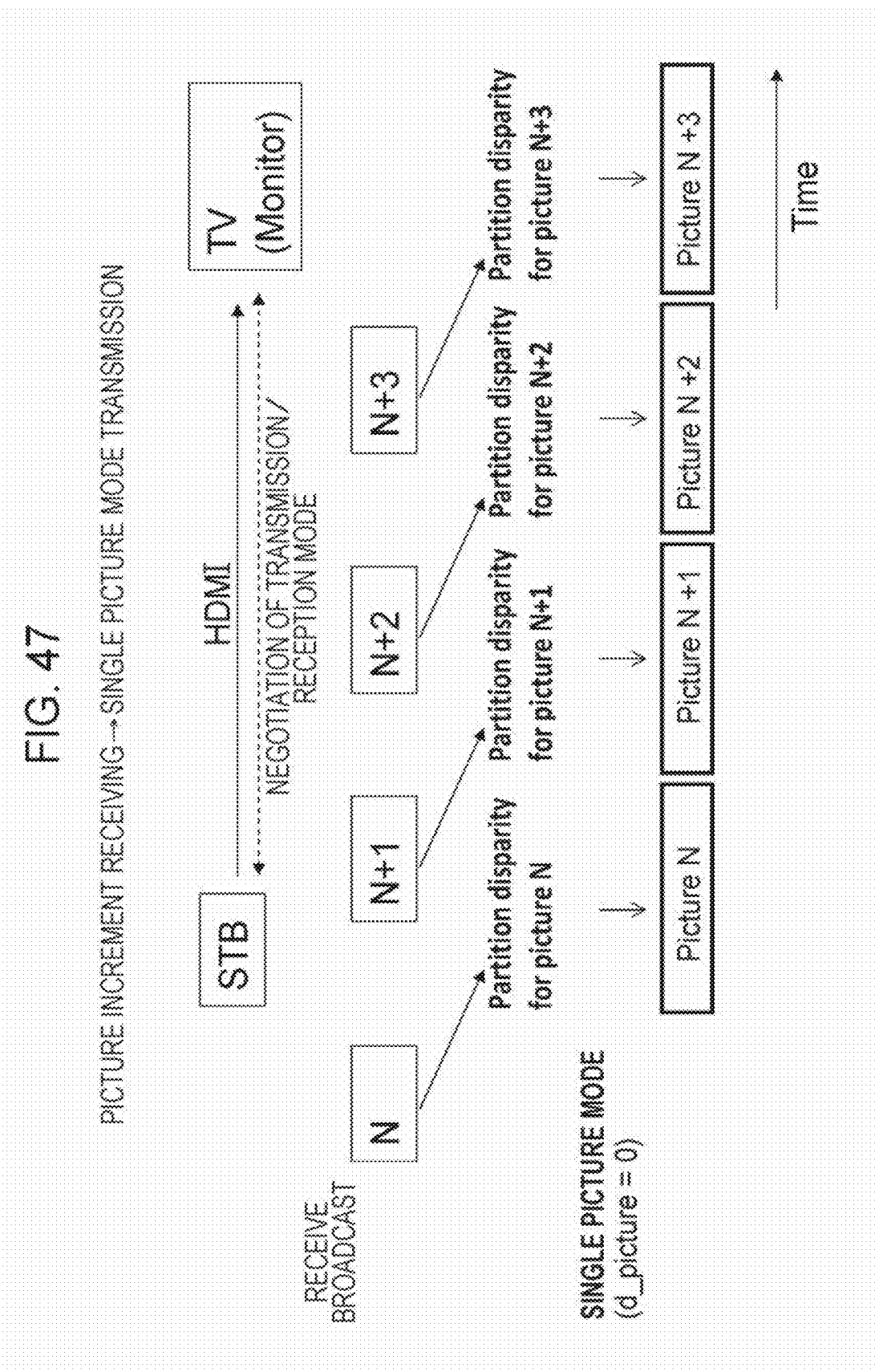
FIG. 47 is a diagram schematically illustrating a case in which picture increment receiving and single picture mode transmitting are performed.

FIG. 47 schematically illustrates a case wherein the set-top box 200 obtains the disparity information for one picture at the timing of each picture of the image data, and sequentially transmits to the television receiving device 300 the disparity information for each picture according to single picture mode. Also, FIG. 48 schematically illustrates a case wherein the set-top box 200 obtains the disparity information for one picture at the timing of each picture of the image data, and sequentially transmits to the television receiving device 300 the disparity information for each picture according to double picture mode.

Figure 49:
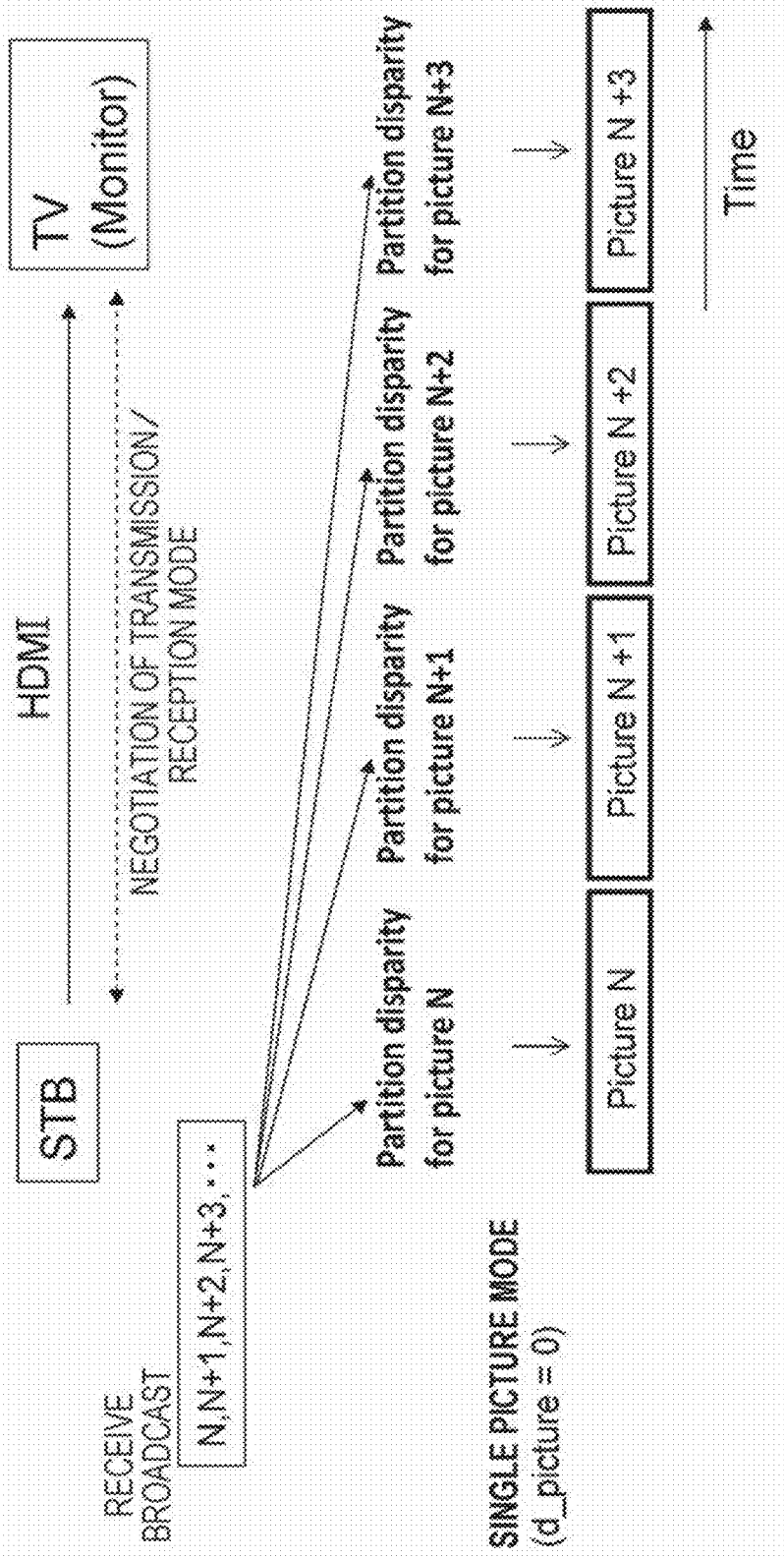
FIG. 49 is a diagram schematically illustrating a case in which GOP increment (multiple picture increment) receiving and single picture mode transmission are performed.
Figure 50:
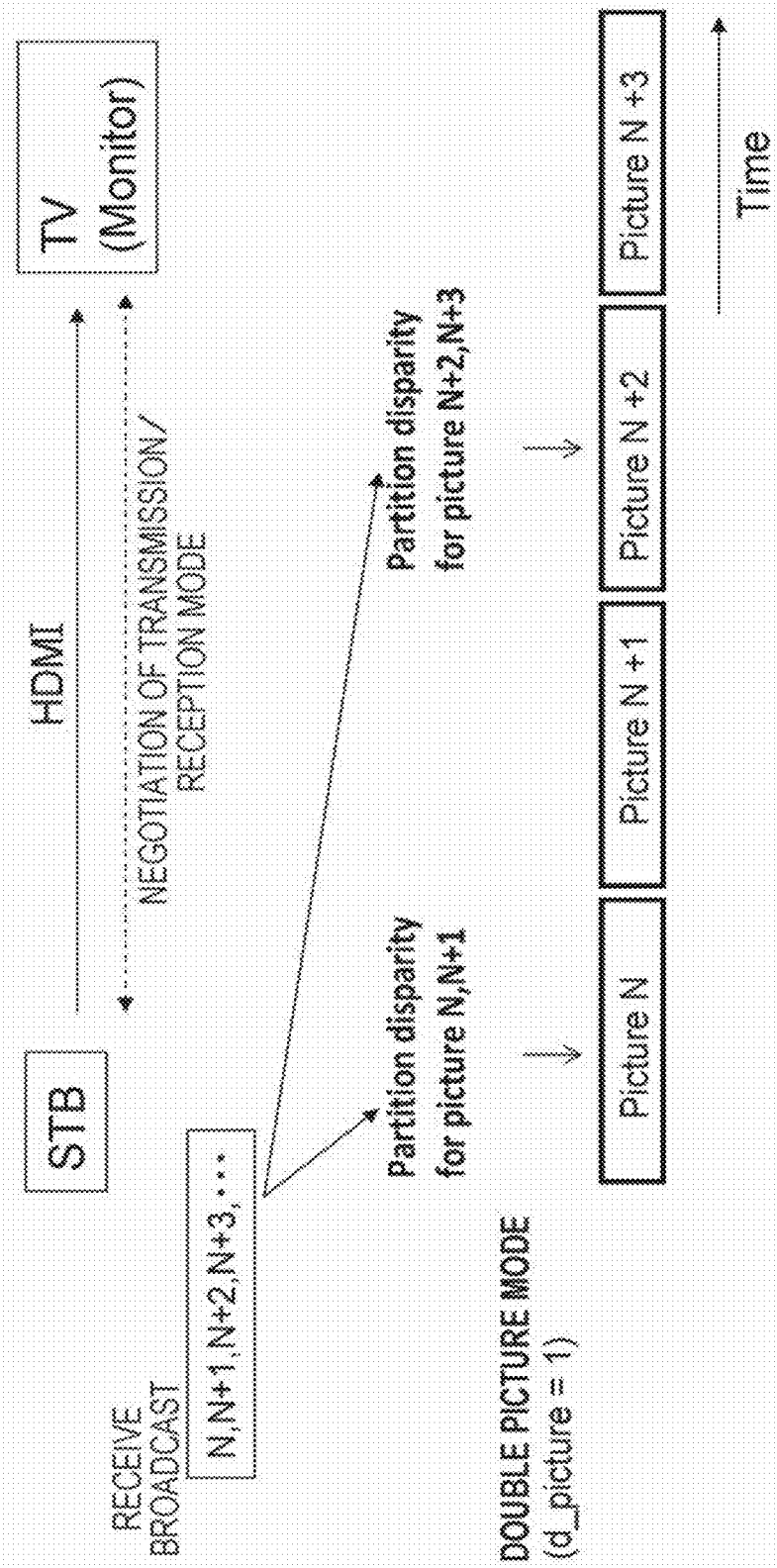
FIG. 50 is a diagram schematically illustrating a case in which GOP increment (multiple picture increment) receiving and double picture mode transmission are performed.

Also, FIG. 49 schematically illustrates a case wherein the set-top box 200 obtains the disparity information for each picture within the GOP together at the head timing of the GOP of the image data, and sequentially transmits the disparity information for each picture according to the single picture mode to the television receiving device 300. Further, FIG. 50 schematically illustrates a case wherein the set-top box 200 obtains the disparity information for each picture within the GOP together at the head timing of the GOP of the image data, and sequentially transmits the disparity information for each picture according to the double picture mode to the television receiving device 300.

Note that in the description above, the set-top box 200 is described as being able to optionally select the mode of single picture or double picture. However, for example, when obtaining the disparity information of each picture within the GOP at the head timing of the GOP of the image data, transmission may be in single picture mode. In this case, the disparity information of each picture within the GOP is assigned to individual pictures, and the disparity information for each individual picture is sequentially transmitted in increments of pictures (see FIG. 49). In this case, even in the case where the transmission band for transmitting disparity information for each picture is small, the disparity information of each picture can be favorably transmitted to the television receiving device 300.

Figure 48:
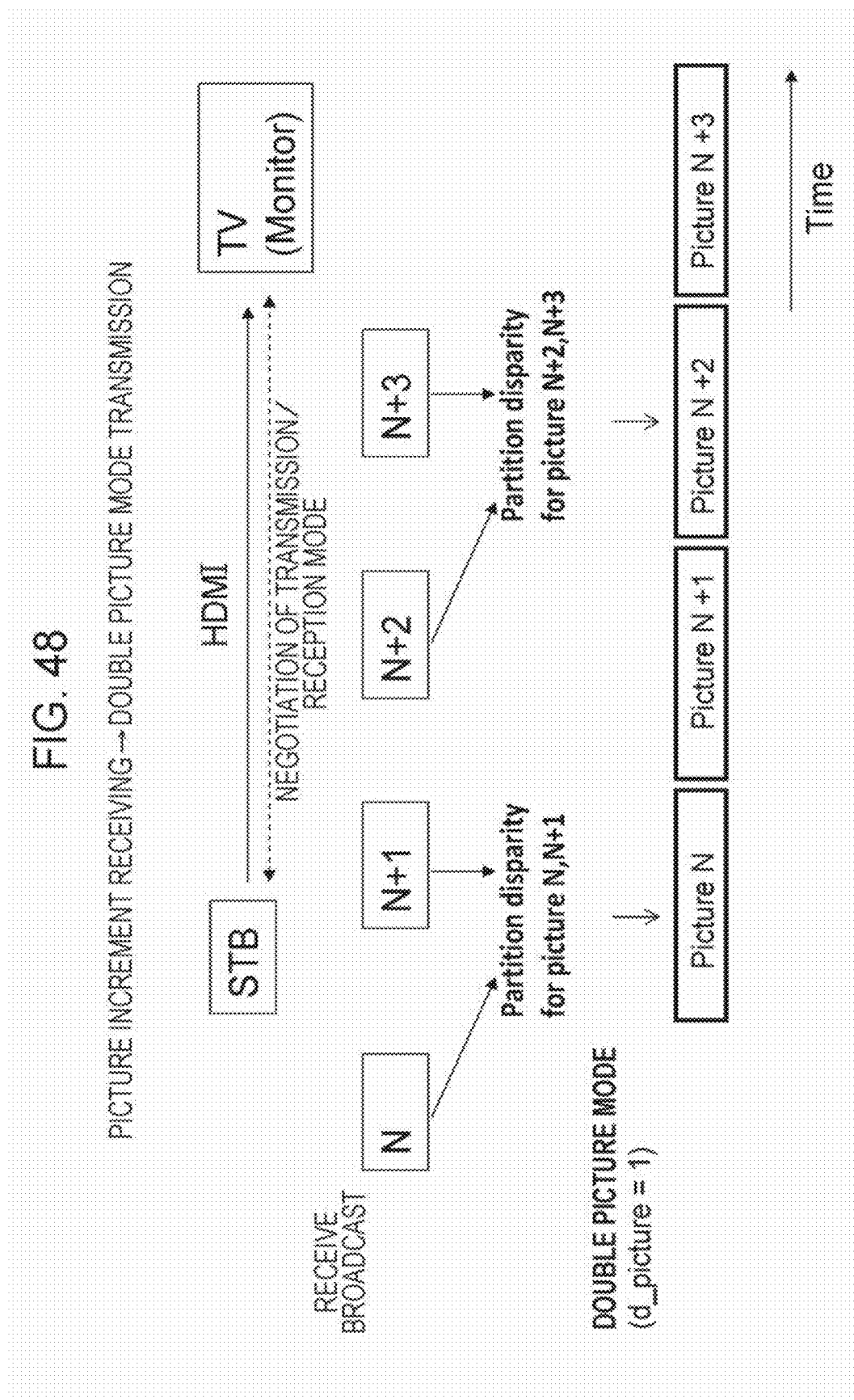
FIG. 48 is a diagram schematically illustrating a case in which picture increment receiving and double picture mode transmitting are performed.

On the other hand, in the case that the set-top box 200 can only transmit VS_Info at the rate of once for every two video frames, or the television receiving device 300 can only receive VS_Info at the rate of once for every two video frames, transmitting the disparity information for two video frames consecutively, with one VS_Info, may be conceived, as in FIG. 48.

Note that in double picture mode, the amount of transmission data can be reduced by setting the disparity information for the first picture or second picture as the differential data between the disparity information of one picture prior.

Figure 51:
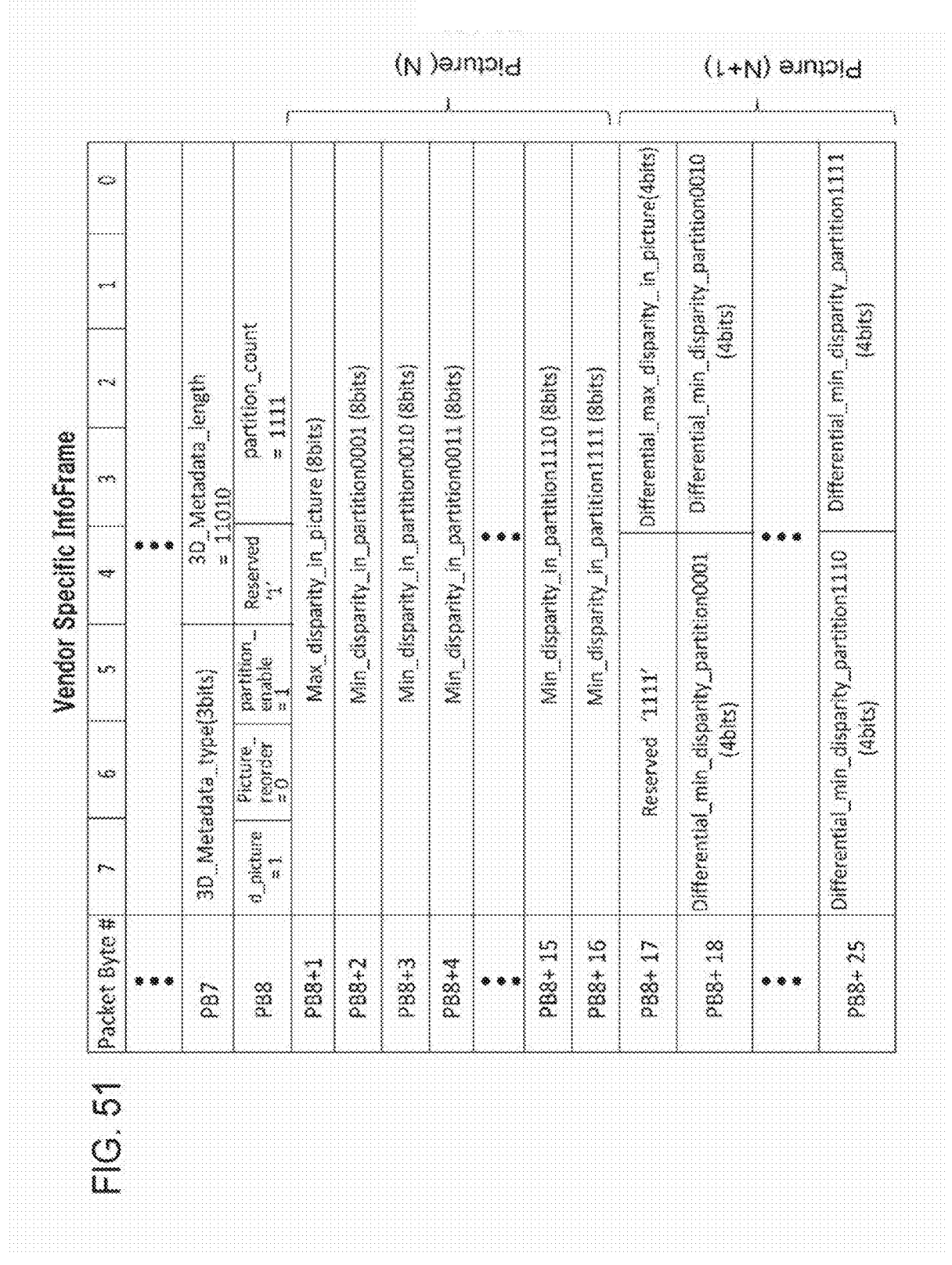

FIG. 51 and FIG. 52 illustrate another packet configuration example of the VS_Info (HDMI Vendor Specific InfoFrame). While detailed descriptions will be omitted, the 0'th byte (PB0) through the sixth byte (PB6) are similar to the packet configuration example illustrated in FIG. 44 described above. FIG. 45 illustrates the content of the primary information in the packet configuration example illustrated in FIG. 51 and FIG. 52.

"3D_Metadata_type" is disposed from the seventh bit to the fifth bit of the seventh byte (PB7). IN the case of specifying disparity information of each partition region, this 3-bit information may be an unused "001", for example.

Also, "3D_Metadata_length" is disposed from the fourth byte to the 0'th byte of the seventh byte (PB7). This 5-bit information indicates the size of disparity information of each partition region. The value of this "3D_Metadata_length" takes the value of 0x00 to 0x16. For example, "00011" is expressed as 3 (in decimal numbers), and "11010" is expressed as 26 (in decimal numbers).

1-bit identification information of "d_picture" is disposed at the seventh bit of the eighth byte (PB8). This identification information indicates single picture or double picture. "0" indicates a single picture, that is, a mode to transmit one picture worth of disparity information of each partition region. "1" indicates a double picture, that is, a mode to transmit two pictures worth of disparity information of each partition region.

1-bit identification information of "partition_enable" is disposed at the fifth bit of the eighth byte (PB8). This identification information indicates whether or not the picture in question has disparity information of each partition region. "1" indicates that partition regions are specified in horizontal and vertical directions, and that each has disparity information. "0" indicates that the entire screen has one set of disparity information.

1-bit identification information of "Picture_reorder" is disposed in the sixth bit of the eighth byte (PB8). In the case of transmitting a double picture, whether, in the transmission of two pictures (N, N+1), N is first temporally and N+1 is later, or whether N+1 is first and N is later, is indicated. "1" indicates that the (N+1) picture is first and the value of the disparity information is expressed in 8 bits, and that the N picture is later and the differential value from the disparity information of the (N−1) picture is expressed in 4 bits. "0" indicates that the N picture is first and the value of the disparity information is expressed in 8 bits, and that the (N+1) picture is later and the differential value from the disparity information of the N picture is expressed in 4 bits.

Also, "partition_count" is disposed from the third bit to the 0'th bit of the eighth byte (PB8). This 4-bit information indicates the total number of partition regions. For example, "0000" indicates 1, "0011" indicates 4, "0111" indicates 8, "1000" indicates 9, "1100" indicates 13, and "1111" indicates 16.

Also, at the eighth+1 byte (PB8+1) and thereafter, disparity information (first disparity information, second disparity information) for one picture or two pictures is sequentially disposed. The 8-bit information of "max_disparity_in_picture" indicates the second disparity information of the entire picture display screen (entire picture), i.e., the maximum disparity information (disparity value) of the entire picture. The 8-bit information of "Min_disparity_in_partition" indicates the first disparity information of each partition region, i.e., the minimum disparity information (disparity value) of each partition region.

FIG. 51 illustrates a VS_Info configuration example in the case of "d_picture=1", that the mode is for double picture, "picture_reorder=0", and the N picture is temporally first and the N+1 picture is later. Note that this example indicates a case where "partition_count=1111" and the partition region is "16".

In this case, the second disparity information for the entire picture display screen of the N picture, i.e., "Max_disparity_in_picture" which is the maximum disparity information (Disparity value) of the entire picture, is disposed at the eighth+1 byte (PB8+1) and thereafter. Also, the first disparity information of each partition region of the N picture, i.e., "Min_disparity_in_partition" which is the minimum disparity information (Disparity value) of each partition region, is disposed from the eighth+2 byte (PB8+2) to the eighth+16 byte (PB8+16).

Also, in this case, second disparity information of the entire picture display screen of the N+1 picture, i.e., the "Differential_max_disparity_in_picture" which is differential data of the maximum disparity information (disparity value) of the entire picture, is disposed from the third bit to the 0'th bit of the eighth+17 byte (PB8+17). First disparity information of each partition region in the N+1 picture, i.e., the "Differential_min_disparity_in_partition" which is differential data of the minimum disparity information (disparity value) of each partition region, is disposed from the eighth+18 byte (PB8+18) to the eighth+25 byte (PB8+25).

The configuration example of the VS_Info in FIG. 52 illustrates a VS_Info configuration example in the case of "d_picture=1", that the mode is for double picture, "picture_reorder=1", and the N+1 picture is temporally first and the N picture is later. Note that this example indicates a case where "partition_count=1111" and the partition region is "16".

In this case, second disparity information for the entire picture display screen of the N+1 picture, i.e., "Max_disparity_in_picture" which is the maximum disparity information (disparity value) of the entire picture, is disposed at the eighth+1 byte (PB8+1). Also, the first disparity information of each partition region of the N+1 picture, i.e., "Min_disparity_in_partition" which is the minimum disparity information (disparity value) of each partition region, is disposed from the eighth+2 byte (PB8+2) to the eighth+16 byte (PB8+16).

Also, in this case, second disparity information of the entire picture display screen of the N picture, i.e., the "Differential_max_disparity_in_picture" which is differential data of the maximum disparity information (disparity value) of the entire picture, is disposed from the third bit to the 0'th bit of the eighth+17 byte (PB8+17). First disparity information of each partition region in the N picture, i.e., the "Differential_min_disparity_in_partition" which is differential data of the minimum disparity information (disparity value) of each partition region in the N picture, is disposed from the eighth+18 byte (PB8+18) to the eighth+25 byte (PB8+25).

[Order Determination of N Picture and N+1 Picture]

Figure 53:
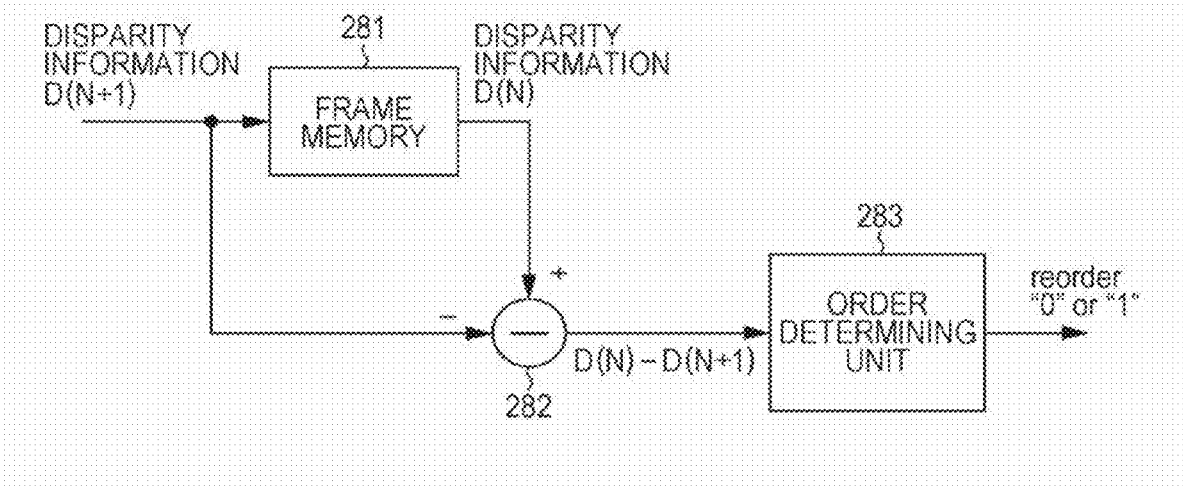
FIG. 53 is a block diagram illustrating a configuration example to perform order determination of N picture and N+1 picture.

Now, the order determination of the N picture and N+1 picture, i.e., the determination of whether "picture_reorder" will be "0" or will be "1." is performed as follows, for example. The order determination of the N picture and N+1 picture is performed in a configuration as illustrated in FIG. 53, for example. The disparity information is supplied to a frame memory 281, and only one frame is delayed. With a subtractor 282, the differential data "D(N)−D(N+1)" between the N+1 picture disparity information D(N+1) and the N picture disparity information D(N) is calculated, and the differential data herein is sent to an order determining unit 283.

With the order determining unit 283, an absolute value of difference data $|D(N)-D(N+1)|$ and a threshold value Th are compared, and order determination of the N picture and N+1 picture is performed. When $|D(N)-D(N+1)| \leq Th$ holds, the order determining unit 283 determines that "N picture is first, N+1 picture is later", the "picture_reorder" of the VS_Info is set to "0", and the disparity information of the N picture and N+1 picture is disposed as illustrated in FIG. 51 described above. In this case, the disparity information of the N+1 picture is the differential data from the disparity information of the N picture.

Figure 54:
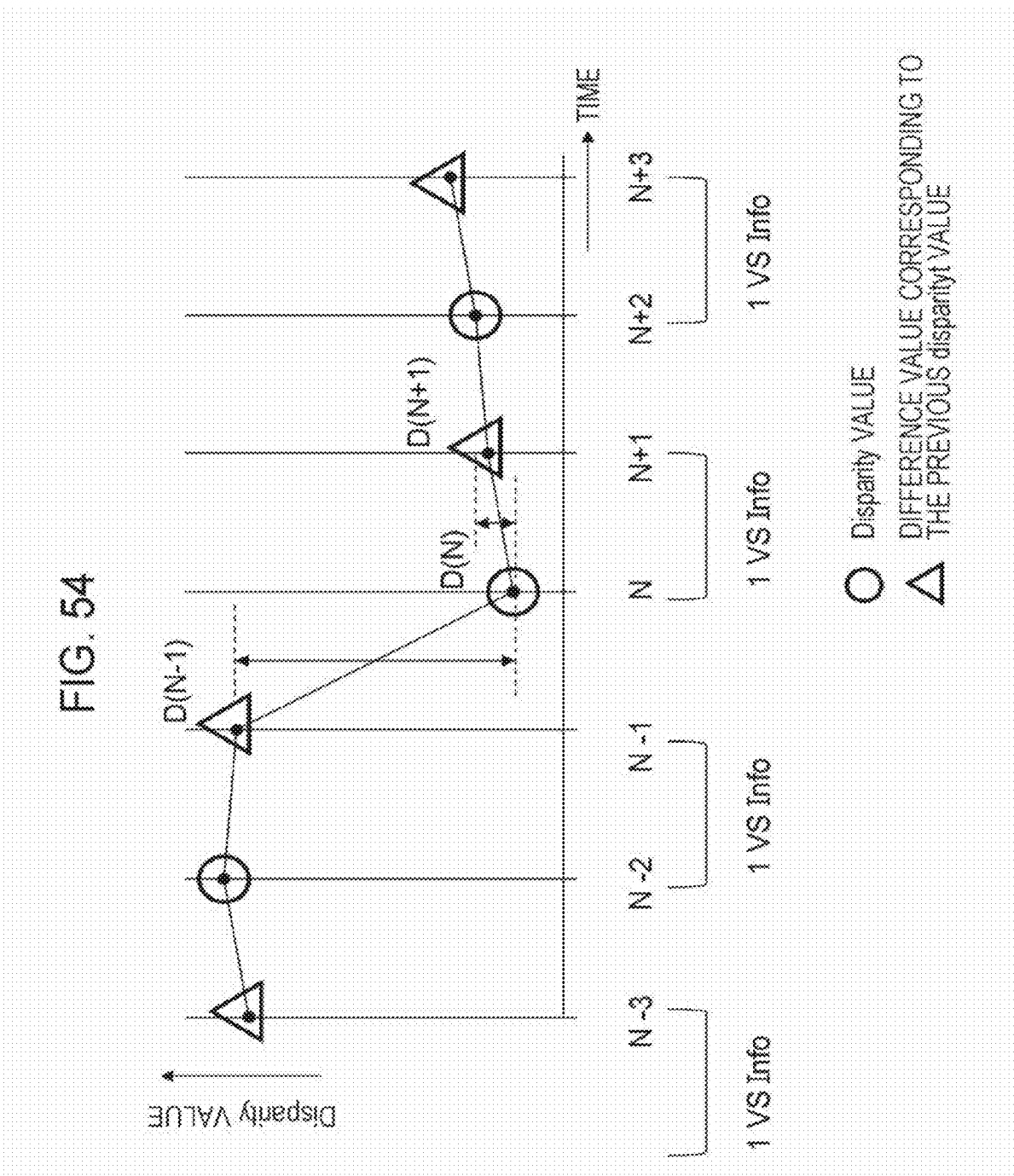
FIG. 54 is a diagram illustrating a time shift example of the disparity information (Disparity value) in the case where |D (N+1)−D (N)|≤Th.

FIG. 54 illustrates a time shift example of the disparity information (Disparity value) in the case that |D(N)−D(N+1)|≤Th holds. In this example, the disparity information changes greatly between the N−1 picture and the N picture. However, change to the disparity information between the N picture and the N+1 picture is small. Therefore, |D(N)−D(N+1)|≤Th is satisfied. In this case, the disparity information of the N+1 picture is the differential data from the disparity information of the N picture, so the value thereof is relatively small.

On the other hand, when |D(N)|D(N+1)|>Th holds, the order determining unit 283 determines that "N+1 picture is first, N picture is later", sets the "picture_reorder" of the VS_Info to "1", and disposes the disparity information of the N+1 picture and N picture as illustrated in FIG. 52 described above. In this case, the disparity information of the N picture is the differential data from the disparity information of the N−1 picture.

Figure 55:
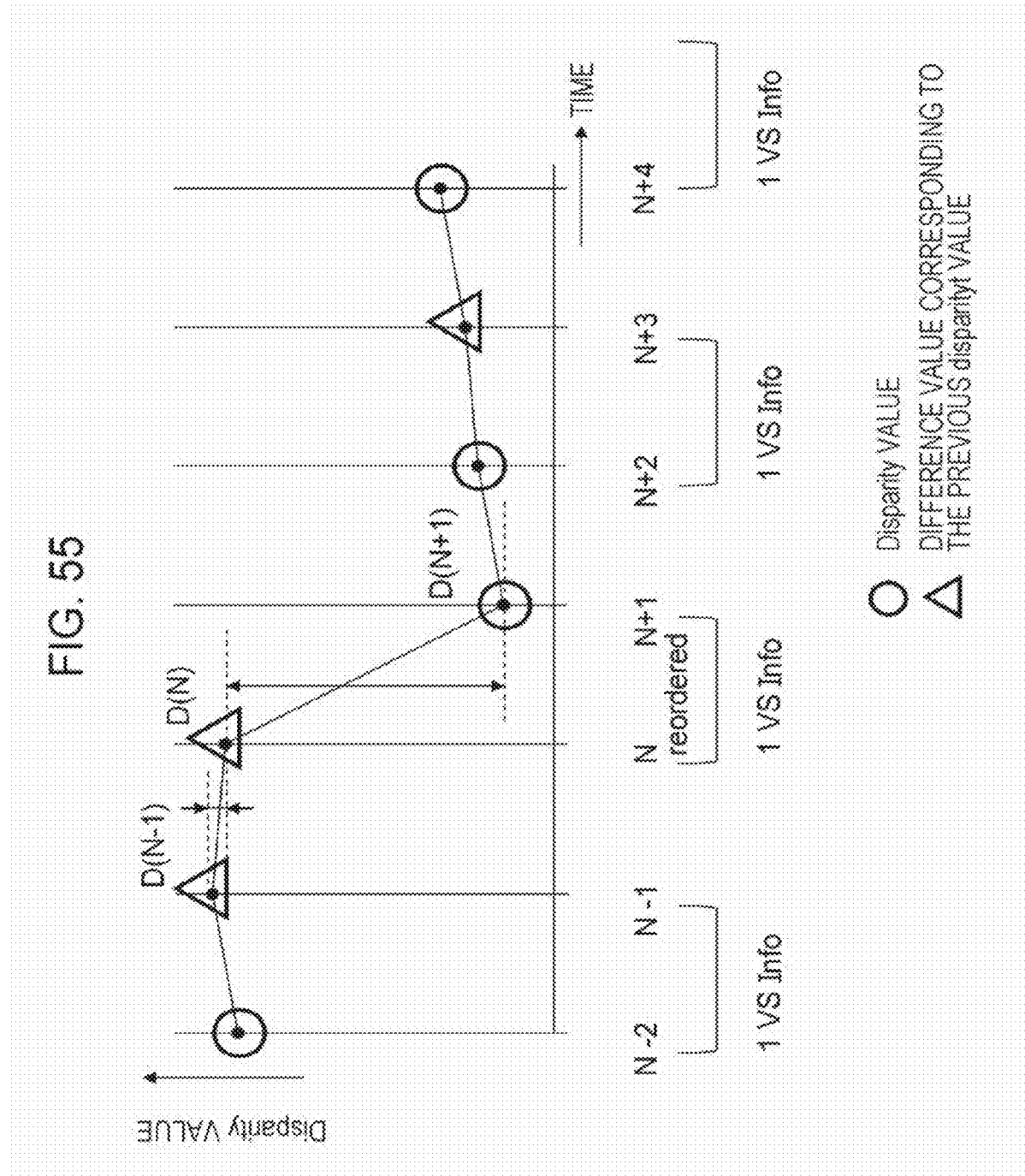
FIG. 55 is a diagram illustrating a time shift example of the disparity information (Disparity value) in the case where |D (N+1)−D (N)|>Th.

FIG. 55 illustrates a time shift example of the disparity information (Disparity value) in the case that |D(N)−D(N+1)|>Th holds. In this example, change to the disparity information between the N−1 picture and the N picture is small, but change to the disparity information between the N picture and the N+1 picture is great. Therefore, |D(N)−D(N+1)|>Th is satisfied. In this case, the disparity information of the N picture is the differential data from the disparity information of the N−1 picture, so the value thereof is relatively small.

Now, regarding "Min_disparity_in_partition", as the D(N+1), D(N), as shown in the Expressions (2), (3) below, the minimum value Min_disparity (N+1), Min_disparity (N) of the "Min_disparity_in_partition" for each partition region is used, respectively.

$$D(N+1) = \text{Min\_disparity}(N+1) \quad (2)$$
$$= \text{Minimum}(\text{Min\_disparity\_partition}(N+1\_0, N+1\_1, --, N+1\_15))$$

$$D(N) = \text{Min\_disparity}(N) \quad (3)$$
$$= \text{Minimum}(\text{Min\_disparity\_partition}(N\_0, N\_1, --, N\_15))$$

Note that instead of finding D(N) with the Expression (3) above, "Min_disparity_partition" of the N picture of the same partition region as the "Min_disparity_partition" for Min_disparity (N+1) which is used as D(N+1) in the above Expression (2) can be used.

On the other hand, regarding "Max_disparity_in_picture", "Max_disparity_in_picture" of the N+1 picture is used as D(N+1), and "Max_disparity_in_picture" of the N picture is used as D(N). Note that of the comparison determination results between ID(N)−D(N+1) and Th, in the case that the results relating to "Min_disparity_in_partition" and the results relating to "Max_disparity_in_picture" do not match, the results relating to "Min_disparity_in_partition" can be prioritized, and so forth.

Note that in the configuration example of the VS_Info in FIG. 52 described above, the N+1 picture is temporally first and the N picture is disposed later. Thus, the configuration from the eighth+1 byte (PB8+1) to the eighth+25 bytes (PB+25) has the same configuration example as the VS_Info in FIG. 69 where the N picture is temporally first and the N+1 picture is disposed later, whereby reading on the receiving side can be stabilized. However, in the configuration example of the VS_Info illustrated in FIG. 52, the disposal position of the disparity information of the N+1 picture and disparity information of the N picture may be reversed.

"(2) Example of Defining and Using New Data Packet"

A method to perform transmission of disparity information in each partition region for each picture of the image data, using a data packet that has been newly defined in a data island period, will be described.

FIG. 56 illustrates a configuration example of a packet header of a 3D Displaying Support Packet serving as the newly defined data packet. Hereinafter, this packet is called a "3DDS packet". Content of the primary information in the configuration example illustrated in FIG. 56 is illustrated in FIG. 45.

The packet header of this 3DDS packet is a 3-byte configuration. Packet type information is disposed from the seventh bit to the 0'th bit of the 0'th byte (HB0). Here, this is "0x0B" which indicates a 3DDS packet.

"3D_support_ID" is disposed in a 3-bit field from the seventh bit to the fifth bit of the first byte (HB1). This 3-bit information is identification information to identify the data type (packet content) transmitted by 3DDS packets. "001" indicates disparity information of each partition region of the picture display screen.

"Payload length" is disposed from the fourth bit to the 0'th bit of the second byte (HB2). This 5-bit information indicates the size of packet contents which is payload, continuing from this packet header, by byte length.

FIG. 57 illustrates a configuration example of packet contents. This configuration example is an example of single picture mode. Contents of the primary information in the configuration example illustrated in this FIG. 57 are illustrated in FIG. 45.

"3D_Metadata_type" is disposed from the seventh bit to the fifth bit of the 0'th byte (PB0). "001" illustrates that the disparity information is of each partition region of the picture display screen. "3D_Metadata_length" is disposed from the fourth bit to the 0'th bit of the 0'th byte (PB0). This 5-bit information illustrates the size of disparity information of each partition region.

"partition_type" is disposed from the sixth bit to the fourth bit of the first byte (PB1). This 3-bit information indicates the partition type of the display screen for the subject picture. "000" indicates partition type "type000" as indicated in FIG. 19(a). "001" indicates partition type "type001" as indicated in FIG. 19(b). "010" indicates partition type "type010" as indicated in FIG. 19(c). "011" indicates partition type "type011" as indicated in FIG. 19(d). "100" indicates partition type "type100" as indicated in FIG. 19(e). "101." indicates partition type "type101" as indicated in FIG. 19(f).

"partition_count" is disposed from the third bit to the 0'th bit of the first byte (PB1). This 4-bit information indicates the total number of partition regions (Partitions), and becomes a value that depends on the above-described "partition_type". For example, "0000" indicates 1, "0011" indicates 4, "0111" indicates 8, "1000" indicates 9, "1100" indicates 13, and "1111" indicates 16.

The disparity information (first disparity information, second disparity information) for one picture is disposed at the third byte (PB3) and thereafter. The 8-bit information of "Max_disparity_in_picture" indicates the second disparity information of the entire picture display screen (entire picture), i.e., the maximum disparity information (disparity value) of the entire picture. The 8-bit information of "Min_disparity_in_partition" indicates the first disparity information of each partition region, i.e., the minimum disparity information (disparity value) for each partition region.

Now, "Min_disparity_in_partition" which is the first disparity information and "Max_disparity_in_picture" which is the second disparity information are absolute value data. "Min_disparity_in_partition" is limited to be nearer than the monitor position, whereby, on the receiving side, the value (absolute value) of the transmitted disparity information can be converted to a negative value and used, even without indicating a sign bit. Similarly, "Min_disparity_in_picture" is limited to be on the far side of the monitor position, whereby, on the receiving side, the value (absolute value) of the transmitted disparity information can be converted to a positive value and used, even without indicating a sign bit.

By the disparity information (first disparity information, second disparity information) thus becoming absolute value data, the dynamic range of the disparity information expressed with 8 bits can be extended to a range that is 0 to 255 pixels. Also, by adding the above-described restriction, a depth expression of up to −255 to +255 can be made. Therefore, even with a 4K*2K monitor, which is considered to have superhigh image quality resolution, depth control can be performed with current transmission bands.

Note that the configuration example illustrated in FIG. 57 is an example in the case of "3D_Metadata_length=11010", "partition_type=101", "partition_count=1111" (see FIG. 19(f)).

FIG. 58 illustrates another configuration example of the packet content. This configuration example is an example of double picture mode. FIG. 45 illustrates content of the primary information in this configuration example illustrated in FIG. 58.

"3D_Metadata_type" is disposed from the seventh bit through to fifth bit of the 0'th byte (PB0). "001" indicates disparity information of each partition region of the picture display screen. "3D_Metadata_length" is disposed from the fourth bit through the 0'th bit of the 0'th byte (PB0). This 5-bit information indicates the size of the disparity information of each partition region.

1-bit identification information of "d_picture" is disposed at the seventh bit of the first byte (PB1). This identification information indicates single picture or double picture. "0" indicates a single picture, i.e., a mode to transmit one picture as disparity information of each partition region. "1" indicates a double picture, i.e., a mode to transmit two pictures as disparity information of each partition region.

1-bit identification information of "partition_enable" is disposed at the fifth bit of the first byte (PB1). This identification information indicates whether the subject picture has disparity information of each partition region. "1" indicates that partition regions are specified in the horizontal and vertical directions, and that each has disparity information. "0" indicates that the entire screen has one set of disparity information.

1-bit identification information of "Picture_reorder" is disposed at the sixth bit of the first byte (PB1). In the case of transmitting a double picture, whether, in the transmission of two pictures (N, N+1), N is first temporally and N+1 is later, or whether N+1 is first and N is later, is indicated. "1" indicates that the (N+1) picture is first and the value of the disparity information is expressed in 8 bits, and that the N picture is later and the differential value from the disparity information of the (N−1) picture is expressed in 4 bits. "0" indicates that the N picture is first and the value of the disparity information is expressed in 8 bits, and that the (N+1) picture is later and the differential value from the disparity information of the N picture is expressed in 4 bits.

Also, "partition_count" is disposed from the third bit to the 0'th bit of the first byte (PB1). This 4-bit information indicates the total number of partition regions. For example, "0000" indicates 1, "0011" indicates 4, "0111" indicates 8, "1000" indicates 9, "1100" indicates 13, and "1111" indicates 16.

Also, at the second byte (PB2) and thereafter, disparity information (first disparity information, second disparity information) for one picture or two pictures is sequentially disposed. The 8-bit information of "Max_disparity_in_picture" indicates the second disparity information of the entire picture display screen (entire picture), i.e., the maximum disparity information (disparity value) of the entire picture. The 8-bit information of "Min_disparity_in_partition" indicates the first disparity information of each partition region, i.e., the minimum disparity information (disparity value) of each partition region.

Now, "Min_disparity_in_partition" which is the first disparity information and "Max_disparity_in_picture" which is the second disparity information are set as absolute value data, similar to the configuration example in FIG. 57 described above.

The configuration example of the packet content in FIG. 58 illustrates a configuration example of packet contents in the case of "d_picture=1", that the mode is for double picture, "picture_reorder=0", and the N picture is temporally first and the N+1 picture is later. Note that this example indicates a case where "partition_count=1111." and the partition region is "16".

In this case, second disparity information for the entire picture display screen of the N picture, i.e., "Max_disparity_in_picture" which is the maximum disparity information (Disparity value) of the entire picture, is disposed at the second byte (PB2). Also, the first disparity information of each partition region of the N picture, i.e., "Min_disparity_in_partition" which is the minimum disparity information (Disparity value) of each partition region, is disposed from the third byte (PB3) to the eighteenth byte (PB18).

Also, in this case, second disparity information of the entire picture display screen of the N+1 picture, i.e., the "Differential_max_disparity_in_picture" which is differential data of the maximum disparity information (disparity value) of the entire picture, is disposed from the third bit to the 0'th bit of the nineteenth byte (PB19). First disparity information of each partition region in the N+1 picture, i.e., the "Differential_min_disparity_in_partition" which is the differential value of the minimum disparity information (disparity value) of each partition region, is disposed from the 20th byte (PB20) to the 27'th byte (PB27).

Note that while a diagram and detailed description will be omitted, a configuration example of packet contents of "d_picture=1", double picture mode, "picture_reorder=1", and the case where N+1 picture is temporally first and N picture is later, corresponds to the configuration example in FIG. 52 described above.

Note that with this newly defined 3DDS packet, the bit width of "Payload length" in the packet header can take more than 5 bits, and the size of the packet contents that continue from this packet header can be increased.

FIG. 59 illustrates a configuration example of packet contents in the case thereof. The uppermost 5 bits of "3D_Metadata_length" are disposed from the fourth bit to the 0'th bit of the 0'th byte (PB0). Also, the lowest 8 bits of "3D_Metadata_length" are disposed from the seventh bit to the 0'th bit of the first byte (PB0).

Also, "partition_type" is disposed from the second bit to the 0'th bit of the second byte (PB2). Also, "partition_count" is disposed from the seventh bit to the 0'th bit of the third byte. Also, the disparity information (first disparity information, second disparity information) is disposed at the fourth byte (PB4) and thereafter.

"(3) Example of Using Active Space Region"

A method to transmit disparity information in each partition region for each picture of the image data, using an active space region will be described.

Figure 60:
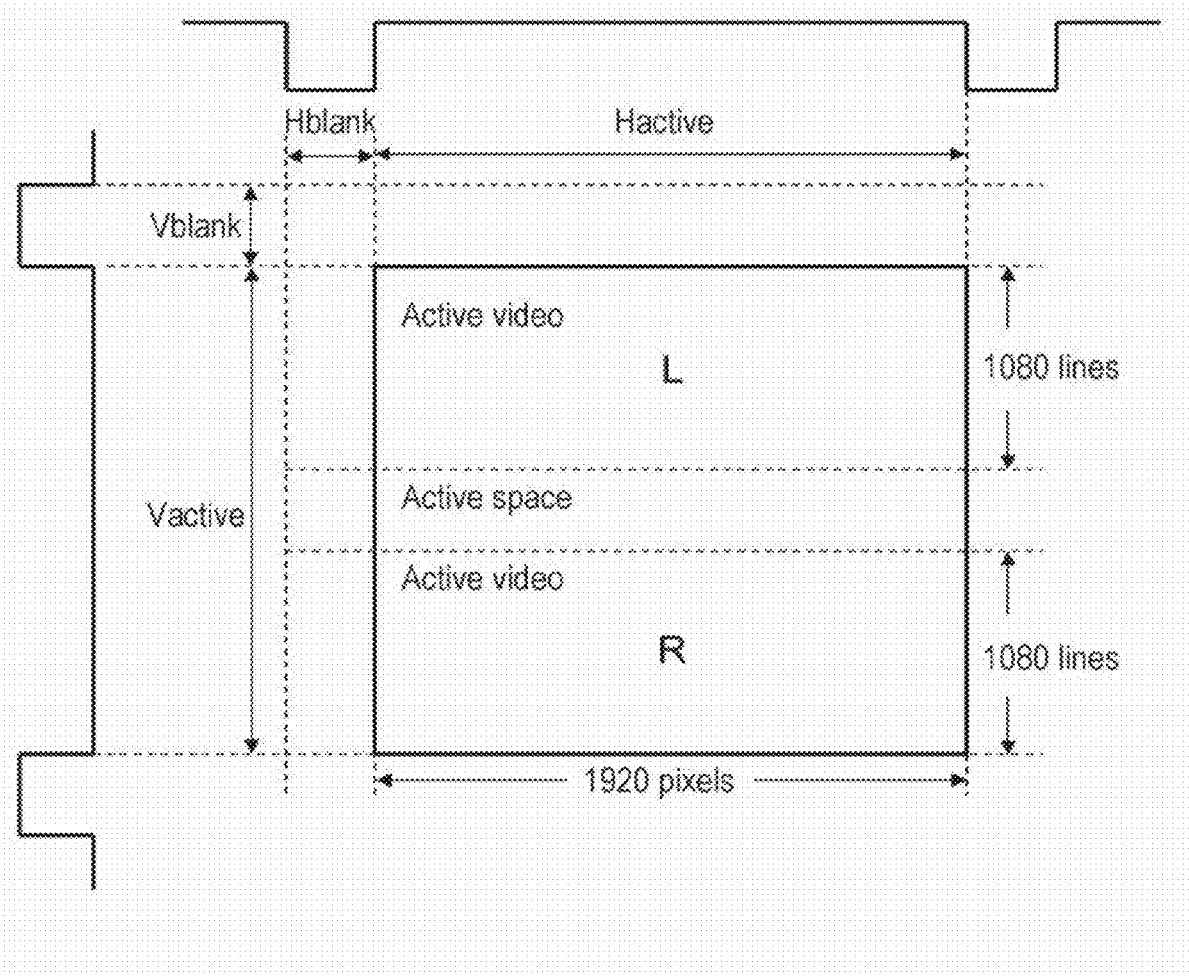
FIG. 60 is a diagram illustrating a 3D video format of a frame packing method which is one TMDS transmission data configuration of the stereoscopic image data.

FIG. 60 illustrates a 3D video format of a frame packing method, which is one TMDS transmitted data configuration for stereoscopic image data. This 3D video format is a format for transmitting image data for the left eye (L) and right eye (R), as stereoscopic image data, with a progressive format.

With this 3D video format, the transmission of image data in 1920×1080p and 1080×720p pixel formats are performed, as image data of the left eye (L) and right eye (R). Note that FIG. 60 illustrates an example where the left eye (L) image data and the right eye (R) image data are each 1920 lines*1080 pixels.

With this 3D video format, transmitted data is generated to have units of video field segments that are segmented by the vertical synchronization signal, including a horizontal blanking period (Hblank), vertical blanking period (Vblank), and active video space (Hactive×Vactive). In this 3D video format, the active video space has two active video regions (Active video) and in between thereof has one active space region. Left eye (L) image data is disposed in the first active video region, and the right eye (R) image data is disposed in the second active video region. The active video space has two active video regions (Active video) as primary picture regions, and in between thereof has one active space region as an auxiliary picture region.

FIG. 61 illustrates an example of a packet configuration for HDMI Vendor Specific InfoFrame in the case of using an active space region. "Active Space Enable" is defined in the second bit of the fifth byte (PB5) which is a reserve (Reservedbit) in the current state, and this 1-bit information is set as "1". Additionally, disparity information in each partition region of each picture of the image data is inserted into an active space region, which in the current state is set as reserve (Reserved).

In this case, inserting a portion of the packet contents without change of the newly defined 3DDS packet described above, for example, in the active space region, may be conceived (see FIG. 57, FIG. 58). However, inserting in other forms can also be performed.

An active space region makes up an active video region in which left eye image data and right eye image data is disposed, as well as an active video space (see FIG. 60). Now, the active video region makes up the primary picture region, and the active space region makes up the auxiliary picture region. The active space region varies by the image size of the video, but in the case of an image size of 1920*1080, holds capacity of 45 lines (86400 bytes) per frame.

Note that in the description above, an example is illustrated where the set-top box 200 can select a mode for signal picture or double picture. However, instead of a double picture mode, a multiple picture mode may be conceived, where the number of pictures can be optionally selected. Also, a case where the number of mode that can be selected is three or more may be conceived. In that case, the number of partition regions may be modified to an appropriate number on the HDMI source so that transmissions can be made within the provided bands.

As described above, with the image transmitting/receiving system 10 illustrated in FIG. 1, the broadcast station 100 inserts the first disparity information and second disparity information obtained for each predetermined picture of the image data into the video stream, and transmits. Now, the first disparity information is disparity information corresponding to the nearest object playing position in a predetermined region of the picture display screen, and the second disparity information is disparity information corresponding to the farthest object playing position in a predetermined region of the picture display screen. Therefore, with the set-top box 200 on the receiving side, for example a check is performed as to whether or not the disparity angles are within a predetermined range that do not harm the health of the viewer, based on first disparity information and second disparity information, and the left eye image data and right eye image data can be reconfigured as needed.

Also, with the image transmitting/receiving system 10 illustrated in FIG. 1, in the event that disparity information of each partition region is transmitted from the set-top box 200 to the television receiving device 300, a newly defined 3DDS packet, for example, is used. In this case, the disparity information is inserted into the content portion of the 3DDS packet, which identification information to identify the disparity information is inserted into the header portion of this 3DDS packet, and this is transmitted to the television receiving device 300. Therefore, disparity information can be efficiently transmitted to the television receiving device 300.

2. Modifications

Figure 62:
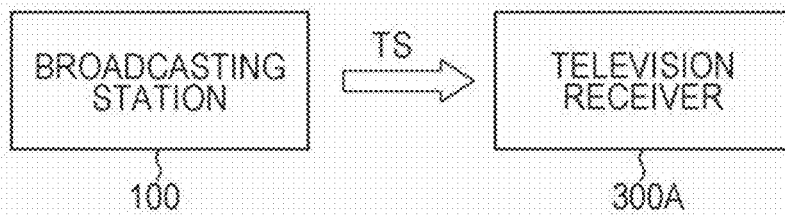
FIG. 62 is a block diagram illustrating another configuration example of an image transmitting/receiving system.

Note that according to the above-described embodiment, an image transmitting/receiving system 10 that is made up of a broadcast station 100, set-top box 200, and television receiving device 300, has been illustrated. However, as illustrated in FIG. 62, an image transmitting/receiving system 10A that is made up of a broadcast station 100 and television receiving device 300A may also be conceived.

Figure 63:
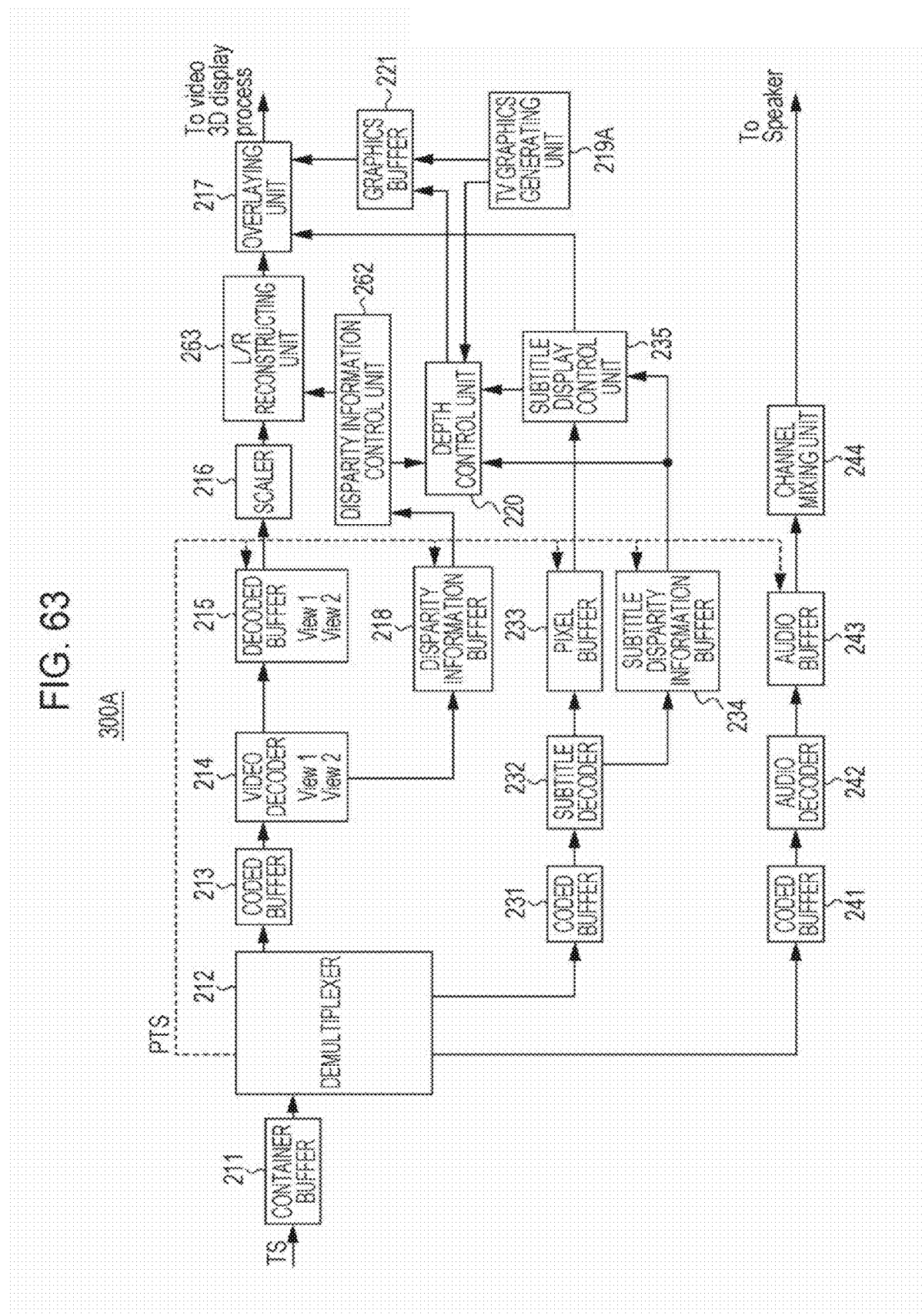
FIG. 63 is a block diagram illustrating a configuration example of the television receiving device.

FIG. 63 illustrates a configuration example of a television receiving device 300A. In FIG. 63 herein, portions that correspond to FIG. 28 have the same reference numerals appended thereto, and detailed description thereof will be omitted. A television (TV) graphics generating unit 219A is similar to the set-top box (STB) graphics generating unit 219 of the set-top box 200 in FIG. 28, and generates an OSD or application, or graphics data such as EPG.

From the overlaying unit 217, left eye image data onto which subtitles and graphics for left eye display are overlaid is obtained, and right eye image data onto which subtitles and graphics for right eye display are overlaid is obtained. This image data is send to a processing unit for stereoscopic image display, and stereoscopic image display is performed. Also, with the channel mixing unit 244, audio data for each channel to realize a 5.1 ch sound or the like, for example, is generated as to the audio data. This audio data is supplied to a speaker, for example, and audio output that matches the stereoscopic image display is performed.

Detailed description will be omitted, but other than the television receiving device 300A illustrated in FIG. 63 is configured similar to the set-top box 200 in FIG. 28, and operates similarly.

Also, according to the above-described embodiment, an example is illustrated where disparity information in the horizontal direction for each partition region of a picture display screen is transmitted as image data related information with the newly defined 3DDS packet (see FIG. 56 through FIG. 58). However, by using the 3DDS packet, other image data related information may be transmitted also.

For example, in addition to the conventional minimum_disparity values in the horizontal direction, by sending minimum_disparity values in the vertical direction, correcting control of 3D disparity can be performed on the television receiving device side. This function can be performed by transmitting horizontal_minimum_disparity in picture increments and vertical_minimum_disparity in picture increments with a separate 3DDS packet.

Also, for example, in the case that the value of the disparity information is automatically updated, when graphics of a certain size is displayed near in the depth direction, the size thereof is near but feels small. On the other hand, if graphics of the same size is displayed far in the depth direction, the size thereof is far but feels large.

In order to inhibit such depth paradox, the scale is taken of the depth dynamic range, and the graphics are scaled and then overlaid onto the image on the television receiving device side which overlays the graphics accordingly. This function can be performed by transmitting values of the depth dynamic range between the minimum_disparity and maximum_disparity at each portion that has been localized within the picture, which have been scaled linearly or non-linearly, with a separate 3DDS packet.

Also, according to the above-described embodiment, the set-top box 200 and television receiving device 300 are illustrated as being connected by an HDMI digital interface. However, it goes without saying that even in a case where these are connected by a digital interface (includes wireless as well as cabled) similar to the HDMI digital interface, the present technology can be similarly applied.

Also, according to the above-described embodiment, as a method to transmit disparity information from the set-top box 200 to the television receiving device 300, a method of using HDMI Vendor Specific InfoFrame is described. Besides this, a method to use active space, and further, transmitting through a bi-directional communication path made up of an HPD line 86 (HEAC-line) and utility line 88 (HEAC+ line) may be conceived.

Also, according to the above-described embodiment, an example is illustrated of transmitting disparity information from the set-top box 200 to the television receiving device 300 with an HDMI interface. However, it goes without saying that, technology to transmit disparity information through an HDMI interface in this way can also be applied to combinations of other source devices and sink devices. For example, as a source device, a disc player such as BD or DVD or the like, and further, a gaming device or the like may also be conceived, and as a sink device, a monitor device, projector device, or the like may also be conceived.

Also, according to the above-described embodiment, an example is illustrated where a container is a transport stream (MPEG-2 TS). However, the present technology can be similarly applied to a system having a configuration where a network such as the Internet or the like is used, and distributed to a receiving terminal. Of Internet distribution, MP4 and containers of other formats are often used for distribution.

That is to say, as a container, containers of various types of formats, such as a transport stream (MPEG-2 TS) used in digital broadcasting standards, MP4 that is used in Internet distribution, and the like may be used. Also, an application where one method for supplying service content is divided into a plurality, and each is performed with separate transmitted formats, which is to say, a case where one of the views is transmission by electronic waves and the other view is transmission by the Internet is also applicable.

Also, the present technology can take configuration such as described below.

(1) A transmitting apparatus including
a data packet generating unit to generate a data packet made up of a header portion and a content portion; and
a transmitting unit to correlate the data packet to image data and transmit to an external device,
wherein the data packet generating unit inserts related information of the image data into the content portion, and inserts identification information to identify the type of the related information into the header portion.

(2) The transmitting apparatus according to (1) above, wherein the data packet generating unit determines the size of the content portion according to the data amount of the related information that is inserted into the content portion, and inserts size information indicating the determined size into the header portion.

(3) The transmitting apparatus according to (1) or (2) above, wherein the data packet generating unit generates the data packet for each of a predetermined number of pictures of the image data.

(4) The transmitting apparatus according to (3) above, wherein the image data is left eye image data and right eye image data which configures a stereoscopic image; and
wherein the related information is other disparity information as to one of a left eye image and right eye image, and is representative disparity information for each predetermined region of a picture display screen.

(5) The transmitting apparatus according to (4) above, wherein a first disparity information corresponding to the nearest object playing position in a predetermined region is included in the representative disparity information of each predetermined region.

(6) The transmitting apparatus according to (4) above, wherein the first disparity information corresponding to the nearest object playing position in a predetermined region, and a second disparity information corresponding to the farthest object playing position in a predetermined region, is included in the representative disparity information of each predetermined region.

(7) The transmitting apparatus according to one of (4) through (6) above, wherein the data packet generating unit inserts the representative disparity information into the content portion as absolute value data.

(8) The transmitting apparatus according to one of (1) through (7) above, wherein the transmitting unit inserts the data packet into a blanking period of the image data, and transmits to the external device.

(9) The transmitting apparatus according to Claim 1 in one of (1) through (7) above,
wherein the transmitting unit generates transmission data in increments of video field segments that include horizontal blanking periods and vertical blanking periods segmented by the vertical synchronizing signal, and active video spaces having primary picture regions and auxiliary picture regions, and transmits to an external device, and
wherein image data is distributed to the primary picture regions, and the data packets are distributed to the auxiliary picture regions.

(10) A transmitting method including
a data packet generating step to generate a data packet made up of a header portion and a content portion; and
a transmitting step to correlate the data packet to image data and transmit to an external device,
wherein in the data packet generating step, related information of the image data is inserted into the content portion, and identification information to identify the type of the related information is inserted into the header portion.

(11)
A transmitting apparatus including
an image data obtaining unit to obtain left eye image data and right eye image data that configures a stereoscopic image;
a disparity information obtaining unit to obtain representative disparity information which is the other disparity information as to one of the left eye image and right eye image, for each predetermined picture of the image data, and which is in each partition region corresponding to a partition pattern of a picture display screen;
a disparity information inserting unit to insert the representative disparity information for each partition region into the video stream obtained by the image data having been encoded; and
an image data transmitting unit to transmit a container of a predetermined format that includes a video stream in which the disparity information has been inserted.

(12) The transmitting apparatus according to (11) above, further including
a pattern selecting unit to select predetermined partition patterns from multiple partition patterns,
wherein the disparity information obtaining unit obtains representative disparity information in each partition region corresponding to the selected predetermined partition pattern of the picture display screen.

(13) The transmitting apparatus according to (11) above, wherein the first disparity information corresponding to the nearest object playing position in a partition region is included in the representative disparity information in each of the partition regions.

(14) The transmitting apparatus according to (11) above, wherein the first disparity information corresponding to the nearest object playing position in a partition region, and the second disparity information corresponding to the farthest object playing position in a partition region, is included in the representative disparity information in each of the partition regions.

(15) The transmitting apparatus according to one of (11) through (14) above, wherein the disparity information inserting unit inserts the representative disparity information into the video stream, as absolute value data.

(16) A transmitting method, including
an image data obtaining step to obtain left eye image data and right eye image data that configure a stereoscopic image;
a disparity information obtaining step to obtain representative disparity information which is the other disparity information as to one of the left eye image and right eye image for each predetermined picture of the image data, and which is in each partition region corresponding to a partition pattern of a picture display screen;
a disparity information inserting step to insert the representative disparity information in each partition region into a video stream which is obtained by the image data having been encoded; and
an image data transmitting step to transmit a container of a predetermined format that includes the video stream into which the disparity information has been inserted.

(17) A receiving device including
an image data receiving unit to receive a container of a predetermined format that includes a video stream,
wherein the video stream is obtained by left eye image data and right eye image data that configure a stereoscopic image having been encoded; and
wherein representative disparity information which is the other disparity information as to one of the left eye image and right eye image, at each partition region corresponding to a partition pattern of a picture display screen, is inserted into the video stream for each picture of the image data;
the receiving apparatus further including
an information obtaining unit that obtains the left eye image data and right eye image data from the video stream included in the container, while obtaining representative information for each partition region of each picture of the image data;
an information smoothing unit that performs smoothing processing in the temporal axis direction as to the representative disparity information for each partition region of each of the picture;
a graphics data generating unit that generates graphics data to display graphics on an image; and
an image data processing unit that uses the obtained image data and the smoothed disparity information and the generated graphics data, appends disparity corresponding to the display position of the graphics for each picture to the graphics that overlay a left eye image and right eye image, and obtains left eye image data onto which the graphics have been overlaid and right eye image data onto which the graphics have been overlaid.

Primary features of the present technology are related information of image data, for example disparity information or the like, being inserted into a content portion of the data packet, while identification information to identify the type of related information is inserted into the header portion of this data packet, and this being transmitted to an external device, whereby related information of image data such as disparity information or the like can be efficiently transmitted (see FIG. 56 through FIG. 57). Also, by transmitting disparity information as absolute value data, positive and negative sign bits are not needed, and the dynamic range of the disparity information can be expanded (see FIG. 15 through FIG. 17).

REFERENCE SIGNS LIST 10, 10A image transmitting/receiving system
100 broadcast station
110, 110A transmission data generating unit
111, 111R image data output unit
112L, 112 scaler
113 video encoder
114 multiplexer
115 disparity data generating unit
116 subtitle data output unit
117 subtitle encoder
118 audio data output unit
119 audio encoder
120 partition pattern selecting unit
200 set-top box
211 container buffer 212 demultiplexer
213 coded buffer
214 video decoder
215 decoded buffer
216 scaler
217 overlaying unit
218 disparity information buffer
219 set-top box (STB) graphics buffer
219A television (TV) graphics buffer
220 depth control unit
221 graphics buffer
231 coded buffer
232 subtitle decoder
233 pixel buffer
234 subtitle disparity information buffer
235 subtitle display control unit
241 coded buffer
242 audio decoder
243 audio buffer
244 channel mixing unit
251 HDMI transmitting unit
262 disparity information control unit
263 L/R reconfiguring unit
271 maximum value obtaining unit
272 minimum value obtaining unit
273 disparity angle checking unit
274 disparity information correcting unit
281 frame memory
282 subtractor
283 order determining unit
300, 300A television receiving device
311 HDMI receiving unit
312 scaler
313 overlaying unit
314 depth control unit
315 graphics buffer
316 television (TV) graphics generating unit
317 audio processing unit
400 HDMI cable

The invention claimed is:

1. An apparatus, comprising:
circuitry configured to:
generate a data packet that includes a header portion and a content portion;
correlate the data packet to image data;
transmit the correlated data packet to an external device;
insert related information of the image data into the content portion;
determine a size of the content portion based on a data amount of the inserted related information;
insert size information that indicates the determined size into the header portion; and
insert identification information to identify a type of the related information into the header portion,
wherein the related information comprises first disparity information and second disparity information,
wherein a picture display screen is partitioned into a plurality of partition regions,
wherein the first disparity information corresponds to a farthest object playing position in each partition region of the plurality of partition regions, and
wherein the second disparity information corresponds to a nearest object playing position over an entire picture display screen.

2. The apparatus according to claim 1, wherein the circuitry is further configured to generate the data packet for each picture of a plurality of pictures of the image data.

3. The apparatus according to claim 2,
wherein the image data includes left eye image data and right eye image data which configure a stereoscopic image, and
wherein the related information is representative disparity information for each region of the plurality of partition regions of the picture display screen.

4. The apparatus according to claim 3, wherein the first disparity information corresponding to the farthest object playing position in a region is included in the representative disparity information of the region.

5. The apparatus according to claim 3, wherein the first disparity information and the second disparity information are included in the representative disparity information of each region of the plurality of partition regions.

6. The apparatus according to claim 3, wherein the circuitry is further configured to insert the representative disparity information into the content portion as absolute value data.

7. The apparatus according to claim 1, wherein the circuitry is further configured to:
insert the data packet into a blanking period of the image data; and
transmit the data packet to the external device.

8. The apparatus according to claim 1, wherein the circuitry is further configured to:
generate transmission data in increments of video field segments,
wherein the video field segments include horizontal blanking periods, vertical blanking periods segmented by a vertical synchronizing signal, and active video spaces,
wherein the active video spaces comprise primary picture regions and auxiliary picture regions; and
transmit the transmission data to an external device,
wherein the image data is distributed to the primary picture regions, and the data packets are distributed to the auxiliary picture regions.

9. A method, comprising:
generating a data packet that comprises a header portion and a content portion;
correlating the data packet to image data;
transmitting the correlated image data to an external device,
inserting related information of the image data into the content portion;
determining a size of the content portion based on a data amount of the inserted related information;
inserting size information indicating the determined size into the header portion; and
inserting identification information to identify a type of the related information into the header portion,
wherein the related information comprises first disparity information and second disparity information,
wherein the first disparity information corresponding to a farthest object playing position in each partition region obtained by partitioning a picture display screen into a plurality of partition regions, and
wherein the second disparity information corresponding to a nearest object playing position over an entire picture display screen.

10. An apparatus, comprising:
circuitry configured to:
  obtain left eye image data and right eye image data that configure a stereoscopic image;
  select a set of partition patterns from a plurality of partition patterns;
  obtain representative disparity information for each partition region of a plurality of partition regions corresponding to the selected set of partition patterns of a picture display screen,
    wherein the representative disparity information comprises first disparity information and second disparity information,
    wherein the picture display screen is partitioned into the plurality of partition regions,
    wherein the first disparity information corresponds to a farthest object playing position in each partition region of the plurality of partition regions, and
    wherein the second disparity information corresponds to a nearest object playing position over an entire picture display screen;
  insert the representative disparity information for each partition region of the plurality of partition regions into a video stream,
    wherein the left eye image data and the right eye image data are encoded to obtain the video stream; and
  transmit a container in a format that includes the video stream into which the disparity information has been inserted.

11. The apparatus according to claim 10, wherein the representative disparity information is inserted into the video stream as absolute value data.

12. A method, comprising:
  obtaining left eye image data and right eye image data that configure a stereoscopic image;
  selecting a set of partition patterns from a plurality of partition patterns;
  obtaining representative disparity information for each partition region of a plurality of partition regions corresponding to the selected set of partition patterns of a picture display screen,
    wherein the representative disparity information comprises first disparity information and second disparity information,
    wherein the picture display screen is partitioned into the plurality of partition regions,
    wherein the first disparity information corresponding to a farthest object playing position in each partition region of the plurality of partition regions, and
    wherein the second disparity information corresponding to a nearest object playing position over an entire picture display screen;
  inserting the representative disparity information for each partition region of the plurality of partition regions into a video stream,
    wherein the left eye image data and the right eye image data are encoded to obtain the video stream; and
  transmitting a container in a format that includes the video stream into which the disparity information has been inserted.

* * * * *